US011792767B2

(12) United States Patent
Ryu et al.

(10) Patent No.: US 11,792,767 B2
(45) Date of Patent: Oct. 17, 2023

(54) WIRELESS COMMUNICATIONS FOR COMMUNICATION SETUP/RESPONSE

(71) Applicant: Comcast Cable Communications, LLC, Philadelphia, PA (US)

(72) Inventors: Jinsook Ryu, Herndon, VA (US); Esmael Dinan, McLean, VA (US); Kyungmin Park, Herndon, VA (US); Peyman Talebi Fard, Sterling, VA (US); Weihua Qiao, Herndon, VA (US); Jayshree Bharatia, Plano, TX (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/824,324

(22) Filed: Mar. 19, 2020

(65) Prior Publication Data

US 2020/0305118 A1    Sep. 24, 2020

Related U.S. Application Data

(60) Provisional application No. 62/820,571, filed on Mar. 19, 2019.

(51) Int. Cl.
*H04W 68/00*    (2009.01)
*H04W 76/10*    (2018.01)
*H04W 84/12*    (2009.01)

(52) U.S. Cl.
CPC ......... *H04W 68/005* (2013.01); *H04W 76/10* (2018.02); *H04W 84/12* (2013.01)

(58) Field of Classification Search
CPC .......................... H04W 68/005; H04W 76/10
See application file for complete search history.

(56) References Cited

U.S. PATENT DOCUMENTS

| 2016/0044545 | A1* | 2/2016 | Yang | H04W 36/0022 |
| | | | | 370/331 |
| 2018/0279400 | A1* | 9/2018 | Faccin | H04W 68/12 |
| 2019/0007992 | A1* | 1/2019 | Kim | H04W 64/006 |
| 2019/0059067 | A1* | 2/2019 | Lee | H04W 60/04 |
| 2019/0149365 | A1* | 5/2019 | Chatterjee | H04L 25/0226 |
| | | | | 370/329 |
| 2020/0120585 | A1* | 4/2020 | Kumar | H04W 76/11 |

FOREIGN PATENT DOCUMENTS

| WO | 2018155934 A1 | 8/2018 |
| WO | 2020209620 A1 | 10/2020 |

OTHER PUBLICATIONS

Aug. 14, 2020—Exended European Search Report—EP 20164195.8.
Nov. 24, 2021—European Office Action—EP 20165195.8.

* cited by examiner

*Primary Examiner* — Muthuswamy G Manoharan
(74) *Attorney, Agent, or Firm* — Banner & Witcoff, Ltd.

(57) ABSTRACT

A wireless device may receive to a message requesting a connection setup (e.g., a paging message) via a first access technology (e.g., a 3GPP access technology) from a first wireless network. The wireless device may respond to the message by sending a response message via a second access technology (e.g., a non-3GPP access technology). The wireless device may send the response message to indicate that the wireless device does not accept the connection setup request.

23 Claims, 30 Drawing Sheets

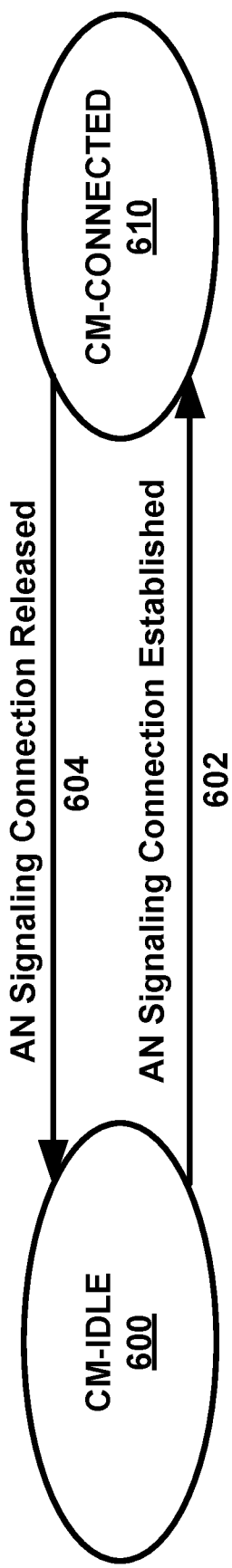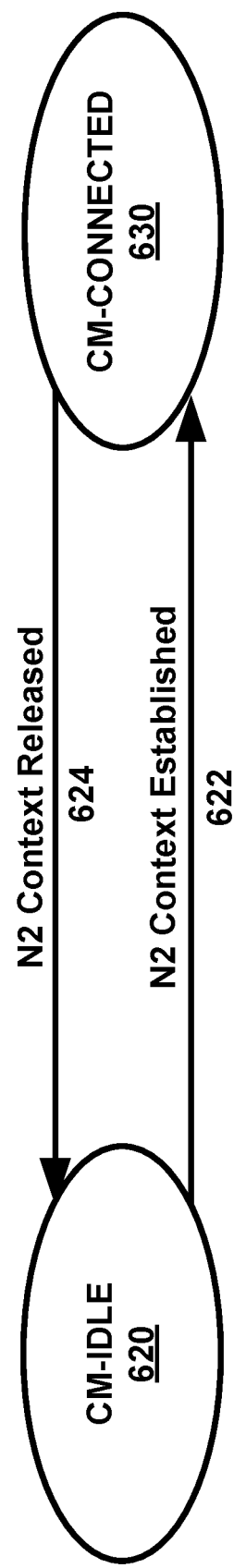

Call Flow For RRC State Transition

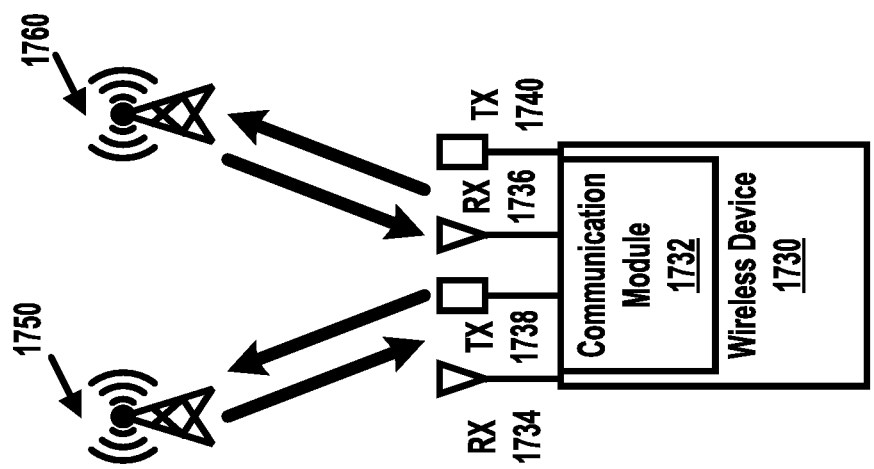
FIG. 17C
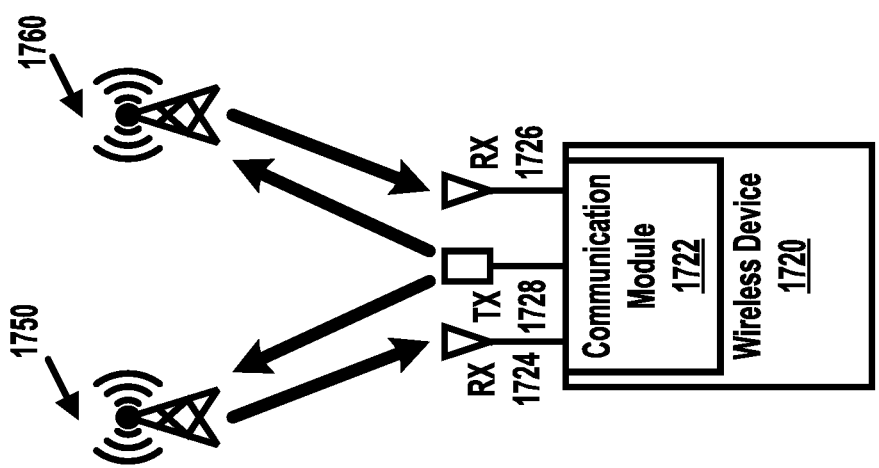
FIG. 17B
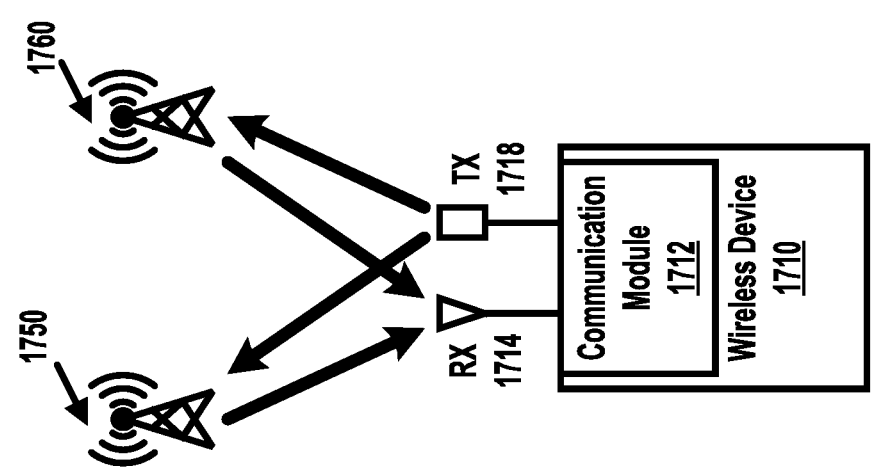
FIG. 17A

Simultaneous Registration To 3GPP And Non-3GPP Access Technology

| Information Element | Type/Reference |
|---|---|
| Notification response message identity | Message type |
| Allowed PDU session | PDU session identities list |
| (Reject) Cause | a connection status is busy; a connection status is weak; a connection state is in CM-CONNECTED with other PLMN; a UE is dual-subscriber identity module (SIM) device; or Others |
| Available service type | DNN(s), S-NSSAI(s), PDU session identities |
| Unavailable service type | DNN(s), S-NSSAI(s), PDU session identities |
| Frequency/band information | Frequency(s) Band (s) |

Notification Response Message Content

FIG. 25

WIRELESS COMMUNICATIONS FOR COMMUNICATION SETUP/RESPONSE

CROSS-REFERENCE TO RELATED APPLICATIONS

This application claims the benefit of U.S. Provisional Application No. 62/820,571, titled "Paging Responding Method" and filed on Mar. 19, 2019. The above-referenced application is hereby incorporated by reference in its entirety.

BACKGROUND

A wireless device may communicate with one or more base stations. The wireless device may be able to communicate/associate with multiple wireless networks, for example, using multiple subscriber/user identities/modules/identifiers.

SUMMARY

The following summary presents a simplified summary of certain features. The summary is not an extensive overview and is not intended to identify key or critical elements.

A wireless device may communicate with one or more other devices (e.g., base station, node, etc.) via one or more wireless networks and/or using one or more access technologies (e.g., 3GPP, non-3GPP, wireless LAN, Wi-Fi, satellite communications, and/or other access technologies). The wireless device may receive a request for communications (e.g., a paging message, a connection setup request, etc.) using a 3GPP access technology (or other access technology) via a first wireless network, for example, simultaneously (or near simultaneously) with the wireless device actively communicating via a second wireless network (e.g., using a 3GPP access technology or other access technology). The wireless device may be unable to respond to the request via an access technology used in the request (e.g., a 3GPP access technology), for example, due to active communications by the wireless device using the same access technology as the request and/or the wireless device lacking ability and/or resources for responding to the request via the access technology used in the request. The wireless device may send a notification (e.g., response message, connection setup reject message, etc.), using one or more access technologies (e.g., a non-3GPP access technology) to the first wireless network, indicating that the wireless device declines, rejects, and/or does not accept the requested communication. By sending the notification (e.g., a response to the request for communications), the wireless device may conserve radio resources (e.g., avoid retransmission(s) of the request) and/or improve wireless communication performance (e.g., reduce noise and/or congestion due to retransmission(s) of the request, and/or avoid interrupting and/or cancelling active communications).

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 6A and FIG. 6B show example connection management state transitions for a wireless device and an AMF.
FIG. 17A, FIG. 17B, and FIG. 17C show example wireless devices comprising various quantities of transmitters and receivers.
FIG. 25 shows an example of message content for a response message.

DETAILED DESCRIPTION

Figure 1:
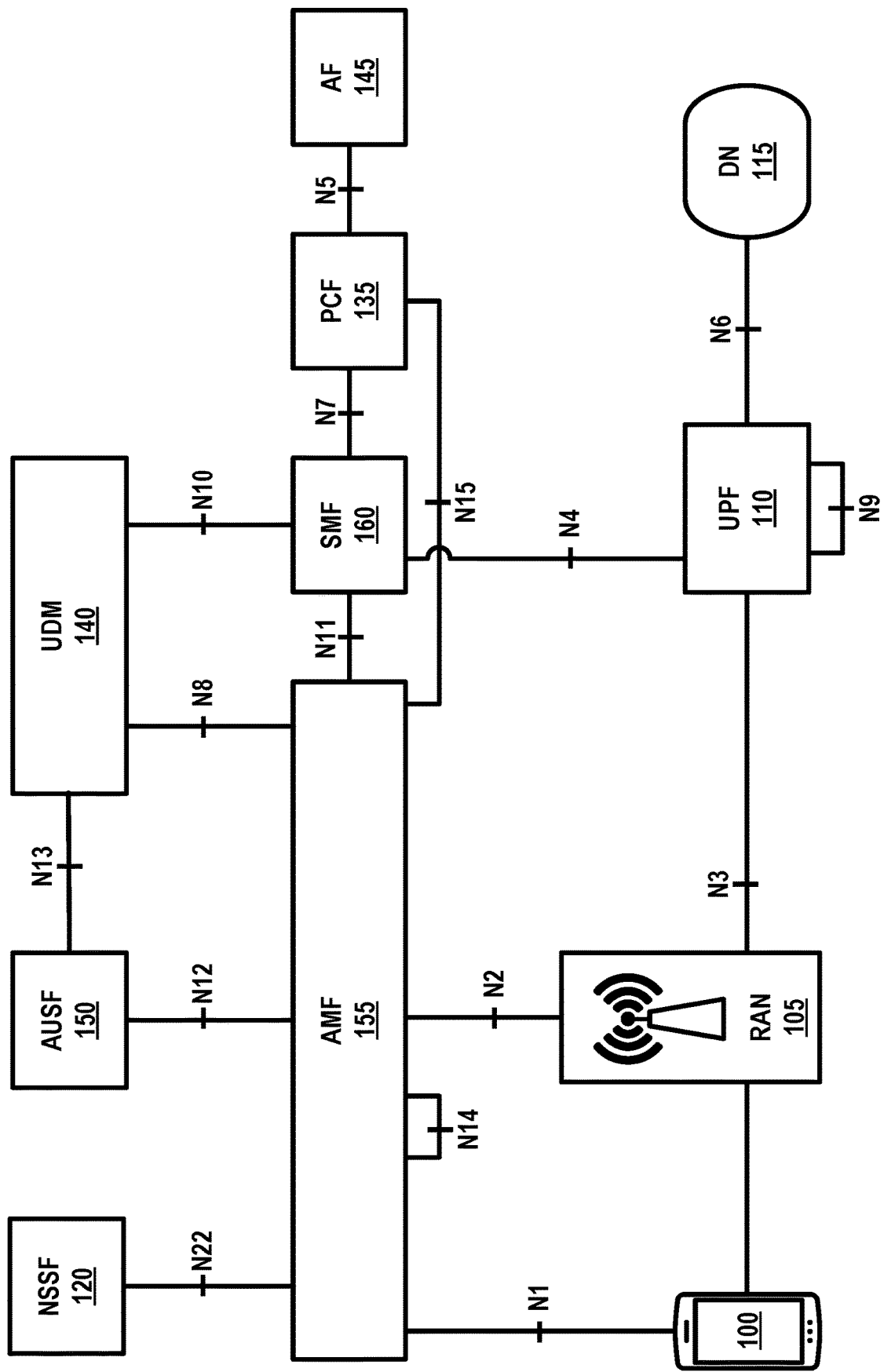
FIG. 1 shows an example 5G system architecture.

The accompanying drawings, which form a part hereof, show examples of the disclosure. It is to be understood that the examples shown in the drawings and/or discussed herein are non-exclusive and that there are other examples of how the disclosure may be practiced.

Examples of enhanced features and functionalities in networks, such as 4G networks, 5G networks, or other networks or systems are described. More particularly, the technology herein may relate to a core network (e.g., 5GC), a 5G network, 4G, 3GPP access technologies, non-3GPP access technologies, multi-SIM wireless devices, and/or other systems. The communication systems may comprise any quantity and/or type of devices, such as, for example, computing devices, wireless devices, base stations, network devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices.

The following acronyms are used throughout the present disclosure, provided below for convenience although other acronyms may be introduced in the detailed description.

Figure 2:
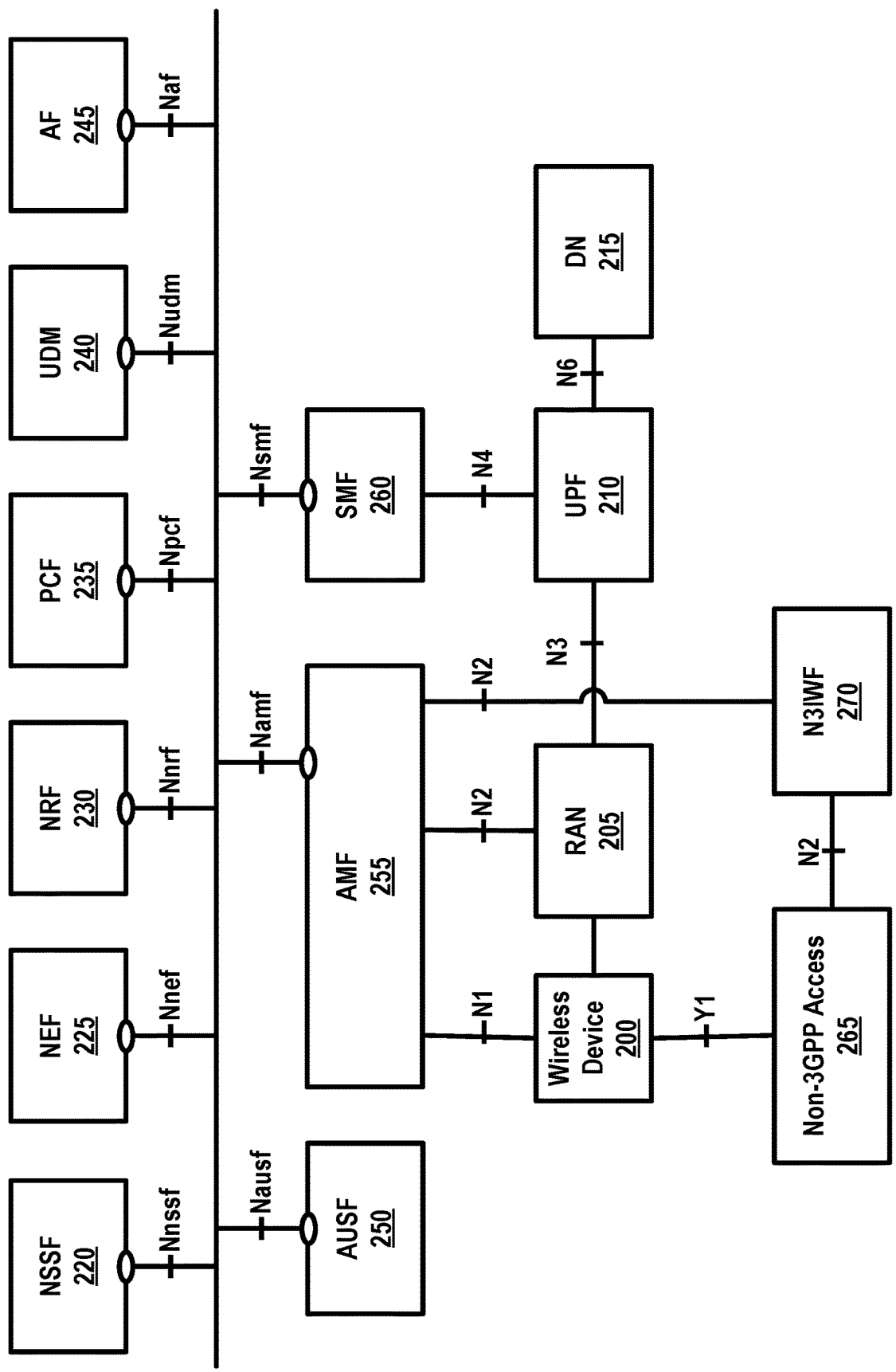
FIG. 2 shows an example 5G system.

3GPP 3rd Generation Partnership Project
5G 5th generation mobile networks
5GC 5G Core Network
5GS 5G System
5G-AN 5G Access Network
5QI 5G QoS Indicator
ACK Acknowledgement
AF Application Function
AMF Access and Mobility Management Function
AN Access Network
CDR Charging Data Record
CCNF Common Control Network Functions
CIoT Cellular IoT
CN Core Network
CP Control Plane
DDN Downlink Data Notification
DL Downlink
DN Data Network
DNN Data Network Name
DRX Discontinuous Reception
F-TEID Fully Qualified TEID
gNB next generation Node B
GPSI Generic Public Subscription Identifier
GTP GPRS Tunneling Protocol
GUTI Globally Unique Temporary Identifier
HPLMN Home Public Land Mobile Network
IMSI International Mobile Subscriber Identity
LADN Local Area Data Network
LI Lawful Intercept
MEI Mobile Equipment Identifier
MICO Mobile Initiated Connection Only
MME Mobility Management Entity
MO Mobile Originated
MSISDN Mobile Subscriber ISDN
MT Mobile Terminating
N3IWF Non-3GPP InterWorking Function
NAI Network Access Identifier
NAS Non-Access Stratum
NB-IoT Narrow Band IoT
NEF Network Exposure Function
NF Network Function
NGAP Next Generation Application Protocol
NR New Radio
NRF Network Repository Function
NSI Network Slice Instance
NSSAI Network Slice Selection Assistance Information
NSSF Network Slice Selection Function
OCS Online Charging System
OFCS Offline Charging System
PCF Policy Control Function
PDU Packet/Protocol Data Unit
PEI Permanent Equipment Identifier
PLMN Public Land Mobile Network
PRACH Physical Random Access Channel
RAN Radio Access Network
QFI QoS Flow Identity
RM Registration Management
S1-AP S1 Application Protocol
SBA Service Based Architecture
SEA Security Anchor Function
SCM Security Context Management
SI System Information
SIB System Information Block
SMF Session Management Function
SMS Short Message Service
SMSF SMS Function
S-NSSAI Single Network Slice Selection Assistance information
SUCI Served User Correlation ID
SUPI Subscriber Permanent Identifier
TEID Tunnel Endpoint Identifier
UE User Equipment
UL Uplink
UL CL Uplink Classifier
UPF User Plane Function
VPLMN Visited Public Land Mobile Network FIG. 1 and FIG. 2 show examples of system architecture (e.g., 5G system architecture). A 5G access network may comprise an access network in communication with and/or connecting to and a core network (e.g., a 5G core network). An example access network (e.g., a 5G access network) may comprise an access network connected to a core network (e.g., 5G core network). An access network may comprise a RAN 105 (e.g., NG-RAN) and/or a non-3GPP AN. The core network (e.g., 5G core network) may communicate with one or more access networks (e.g., 5G access networks (5G-AN) and/or RANs 105. The 5GC may comprise functional elements or network functions as in example FIG. 1 and example FIG. 2, where interfaces may be employed for communication among the functional elements and/or network elements. A network function may be a processing function in a network that has a functional behavior and interfaces. A network function may be implemented as a network element on a dedicated hardware, a base station, and/or as a software instance running on a dedicated hardware, shared hardware, and/or as a virtualized function instantiated on an appropriate platform.

A wireless device 100 may communicate with the RAN 105. The RAN 105 may comprise an access network. The wireless device 100 may communicate with a first network entity/component (for example and purposes of explanation, an AMF 155) via a second network entity/component (for example and purposes of explanation, a N1 interface). The RAN 105 may communicate with the AMF 155 via a fourth network entity/component (for example and purposes of explanation, an N2 interface). The RAN 105 may communicate with a fifth network entity/component (for example and purposes of explanation, a UPF 110) via a sixth network entity/component (for example and purposes of explanation, an N3 interface). The UPF 110 may communicate with a seventh network entity/component (for example and purposes of explanation, a data network (DN) 115) via an eighth network entity/component (for example and purposes of explanation, an N6 interface). The UPF 110 may communicate with itself and/or another UPF 110 via a ninth network entity/component (for example and purposes of explanation, an N9 interface). The UPF 110 may communicate with a tenth network entity/component (for example and purposes of explanation, an SMF 160) via an eleventh network entity/component (for example and purposes of explanation, an N4 interface). The AMF 155 may communicate with itself and/or another AMF 155 via a twelfth network entity/component (for example and purposes of explanation, an N14 interface). The AMF 155 may communicate with a thirteenth network entity/component (for example and purposes of explanation, an NSSF 120) via a fourteenth network entity/component (for example and purposes of explanation, an N22 interface. The AMF 155 may communicate with a fifteenth network entity/component (for example and purposes of explanation, a UDM 140) via a sixteenth network entity/component (for example and purposes of explanation, an N8 interface). The AMF 155 may communicate with a seventeenth network entity/component (for example and purposes of explanation, an AUSF 150) via an eighteenth network entity/component (for example and purposes of explanation, an N12 interface). The AMF 155 may communicate with a nineteenth network entity/component (for example and purposes of explanation, a PCF 135) via a twentieth network entity/component (for example and purposes of explanation, an N15 interface). The AMF 155 may communicate with the SMF 160 via a twenty-first network entity/component (for example and purposes of explanation, an N11 interface). The AUSF 150 may communicate with the UDM 140 via a twenty-second network entity/component (for example and purposes of explanation, an N13 interface). The UDM 140 may communicate with the SMF 160 via a twenty-third network entity/component (for example and purposes of explanation, an N10 interface). The SMF may communicate with the PCF 135 via twenty-fourth network entity/component (for example and purposes of explanation, an N7 interface). The PCF 135 may communicate with a twenty-fifth network entity/component (for example and purposes of explanation, an application function (AF) 145 via a twenty-sixth network entity/component (for example and purposes of explanation, an N5 interface).

FIG. 2 shows an example system comprising access networks and a core network. The access network may comprise, for example, a RAN 205 and a non-3GPP access network 265 (e.g., untrusted non-3GPP access network). Elements shown in FIG. 2 may correspond to elements in FIG. 1 with like numerals.

The access and mobility management function AMF 155, 255 may comprise one or more of the following functionalities: termination of (R)AN CP interface (N2), termination of NAS (N1), NAS ciphering and integrity protection, registration management, connection management, reachability management, mobility management, lawful intercept (for AMF events and interface to LI system), transport for session management, SM messages between a wireless device 100, 200 and an SMF 160, 260, transparent proxy for routing SM messages, access authentication, access authorization, transport for short message service (SMS) messages between wireless device 100, 200 and an SMS function (SMSF), security anchor function (SEA) interaction with the AUSF 150, 250 and the wireless device 100, 200, receiving an intermediate key established as a result of the wireless device 100, 200 authentication process, security context management (SCM), and/or receiving a key from the SEA to derive access network specific keys. A variety of these functionalities may be supported in a single instance of an AMF 155, 255 and/or in multiple instances of AMF 155, 255 as appropriate.

The AMF 155, 255 may support non-3GPP access networks via an N2 interface with N3IWF 170, 270, NAS signaling with a wireless device 100, 200 over N3IWF 170, 270, authentication of wireless devices connected over N3IWF 170, 270, management of mobility, authentication, and separate security context state(s) of a wireless device 100, 200 connected via non-3GPP access 265 or connected via 3GPP access 105, 205 and non-3GPP accesses 265 simultaneously, support of a coordinated RM context valid over 3GPP access 105, 205 and non-3GPP access 265, and/or support of context management (CM) management contexts for the wireless device 100, 200 for connectivity over non-3GPP access. Some functionalities described above may be supported in an instance of a network slice. An AMF 155, 255 region may comprise of one or multiple AMF 155, 255 sets. AMF 155, 255 set may comprise of some AMFs 155, 255 that serve a given area and/or network slice(s). Multiple AMF 155, 255 sets may be per AMF 155, 255 region and/or network slice(s). Application identifiers may be mapped to one or more specific application traffic detection rules. A configured NSSAI may be a NSSAI that has been provisioned in a wireless device 100, 200. DN 115, 215 access identifier (DNAI), for a DNN, may be an identifier of a user plane access to a DN 115, 215. Initial registration may be related to a wireless device 100, 200 registration in a RM-DEREGISTERED state. N2AP wireless device 100, 200 association may be a logical per wireless device 100, 200 association between a 5G AN node and an AMF 155, 255. Wireless device 100, 200 may comprise a N2AP wireless device-TNLA-binding, which may be a binding between a N2AP wireless device 100, 200 association and a specific transport network layer (TNL) association for a given wireless device 100, 200.

The session management function (SMF) 160, 260 may comprise one or more of the following functionalities: session management (e.g., session establishment, modify and release, comprising tunnel maintain between UPF 110, 210 and an AN such as RAN 105, 205 node), wireless device IP address allocation & management (comprising optional authorization), selection and control of user plane function(s), configuration of traffic steering at UPF 110, 210 to route traffic to its proper destination, termination of interfaces towards policy control functions, control part of policy enforcement and QoS, lawful intercept (for SM events and interface to LI system), termination of SM parts of NAS messages, downlink data notification, initiation of AN specific SM information, sent via AMF 155, 255 over N2 to (R)AN 105, 205, determination of SSC mode of a session, roaming functionality, handling local enforcement to apply QoS SLAs (VPLMN), charging data collection and charging interface (VPLMN), lawful intercept (in VPLMN for SM events and interface to LI system), and/or support for interaction with external DN 115, 215 for transport of signaling for PDU session authorization/authentication by external DN 115, 215. One or more of these functionalities may be supported in a single instance of a SMF 160, 260. One or more of the SMF functionalities may be supported in a single instance of the SMF 160, 260.

The user plane function (UPF) 110, 210 may comprise one or more of the following functionalities: anchor point for Intra-/Inter-RAT mobility (if applicable), external PDU session point of interconnect to DN 115, 215, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, and/or downlink data notification triggering. Some of the UPF functionalities may be supported in a single instance of a UPF 110, 210. One or more of functionalities described above may be supported in an instance of a network slice. User plane function(s) (UPF(s) 110, 210) may handle the user plane path of PDU sessions. A UPF 110, 210 that provides the interface to a data network supports the functionality of a PDU session anchor.

IP address management may comprise allocation and release of the wireless device IP address as well as renewal of the allocated IP address. The wireless device 100, 200 sets the requested PDU type during the PDU session establishment procedure based on its IP stack capabilities and configuration. The SMF 160, 260 may select PDU type of a PDU session as follows: if the SMF 160, 260 receives a request with PDU type set to IP, the SMF 160, 260 may select either PDU type IPv4 or IPv6 based on DNN configuration and/or operator policies. The SMF 160, 260 may also provide a cause value to the wireless device 100, 200 to indicate whether the other IP version (e.g. IPv6 if IPv4 is selected and vice versa) may be supported on the DNN. If the other IP versions are supported, wireless device 100, 200 may request another PDU session to the same DNN for the other IP version. If the SMF 160, 260 receives a request for PDU type IPv4 or IPv6 and the requested IP version may be supported by the DNN, the SMF 160, 260 selects the requested PDU type. The 5GC elements and wireless device 100, 200 support the following mechanisms: during PDU session establishment procedure, the SMF 160, 260 may send the IP address to the wireless device 100, 200 via SM NAS signaling. The IPv4 address allocation and/or IPv4 parameter configuration via DHCPv4 may also be used if the PDU session may be established. IPv6 prefix allocation may be supported via IPv6 stateless auto configuration, if IPv6 may be supported. IPv6 parameter configuration via stateless DHCPv6 may also be supported. The 5GC may support the allocation of a static IPv4 address and/or a static IPv6 prefix based on subscription information in the UDM 140, 240 or based on the configuration on a per-subscriber, per-DNN basis.

The policy control function PCF 135, 235 may support unified policy framework to govern network behavior, provide policy rules to control plane function(s) to enforce them, and/or implement a front end to access subscription information relevant for policy decisions in a user data repository (UDR). The unified data management UDM 140, 240 may comprise an application front end (FE) that comprises the UDM-FE, that may be in charge of processing credentials, location management, and/or subscription management. The PCF 135, 235 may be in charge of policy control and the user data repository (UDR) that stores data required for functionalities provided by UDM-FE, plus policy profiles required by the PCF 135, 235. The data stored in the UDR may comprise at least user subscription data, comprising at least subscription identifiers, security credentials, access and mobility related subscription data, session related subscription data, and/or policy data. The network exposure function NEF 125, 225 may provide a means to securely expose the services and capabilities provided by the 3GPP network functions, translate between information exchanged with the AF 145, 245 and information exchanged with the internal network functions, and/or receive information from other network functions.

The NF repository function NRF 130, 230 may support a service discovery function that receives NF discovery requests from a NF instance, provides the information of the discovered NF instances to the NF instance, and/or maintains the information of available NF instances and their supported services.

The functionality of non-3GPP interworking function N3IWF 170, 270 for non-3GPP access 265 may comprise at least one or more of the following: supporting of IPsec tunnel establishment with the wireless device, terminating the IKEv2/IPsec protocols with the wireless device 100, 200 over NWu, relaying over N2 the information needed to authenticate the wireless device 100 and authorize its access to the 5GC, terminating of N2 and N3 interfaces to 5GC for control-plane and user-plane respectively, relaying uplink and downlink control-plane NAS (N1) signaling between the wireless device 100, 200 and AMF 155, 255, handling of N2 signaling from SMF 160, 260 (which may be relayed by AMF 155, 255) related to PDU sessions and QoS, establishing of IPsec security association (IPsec SA) to support PDU session traffic, relaying uplink and downlink user-plane packets between the wireless device 100, 200 and UPF 110, 210, enforcing QoS corresponding to N3 packet marking, considering QoS requirements associated to such marking received over N2, N3 user-plane packet marking in the uplink, local mobility anchor within untrusted non-3GPP access networks 265 using MOBIKE, and/or supporting AMF 155, 255 selection.

The application function AF 145, 245 may interact with the 3GPP core network to provide a variety of services. Based on operator deployment, AF 145, 245 may be trusted by the operator to interact directly with relevant network functions. Application functions not provided by the operator to access directly the network functions may use the external exposure framework (via the NEF 125, 225) to interact with relevant network functions.

The control plane interface between the (R)AN 105, 205 and the 5GC may support connection of multiple different kinds of ANs, such as 3GPP (R)AN 105, 25 and/or N3IWF 170, 270, to the 5GC via a unique control plane protocol. A single N2 AP protocol may be employed for both the 3GPP access 105, 205 and non-3GPP access 265 and/or for decoupling between AMF 155, 255 and other functions such as SMF 160, 260 that may need to control the services supported by AN(s) (e.g. control of the UP resources in the AN 105, 205 for a PDU session). The 5GC may be able to provide policy information from the PCF 135, 235 to the wireless device 100, 100. Such policy information may comprise the following: access network discovery & selection policy, wireless device route selection policy (URSP) that groups to or more of SSC mode selection policy (SSCMSP), network slice selection policy (NSSP), DNN selection policy, and/or non-seamless offload policy. The 5GC may support the connectivity of a wireless device 100, 200 via non-3GPP access networks 265. As shown in example FIG. 5, the registration management, RM may be employed to register or de-register a wireless device 100, 200 with the network, and establish the user context in the network. Connection management may be employed to establish and release the signaling connection between the wireless device 100, 200 and the AMF 155, 255.

A wireless device 100, 200 may need to register with the network to receive services that require registration. The wireless device 100, 200 may update its registration with the network, for example, periodically, after the wireless device is registered, to remain reachable (e.g. periodic registration update), on mobility (e.g. mobility registration update), and/or to update its capabilities or re-negotiate protocol parameters. An initial registration procedure, such as in the examples shown in FIG. 8 and FIG. 9, may involve execution of network access control functions (e.g. user authentication and access authorization based on subscription profiles in UDM 140, 240). As result of the registration procedure, the identity of the serving AMF 155, 255 may be registered in UDM 140, 240. The registration management (RM) procedures may be applicable over both 3GPP access 105, 205 and non-3GPP access 265.

Figure 3:
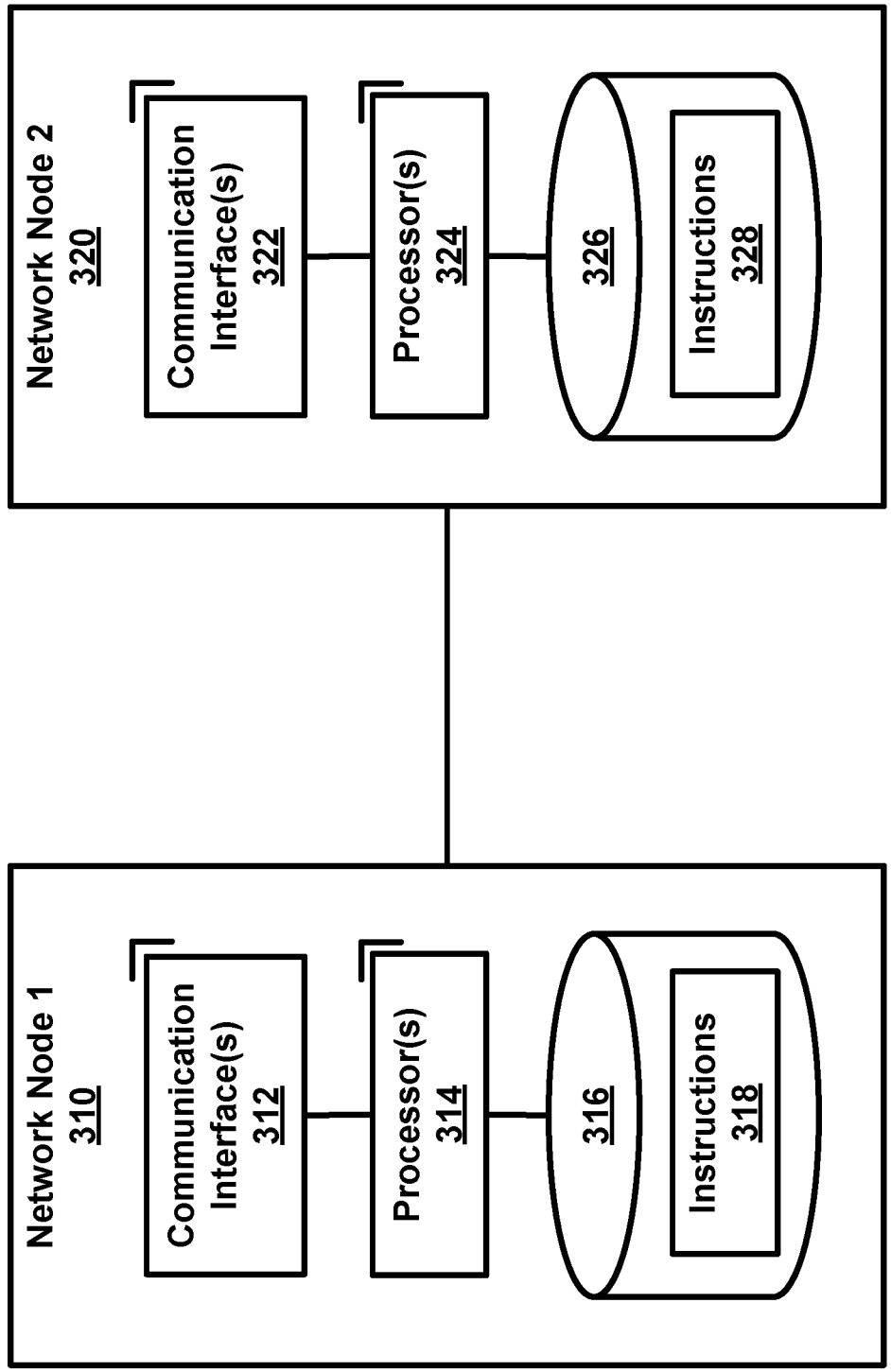
FIG. 3 shows an example of one or more network nodes.
Figure 4A:
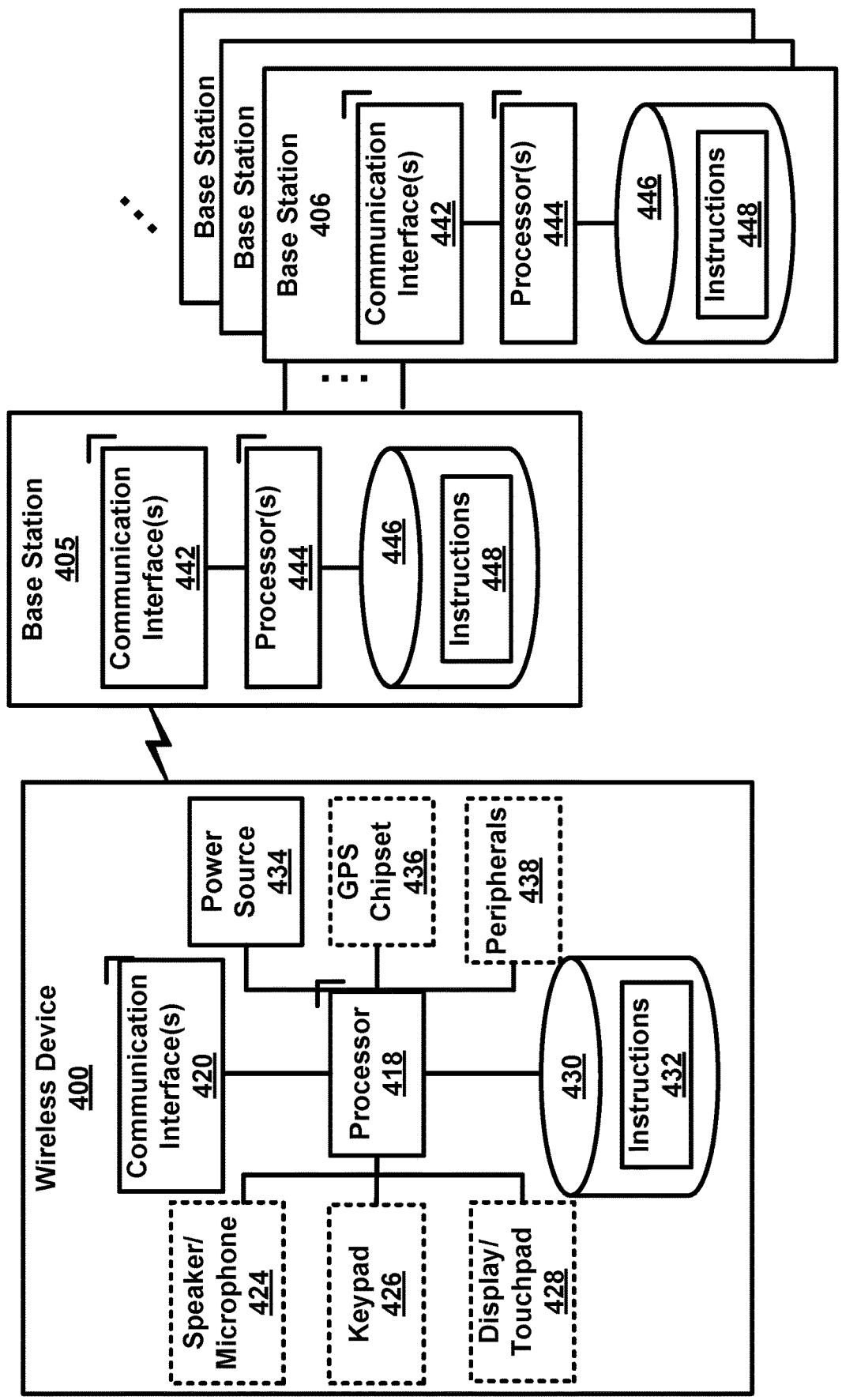
FIG. 4A shows an example of a wireless device and one or more base stations.
Figure 4B:
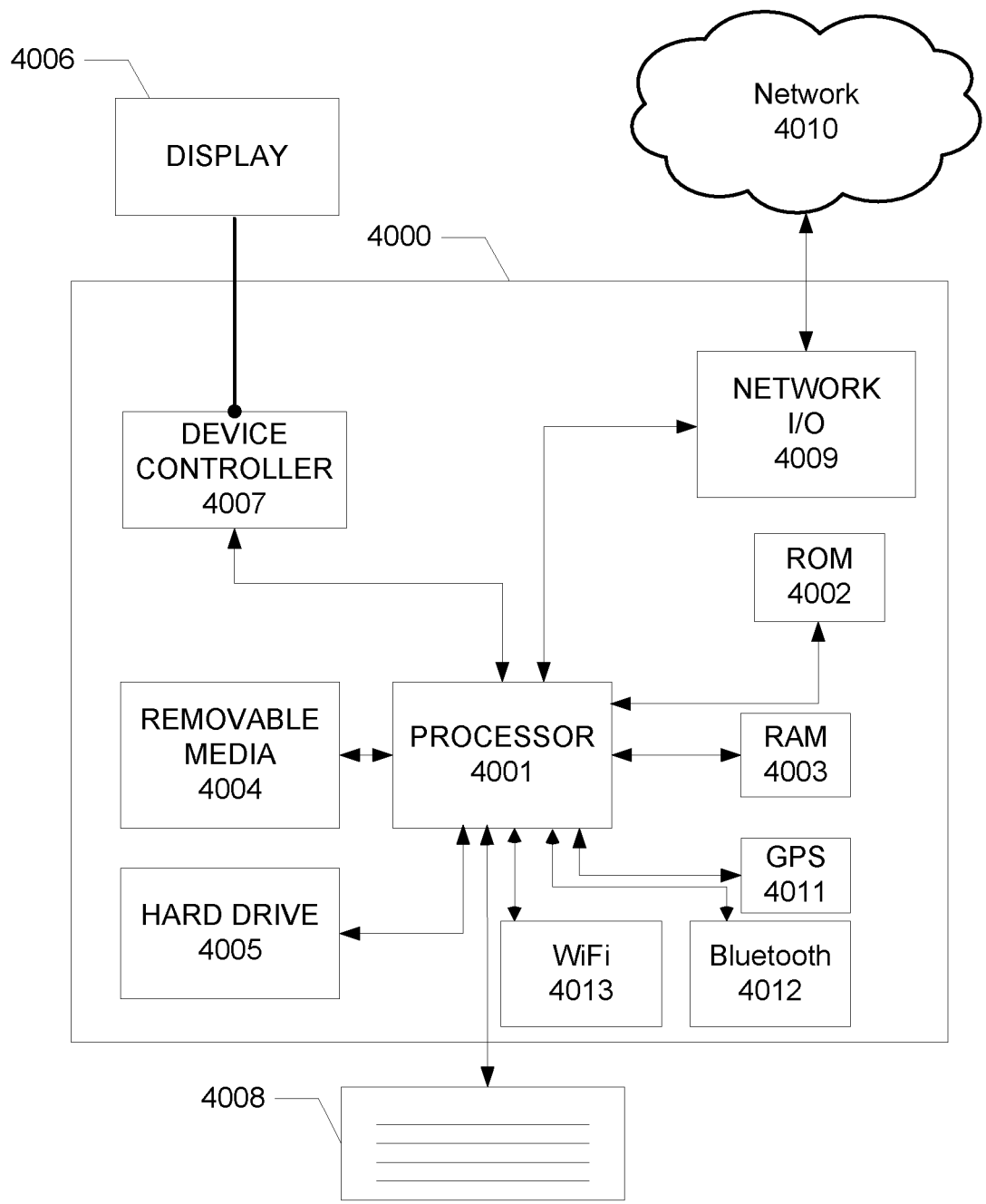
FIG. 4B shows example elements of computing devices that may be used to implement any of the various devices described herein.

FIG. 3 shows hardware elements of a first network node 310 (e.g., a wireless device) and a second network node 320 (e.g., a base station). A communication network may include at least one first network node 310 and at least one second network node 320. The first network node 310 may include one or more communication interface 312, one or more processors 314, and one or more sets of program code instructions 318 stored in non-transitory memory 316 and executable by the one or more processors 314. The second network node may include one or more communication interface 322, one or more processors 324, and one or more sets of program code instructions 328 stored in non-transitory memory 326 and executable by the one or more processors 324. A communication interface 312 in the first network node 310 may be configured to engage in communication with a communication interface 22 in the second network node 320, such as via a communication path that includes at least one wireless link. The wireless link may be a bi-directional link. The communication interface 322 in the second network node 320 may be configured to engage in communication with the communication interface 312 in the first network node 310. The first network node 310 and the second network node 320 may be configured to send and receive data over the wireless link using multiple frequency carriers. Network nodes, base stations, wireless devices, and other communication devices may include structure and operations of transceiver(s). A transceiver is a device that includes both a transmitter and receiver. Transceivers may be employed in devices such as wireless devices, base stations, relay nodes, and/or the like. Examples for radio technology implemented in the communication interfaces 312, 322 and the wireless link are shown in FIG. 3, FIGS. 4A, and 4B, and associated text. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a Wi-Fi access point), a computing device, a device capable of wirelessly communicating, and/or any other device capable of sending and/or receiving signals. As used throughout, the term "wireless device" may comprise one or more of: a UE, a handset, a mobile device, a computing device, a node, a device capable of wirelessly communicating, and/or any other device capable of sending and/or receiving signals. Any reference to one or more of these terms/devices also considers use of any other term/device mentioned above.

The communications network may comprise Radio Access Network (RAN) architecture. The RAN architecture may comprise one or more RAN nodes that may be a next generation Node B (gNB) (e.g., 320) providing New Radio (NR) user plane and control plane protocol terminations towards a first network node (e.g. 310) such as a wireless device. A RAN node may be a next generation evolved Node B (ng-eNB), providing Evolved UMTS Terrestrial Radio Access (E-UTRA) user plane and control plane protocol terminations towards a second wireless device. A first network node 310 (e.g., a wireless device) may communicate with a base station (e.g., a gNB) over a Uu interface. A second wireless device may communicate with a base station (e.g., an ng-eNB) over a Uu interface. The second network node 320 may comprise one or more of a gNB, ng-eNB, and/or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_INACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, for example, packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between 3rd Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

FIG. 4A shows general hardware elements that may be used to implement any of the various computing devices discussed herein, including any base station, wireless device, or computing device. The computing device 400 (e.g., wireless device) may include one or more processors 418, which may execute instructions stored in memory, such as non-removable memory 430, removable memory 432 (such as a Universal Serial Bus (USB) drive, compact disk (CD) or digital versatile disk (DVD), or floppy disk drive), or any other desired storage medium. Instructions may also be stored in an attached (or internal) hard drive. The computing device 400 may also include a security processor (not shown), which may execute instructions of a one or more computer programs to monitor the processes executing on the processor 418 and any process that requests access to any hardware and/or software components of the computing device 400 (e.g., the non-removable memory 430, the removable memory 432, the hard drive, a device controller (e.g., a keypad 426, a display and/or touchpad 428, a speaker and/or microphone 424, and/or one or more peripherals 438), a transceiver 420, a network interface, a GPS 436 (e.g., a GPS chipset), a Bluetooth interface, a Wi-Fi interface, etc.). The computing device 400 may include one or more output devices, such as the display and/or touchpad 428 (e.g., a screen, a display device, a monitor, a television, etc.), and may include one or more output device controllers, such as a video processor. There may also be one or more user input devices, such as a remote control, keyboard, mouse, touch screen, microphone, etc., that may be configured, for example, as one or more of the peripherals 438. The computing device 400 may also include one or more network interfaces, such as a network interface, the may be a wired interface, a wireless interface such as the transceiver 420, or a combination of the two. The network interface may provide an interface for the computing device 400 to communicate (e.g., via wireless or wired communications) with a network (e.g., a RAN, or any other network). The network interface may include a modem (e.g., a cable modem), and the external network may include communication links, an external network, an in-home network, a provider's wireless, coaxial, fiber, or hybrid fiber/coaxial distribution system (e.g., a DOCSIS network), or any other desired network. Additionally, the computing device 400 may include a location-detecting device, such as a global positioning system (GPS) chipset or microprocessor 436, which may be configured to receive and process global positioning signals and determine, with possible assistance from an external server and antenna, a geographic position of the computing device 400.

The wireless device 400 may communicate with a first base station 405 and/or one or more second base stations 406. The first base station 405 may comprise one or more of a communication interface 442, processor 444, memory 446, instructions 448, and/or any of element, including any element described above regarding the wireless device 400. The one or more second base stations 406 may comprise one or more of a communication interface 442, processor 444, memory 446, instructions 448, and/or any of element, including any element described above regarding the wireless device 400. The first base station 405 may communicate with the wireless device 400 and/or the one or more second base stations 406 via communication interface 442. The one or more second base stations 406 may communicate with the wireless device 405 and/or the first base station via communication interface 442.

FIG. 4B shows general hardware elements that may be used to implement any of the various computing devices discussed herein, including, e.g., the network node 310, the network node 320, the wireless device 400, the base station 405, the base stations 406, or any other network node, base station, wireless device, or computing device described herein. The computing device 4000 may include one or more processors 4001, which may execute instructions stored in the random access memory (RAM) 4003, the removable media 4004 (such as a Universal Serial Bus (USB) drive, compact disk (CD) or digital versatile disk (DVD), or floppy disk drive), or any other desired storage medium. Instructions may also be stored in an attached (or internal) hard drive 4005. The computing device 4000 may also include a security processor (not shown), which may execute instructions of one or more computer programs to monitor the processes executing on the processor 4001 and any process that requests access to any hardware and/or software components of the computing device 4000 (e.g., ROM 4002, RAM 4003, the removable media 4004, the hard drive 4005, the device controller 4007, a network interface 4009, a GPS 4011, a Bluetooth interface 4012, a Wi-Fi interface 4013, etc.). The computing device 4000 may include one or more output devices, such as the display 4006 (e.g., a screen, a display device, a monitor, a television, etc.), and may include one or more output device controllers 4007, such as a video processor. There may also be one or more user input devices 4008, such as a remote control, keyboard, mouse, touch screen, microphone, etc. The computing device 4000 may also include one or more network interfaces, such as a network interface 4009, which may be a wired interface, a wireless interface, or a combination of the two. The network interface 4009 may provide an interface for the computing device 4000 to communicate with a network 4010 (e.g., a RAN, or any other network). The network interface 4009 may include a modem (e.g., a cable modem), and the external network 4010 may include communication links, an external network, an in-home network, a provider's wireless, coaxial, fiber, or hybrid fiber/coaxial distribution system (e.g., a DOCSIS network), or any other desired network.

Additionally, the computing device 4000 may include a location-detecting device, such as a global positioning system (GPS) microprocessor 4011, which may be configured to receive and process global positioning signals and determine, with possible assistance from an external server and antenna, a geographic position of the computing device 4000.

The examples in FIGS. 4A and 4B are hardware configurations, although the components shown may be implemented as software as well. For example, modifications may be made to add, remove, combine, divide, etc. components of the computing device 4000 as desired. Additionally, the components may be implemented using basic computing devices and components, and the same components (e.g., processor 4001, ROM storage 4002, display 4006, etc.) may be used to implement any of the other computing devices and components described herein. For example, the various components described herein may be implemented using computing devices having components such as a processor executing computer-executable instructions stored on a computer-readable medium, as shown in FIG. 4. Some or all of the entities described herein may be software based, and may co-exist in a common physical platform (e.g., a requesting entity may be a separate software process and program from a dependent entity, both of which may be executed as software on a common computing device).

Base stations, wireless devices, relay nodes, and other communication devices may comprise one or more transceivers. A transceiver may be a device that comprises both a transmitter and receiver. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment. Although one or more of the above types of devices may be referenced herein (e.g., user equipment, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., a wireless device, base station, eNB, gNB, computing device, etc.), in one or more networks, but it will be understood that one or more features and/or steps may be implemented on any device and/or in any network. As used throughout, the term "base station" may comprise one or more of: a base station, a node, a Node B, a gNB, an eNB, am ng-eNB, a relay node (e.g., an integrated access and backhaul (IAB) node), a donor node (e.g., a donor eNB, a donor gNB, etc.), an access point (e.g., a Wi-Fi access point), a computing device, a device capable of wirelessly communicating, and/or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

Figure 5A:
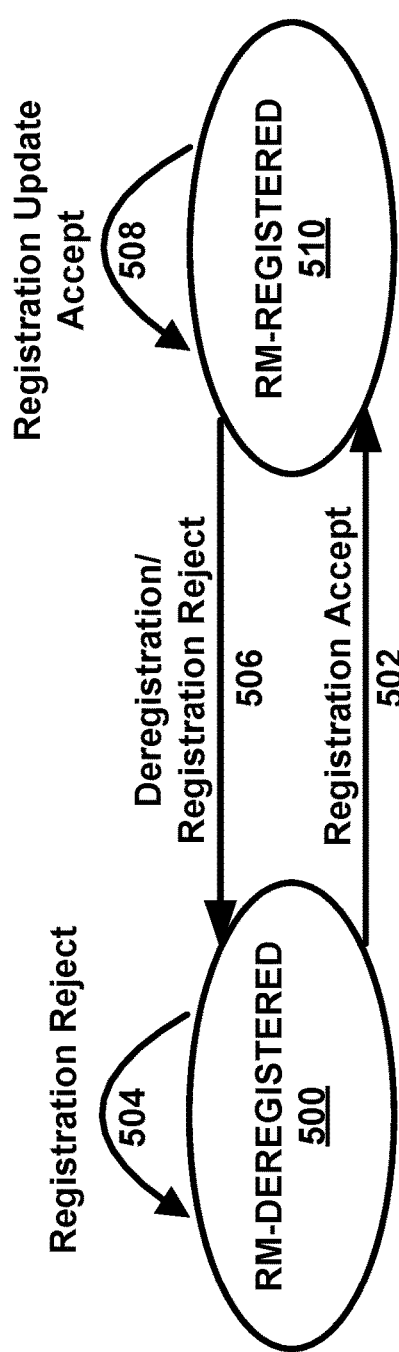
FIG. 5A and FIG. 5B show example registration management state transitions for a wireless device and an access and mobility management function (AMF).
Figure 5B:

FIG. 5A and FIG. 5B depict examples of the RM states of a wireless device, such as the wireless device 100, 200 as observed by the wireless device 100, 200 and AMF 155, 255. FIG. 5A shows RM state transition in the wireless device. Two RM states may be used in a wireless device 100, 200 (and possibly in the AMF 155, 255) that may reflect the registration status of the wireless device 100, 200 in the selected PLMN. The registration status of the wireless device 100, 200 in the selected PLMN may be RM-DEREGISTERED 500 or RM-REGISTERED 510. In the RM DEREGISTERED state 500, the wireless device 100, 200 may not be registered with a network. The wireless device 100, 200 context in AMF 155, 255 may not hold valid location or routing information for the wireless device 100, 200 so the wireless device 100, 200 may be not reachable by the AMF 155, 255. Some wireless device context may still be stored in the wireless device 100, 200 and the AMF 155, 255. In the RM REGISTERED state 510, the wireless device 100, 200 may be registered with the network. In the RM-REGISTERED 510 state, the wireless device 100, 200 may receive services that require registration with the network.

FIG. 5B shows RM state transitions in the AMF 155, 255. Two RM states may be used in the AMF 155, 255 for the wireless device 100, 200 that reflect the registration status of the wireless device 100, 100 in the selected PLMN. The two RM states that may be used in the AMF 155, 255 for the wireless device 100, 200 in the selected PLMN may be RM-DEREGISTERED 520 or RM-REGISTERED 530. The state of RM-DEREGISTERED 500 in the wireless device 100, 200 may correspond to the state of RM-DEREGISTERED 520 in the AMF 155, 255. The state of RM-REGISTERED 510 in the wireless device 100, 200 may correspond to the state of RM-REGISTERED 530 in the AMF 155, 255.

FIG. 6A and FIG. 6B depict examples of CM state transitions as observed by the wireless device 100 and AMF 155. Connection management CM may comprise the functions of establishing and releasing a signaling connection between a wireless device 100, 200 and the AMF 155, 255 over N1. This signaling connection may be used to provide NAS signaling exchange between the wireless device 100, 200 and a core network. The signaling connection may comprise both the AN signaling connection between the wireless device 100, 200 and/or the (R)AN 105, 205 (e.g. RRC connection over 3GPP access) and the N2 connection for this wireless device 100, 200 between the AN and the AMF 155, 255. FIG. 6A shows CM state transitions in the wireless device 100, 200. Two CM states may be used for the NAS signaling connectivity of the wireless device 100, 200 with the AMF 155, 255: CM-IDLE 600 and CM-CONNECTED 610. A wireless device 100, 200 in CM-IDLE 600 state may be in RM-REGISTERED 510 state that may have no NAS signaling connection established with the AMF 155, 255 over N1. The wireless device 100, 200 may perform cell selection, cell reselection, and PLMN selection. A wireless device 100, 200 in CM-CONNECTED 610 state may have a NAS signaling connection with the AMF 155, 255 over N1. RRC inactive state may apply to NG-RAN (e.g., it applies to NR and E-UTRA connected to 5G CN). The AMF 155, 255 may provide (e.g., based on network configuration) assistance information to the NG (R)AN 105, 205, for example, to assist the NG (R)AN's 105, 205 decision as to whether the wireless device 100, 200 may be sent to RRC inactive state. If a wireless device 100, 200 may be CM-CONNECTED 610 with RRC inactive state, the wireless device 100, 200 may resume the RRC connection (e.g., due to uplink data pending), may execute a mobile initiated signaling procedure (e.g., as a response to (R)AN 105, 205 paging), and/or notify the network that it has left the (R)AN 105, 205 notification area. NAS signaling connection management may comprise the functions of establishing and releasing a NAS signaling connection. NAS signaling connection establishment function may be provided by the wireless device 100, 200 and the AMF 155, 255 to establish a NAS signaling connection for a wireless device 100, 200 in CM-IDLE 600 state. The procedure of releasing a NAS signaling connection may be initiated by the 5G (R)AN 105, 205 node or the AMF 155, 255.

FIG. 6B shows CM state transitions in the AMF 155, 255. Two CM states may be used for a wireless device 100, 200 at the AMF 155, 255: CM-IDLE 620 and CM-CONNECTED 630. The state of CM-IDLE 600 in the wireless device 100, 200 may correspond to the state of CM-IDLE 620 in the AMF 155, 255. The state of CM-CONNECTED 610 in the wireless device 100, 200 may correspond to the state of CM-CONNECTED 630 in the AMF 155, 255. Reachability management of the wireless device 100, 200 may detect whether a wireless device 100, 200 may be reachable and/or provide the wireless device location (e.g., the access node in communication with the wireless device) for the network to reach the wireless device 100, 200. This may be done by paging wireless device 100, 200 and wireless device location tracking. The wireless device location tracking may comprise both wireless device registration area tracking and wireless device reachability tracking. Such functionalities may be either located at a 5GC (e.g., for a CM-IDLE 620 state) or an NG-RAN 105, 205 (e.g., for a CM-CONNECTED 630 state).

The wireless device 100, 200 and the AMF 155, 255 may negotiate wireless device 100, 200 reachability characteristics in CM-IDLE 600 and/or 620 states during registration and registration update procedures. A variety of wireless device reachability categories may be negotiated between a wireless device 100, 200 and an AMF 155, 255 for CM-IDLE 600 and/or 620 states, such as wireless device 100, 200 reachability providing mobile device terminated data. The wireless device 100, 200 may be CM-IDLE 600 mode and mobile initiated connection only (MICO) mode. The 5GC may support a PDU connectivity service that provides exchange of PDUs between a wireless device 100, 200 and a data network identified by a DNN. The PDU connectivity service may be supported via PDU sessions that may be established, for example, after request from the wireless device 100, 200.

A PDU session may support one or more PDU session types. PDU sessions may be established (e.g., after wireless device 100, 200 request), modified (e.g., after wireless device 100 and 5GC request) and released (e.g., after wireless device 100, 200 and 5GC request) using NAS SM signaling exchanged over N1 between the wireless device 100, 200 and the SMF 160, 260. The 5GC may be able to trigger a specific application in the wireless device 100 (e.g., after a request from an application server). If receiving that trigger message, the wireless device 100, 200 may pass it to the identified application in the wireless device 100, 200. The identified application in the wireless device 100, 200 may establish a PDU session to a specific DNN.

Figure 7:
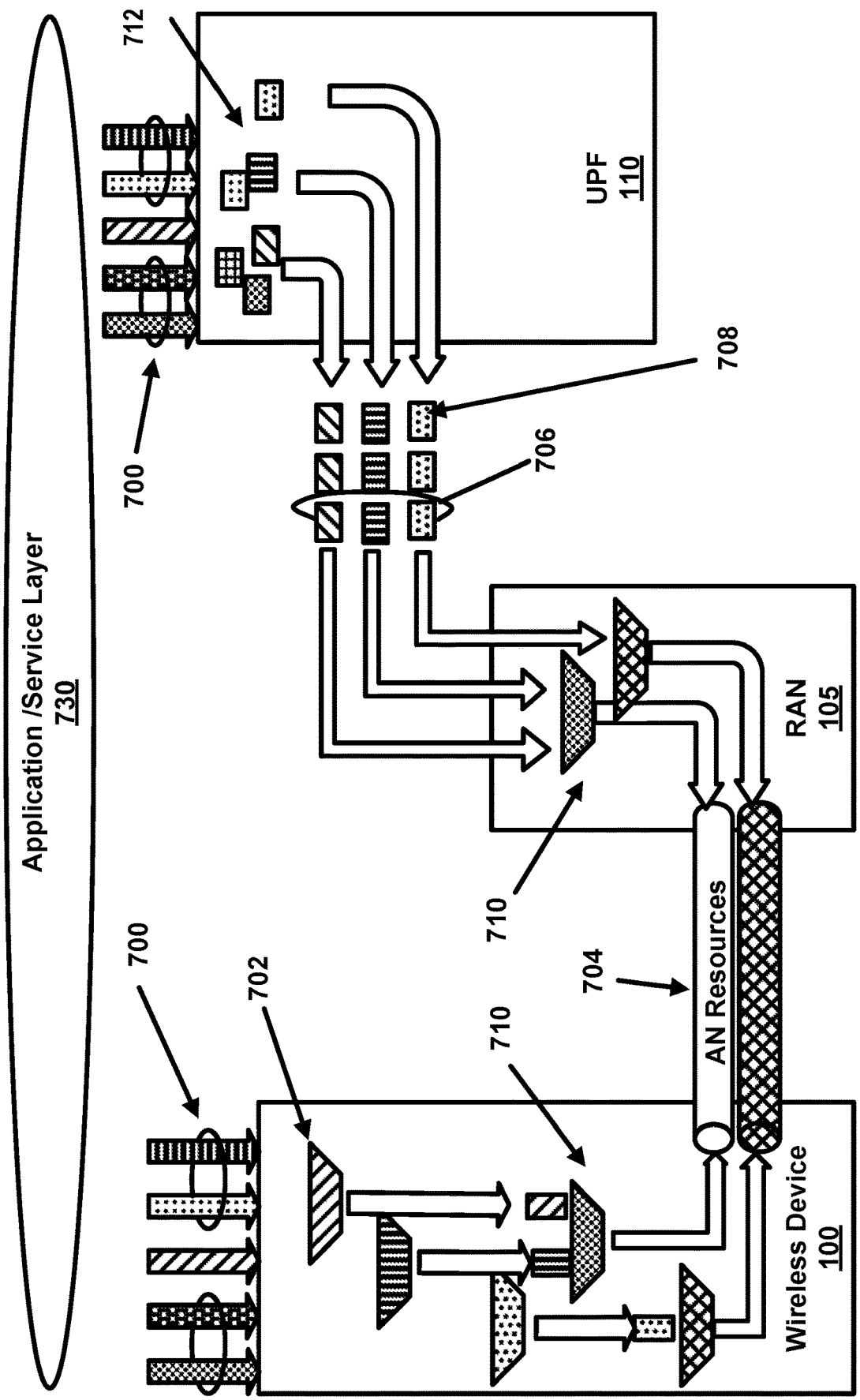
FIG. 7 shows an example for classification and marking traffic.

FIG. 7 shows an example of a QoS flow based framework. A QoS model (e.g., a 5G QoS model) may support the QoS flow based framework. The QoS model may support both QoS flows that require a guaranteed flow bit rate and QoS flows that may not require a guaranteed flow bit rate. The QoS model may also support reflective QoS. The QoS model may comprise flow mapping or packet marking at the CN_UP 720, AN 710, and/or wireless device 700. Packets may arrive from and/or destined to the application/service layer 730 of wireless device 700, CN_UP 720, and/or an AF (e.g., the AF 145). QoS flow may be granular of QoS differentiation in a PDU session. A QoS Flow IDQFI may be used to identify a QoS flow in a 5G system. User plane traffic with the same QFI within a PDU session may receive the same traffic forwarding treatment. The QFI may be carried in an encapsulation header on N3 (and N9), for example, without any changes to an end-to-end packet header. The QFI may be used with PDUs having different types of payload. The QFI may be unique within a PDU session.

The QoS parameters of a QoS flow may be provided to the (R)AN as a QoS profile over N2 at a PDU session or at a QoS flow establishment, and an NG-RAN may be used, for example, if the user plane may be activated. A default QoS rule may be utilized for every PDU session. An SMF (e.g., SMF 160, 260) may allocate the QFI for a QoS flow and may derive its QoS parameters from the information provided by the PCF. The SMF 160, 260 may provide the QFI together with the QoS profile containing the QoS parameters of a QoS flow to the (R)AN 710. QoS flow may be granular for QoS forwarding treatment in a system (e.g., a 5GS). Traffic mapped to the same QoS flow may receive the same forwarding treatment (e.g., scheduling policy, queue management policy, rate shaping policy, RLC configuration, and/or the like). Providing different QoS forwarding treatment may require separate QoS flow. A QoS indicator may be used as a reference to a specific QoS forwarding behavior (e.g., packet loss rate, and/or packet delay budget) to be provided to a QoS flow. This QoS indicator may be implemented in the access network by the 5QI referencing node specific parameters that control the QoS forwarding treatment (e.g., scheduling weights, admission thresholds, queue management thresholds, link layer protocol configuration, and/or the like.).

One or more devices (e.g., a 5GC) may support edge computing and may provide operators and/or third party services to be hosted close to the wireless device access point of attachment. The one or more devices (e.g., a 5GC) may select a UPF 110, 210 close to the wireless device 100, 210 and may execute the traffic steering from the UPF 110, 210 to the LADN via a N6 interface. This selecting a UPF 110, 210 close to the wireless device may be based on the wireless device subscription data, wireless device location, the information from application function AF 145, 245, policy, and/or other related traffic rules. The one or more devices (e.g., a 5GC) may expose network information and capabilities to an edge computing application function. The functionality support for edge computing may comprise local routing where the one or more devices (e.g., a 5GC) may select UPF 110, 210 to route the user traffic to the LADN, traffic steering where the one or more devices (e.g., a 5GC) selects the traffic to be routed to the applications in the LADN, session and service continuity to provide wireless device 100, 200 and application mobility, user plane selection and reselection (e.g., based on input from application function), network capability exposure where the one or more devices (e.g., a 5GC) and application function may provide information to each other via NEF, QoS and charging where PCF may provide rules for QoS control and charging for the traffic routed to the LADN, and/or support of local area data network where the one or more devices (e.g., a 5GC) may provide support to connect to the LADN in a certain area where the applications are deployed.

An example system (e.g., a 5GS) may be a 3GPP system comprising of 5G access network 105, 205, 5GC and a wireless device 100, 200, and/or the like. Provided NSSAI may be an NSSAI provided by a serving PLMN, for example, during a registration procedure, indicating the NSSAI provided by the network for the wireless device 100, 200 in the serving PLMN for the current registration area. A periodic registration update may be wireless device 100, 200 re-registration at expiry of a periodic registration timer. A requested NSSAI may be a NSSAI that the wireless device 100, 200 may provide to the network. A service-based interface may represent how a set of services may be provided/exposed by a given NF.

A PDU connectivity service may provide exchange of PDUs between a wireless device 100, 200 and a data network. PDU session may be an association between a wireless device 100 and a data network, DN that provides a PDU connectivity service. The type of association may be IP, Ethernet, or unstructured. Service continuity may comprise an uninterrupted user experience of a service, for example, if the IP address and/or anchoring point change. Session continuity may comprise the continuity of a PDU session. For a PDU session of an IP type session, continuity may indicate that the IP address may be preserved for the lifetime of the PDU session. An uplink classifier may be a UPF functionality that aims at diverting uplink traffic, for example, based on filter rules provided by SMF, towards a data network.

The system architecture may support data connectivity and services enabling deployments to use techniques such as, but not limited to, network function virtualization and/or software defined networking. The system architecture may leverage service-based interactions between control plane (CP) network functions where identified. In system architecture, separation of the user plane (UP) functions from the control plane functions may be considered. A system may provide a network function to interact with other NF(s) directly if required. A system may reduce dependencies between the access network (AN) and the core network (CN). The architecture may comprise a converged access-agnostic core network with a common AN-CN interface that integrates different 3GPP and non-3GPP access types. A system furthermore may support a unified authentication framework, stateless NFs (e.g., where the compute resource may be decoupled from the storage resource), capability exposure, and/or concurrent access to local and centralized services. UP functions may be deployed close to the access network, for example, to support low latency services and access to LADNs.

A system may support roaming with both home routed traffic as well as local breakout traffic in the visited PLMN. An example architecture may be service-based and the interaction between network functions may be represented in a variety of ways. FIG. 1 shows an example service-based representation, where network functions within the control plane may provide other authorized network functions to access their services. This service-based representation shown in FIG. 1 may also comprise point-to-point reference points where necessary. FIG. 1 shows an example reference point representation, showing the interaction between the NF services in the network functions described by point-to-point reference point (e.g., N11) between any two network functions.

A network slice may comprise or be associated with the core network control plane and/or user plane network functions such as, for example, a 5G RAN, the N3IWF functions to the non-3GPP Access Network, and/or the like. Network slices may support differing features and/or network function implementations. An operator may deploy multiple network slice instances delivering the same features for different groups of wireless devices, to deliver different committed service, and/or because the network slice instances may be dedicated to an individual customer. The NSSF 120 may store the mapping information between a slice instance ID and an NF ID (and/or NF address).

A wireless device 100, 200 may simultaneously be served by one or more network slice instances via, for example, a 5G-AN. The wireless device 100, 200 may be served by k network slices (e.g., k=8, 16, etc.) at a time. An AMF 155, 255 instance serving the wireless device 100, 200 may belong to a network slice instance serving the wireless device 100.

A PDU session may belong to one specific network slice instance per PLMN. Different network slice instances may not share a PDU session. Different slices may have slice-specific PDU sessions using the same DNN, or different DNNs.

A Single Network Slice Selection Assistance Information (S-NSSAI) may indicate (e.g., identify) a network slice. An S-NSSAI may comprise a slice/service type (SST) and/or a slice differentiator (SD). The SST may refer to the expected network slice behavior in terms of features and services. An SD may be optional information that may complement the slice/service type(s), for example, to allow further differentiation for selecting a network slice instance from potentially multiple network slice instances that comply with the indicated slice/service type. The same network slice instance may be selected using different S-NSSAIs. The CN part of a network slice instance(s) serving a wireless 100, 200 may be selected by the CN.

Subscription data may include the S-NSSAI(s) of the network slices to which the wireless device 100, 200 may subscribe. One or more S-NSSAIs may be indicated (e.g., marked) as a default S-NSSAI. k S-NSSAI may be indicated (e.g., marked) as a default S-NSSAI (e.g., k=8, 16, etc.). The wireless device 100, 200 may subscribe to more than 8 S-NSSAIs, or up to or more than any other quantity of S-NSSAIs.

A wireless device 100, 200 may be configured, by the HPLMN, with a configured NSSAI per PLMN. The wireless device 100, 200 may obtain, from the AMF 155, an allowed NSSAI for a PLMN (which may include one or more S-NSSAIs), for example, based on or after successful completion of a wireless device's registration procedure.

The allowed NSSAI may take precedence over the configured NSSAI, for example, for a PLMN. The wireless device 100, 200 may use the S-NSSAIs in the allowed NSSAI corresponding to a network slice for the subsequent network slice selection related procedures in the serving PLMN.

The establishment of user plane connectivity to a data network via a network slice instance(s) may comprise: performing an RM procedure to select an AMF 155, 255 that supports the required network slices, establishing one or more PDU sessions to the required data network via the network slice instance(s), and/or the like.

The wireless device 100, 200 may provide a requested NSSAI to the network in the RRC and NAS layer. The requested NSAAI may comprise the S-NSSAI(s) corresponding to the slice(s) to which the wireless device 100, 200 attempts to register, a temporary user ID if one was assigned to the wireless device 100, 200 and/or the like. The wireless device 100, 200 may provide the requested NSSA, for example, if the wireless device 100, 200 registers with a PLMN, and/or if the wireless device 100, 200 for the PLMN has a configured NSSAI or an allowed NSSAI. The requested NSSAI may be a configured-NSSAI, an allowed-NSSAI, and/or the like. The RAN 105, 205 may route NAS signaling to and/or from the wireless device 100, 200 to and/or from a default AMF 155, 255. The RAN 105, 205 may route NAS signaling to and/or from the wireless device 100, 200 to and/or from a default AMF 155, 255, for example, if a wireless device 100, 200 registers with a PLMN and does not have a configured NSSAI or allowed NSSAI for the PLMN.

The network may change the set of permitted network slice(s) to which the wireless device 100, 200 is registered. The network may change the set of permitted network slice(s) to which the wireless device 100, 200 is registered, for example, based on local policies, subscription changes, and/or wireless device 100, 200 mobility. The network may change the set of permitted network slice(s) for a registration procedure. The network may trigger a notification to be sent to the wireless device 100, notifying the wireless device 100 of the change of the supported network slices using an RM procedure (which may trigger a registration procedure). The network may provide the wireless device 100 with a new allowed NSSAI and tracking area list.

For a registration procedure in a PLMN, the AMF 155, 255 that first receives the registration request may redirect the registration request to another AMF 155, 255 via the RAN 105, 205 and/or via direct signaling between the initial AMF 155, 255 and the target AMF 155, 255. The AMF 155, 255 that first receives the registration request may redirect the registration request to another AMF 155, 255 via the RAN 105, 205 and/or via direct signaling between the initial AMF 155, 255 and the target AMF 155, 255, for example, if the network decides that the wireless device 100, 200 should be served by a different AMF 155, 255, for example, based on network slice(s) aspects.

The network operator may provision the wireless device 100 with an NSSP. The NSSP may comprise one or more NSSP rules.

The wireless device 100, 200 may route the user data of the application in one or more of the PDU sessions. The wireless device 100, 200 may route the user data of the application in one or more of the PDU sessions, for example, if a wireless device 100, 200 has one or more established PDU sessions corresponding to the a specific S-NSSAI, unless other conditions in the wireless device 100, 200 prohibit the use of the PDU sessions. The wireless device 100, 200 may consider the DNN to determine which PDU session to use if the application provides a DNN. The wireless device 100, 200 may request a new PDU session corresponding to the S-NSSAI. The wireless device 100, 200 may request a new PDU session corresponding to the S-NSSAI, for example, with the DNN that may be provided by the application, if the wireless device 100, 200 does not have a PDU session established with the specific S-NSSAI. The RAN 105, 205 may be aware of the network slices used by the wireless 100, 200 in order for the RAN 105, 205 to select a proper resource for supporting network slicing in the RAN 105, 205.

An AMF 155, 255 may select an SMF 160, 260 in a network slice instance, for example, based on the S-NSSAI, DNN, and/or other information (e.g., wireless device 100, 200 subscription and local operator policies, and/or the like). An AMF 155, 255 may select an SMF 160, 260 in a network slice instance based on the S-NSSAI, DNN, and/or other information, for example, if the wireless device 100, 200 triggers the establishment of a PDU session. The selected SMF 160, 260 may establish the PDU session based on the S-NSSAI and DNN.

The wireless device 100, 200 may or may not include the NSSAI in NAS signaling. The wireless device 100, 200 may not include the NSSAI in NAS signaling, for example, in order to support network-controlled privacy of slice information for the slices that the wireless device 100, 200 may access. The wireless device 100, 200 may not include the NSSAI in NAS signaling, for example, unless the wireless device 100, 200 has a NAS security context. The wireless device 100, 200 may not include NSSAI, for example, in unprotected RRC signaling. The wireless device 100, 200 may not include NSSAI, for example, if the wireless device 100, 200 is aware of or configured such that privacy considerations are used for the NSSAI.

Network slice specific network functions in VPLMN and HPLMN may be selected, for example, for a wireless device that may be roaming. The network slice specific network functions in VPLMN and HPLMN may be selected, for example, based on the S-NSSAI provided by the wireless device 100, 200 PDU connection establishment. Selection of slice specific NF instances may be performed by each PLMN or by one or more PLMNs. Selection of slice specific NF instances may be performed by a PLMN, for example, if a standardized S-NSSAI is used. Selection of slice specific NF instances may be performed by a PLMN, for example, based on the provided S-NSSAI. The VPLMN may map the S-NSSAI of HPLMN to a S-NSSAI of VPLMN, for example, based on a roaming agreement (e.g., including mapping to a default S-NSSAI of VPLMN). The selection of slice specific NF instance in a VPLMN may be, for example, based on the S-NSSAI of VPLMN. The selection of any slice specific NF instance in HPLMN may be, for example, based on the S-NSSAI of an HPLMN.

Figure 8:
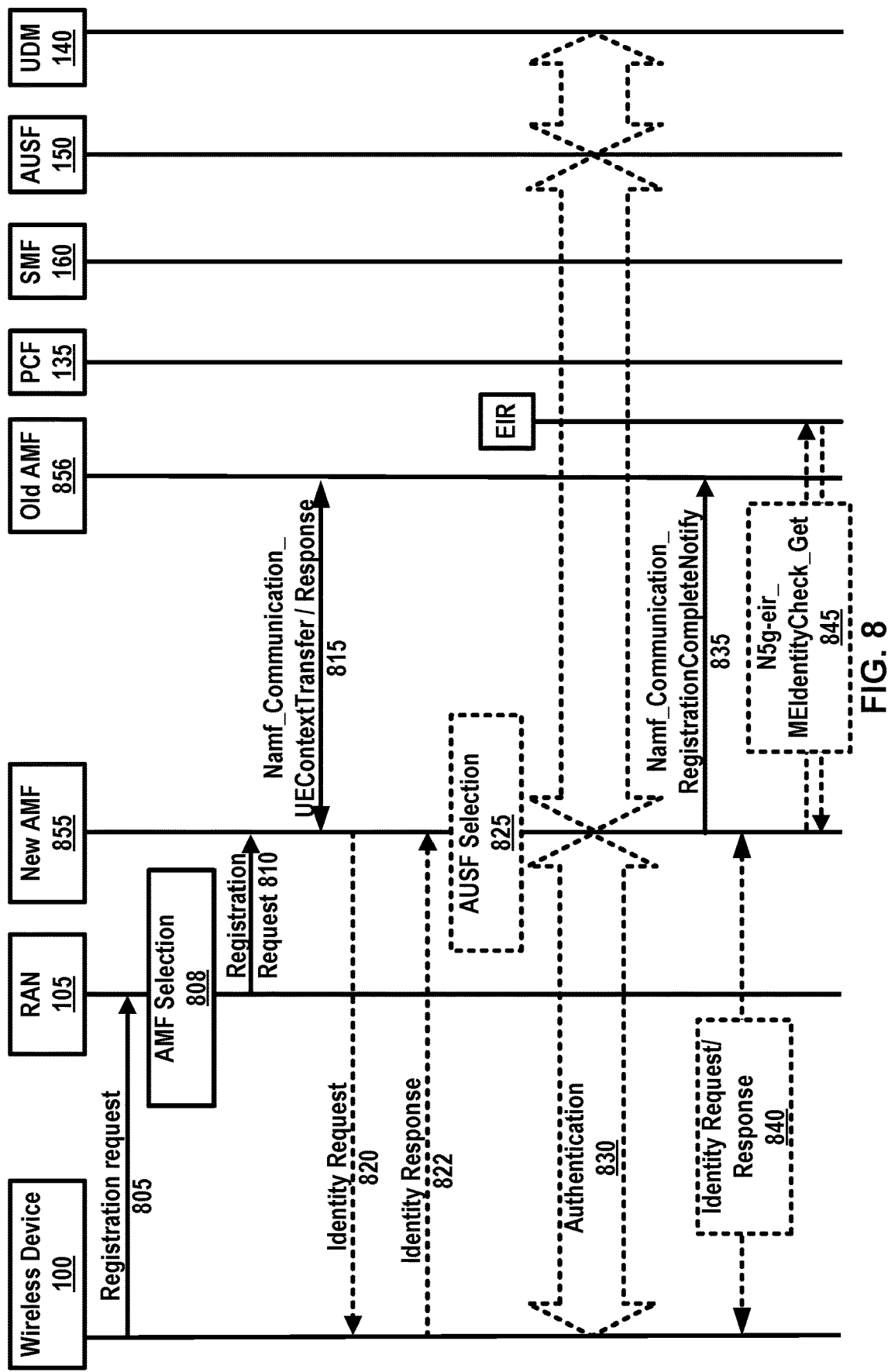
FIG. 8 shows examples of registration procedures.
Figure 9:
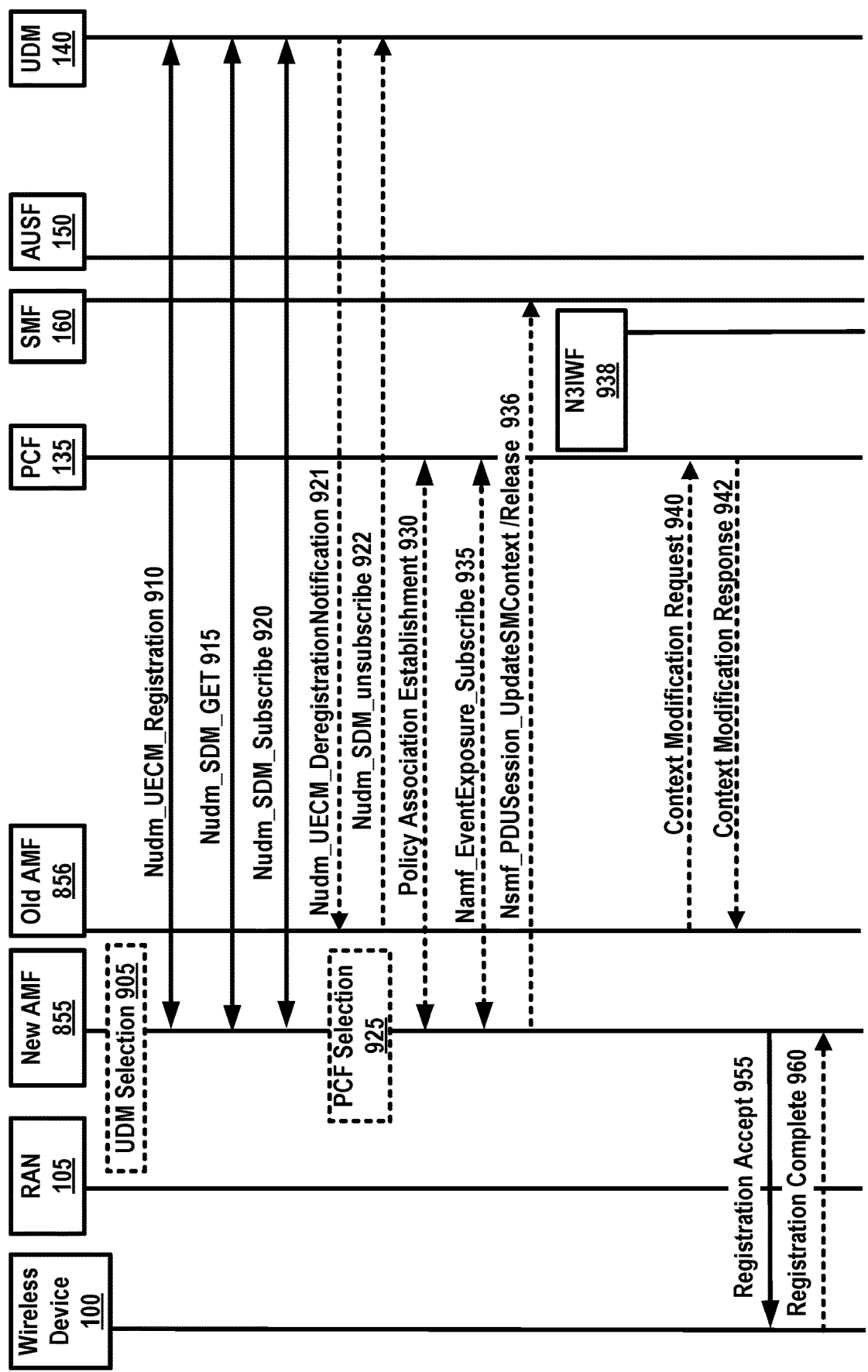
FIG. 9 shows a continuation of the example call flow for an initial registration procedure.

FIG. 8 and FIG. 9 show an example call flow for an initial registration procedure. The initial registration procedure may involve execution of network access control functions (e.g., user authentication and access authorization, which may be based on subscription profiles in UDM 140, 240). The identity of the serving AMF 155, 255 may be registered in a UDM 140, 240, for example, based on or as a result of the initial registration procedure. The RM procedures may be applicable for both a 3GPP access RAN 105, 205 and a non-3GPP access RAN 265.

As shown in FIG. 8 and FIG. 9, a registration procedure may be performed by the wireless device 100, 200. The registration procedure may be performed by the wireless device 100, 200, for example, to become authorized to receive services, to enable mobility tracking, to enable reachability, and/or the like. The wireless device 100, 200 may send a registration request message 805 to the RAN 105 (or 205). The registration request message 805 may comprise, for example, AN parameters and/or an RM-NAS registration request (e.g., registration type, SUCI or SUPI or GUTI (e.g., 5G-GUTI), last visited TAI (if available), security parameters, requested NSSAI, mapping of requested NSSAI, wireless device 5GC capability, PDU session status, PDU session(s) to be re-activated, follow on request, MICO mode preference, and/or the like), and/or the like. The AN parameters may include, for example, SUCI, SUPI, the GUTI (e.g., 5G-GUTI), the selected PLMN ID and requested NSSAI, and/or the like (e.g., for the RAN). The AN parameters may comprise an establishment cause. The establishment cause may provide a reason for requesting an establishment of an RRC connection. The registration type may indicate, for example, whether the wireless device 100 determines and/or requests to perform an initial registration (e.g., if the wireless device 100, 200 is in the RM-DEREGISTERED state), a mobility registration update (e.g., if the wireless device 100, 200 is in the RM-REGISTERED state and initiates a registration procedure, such as due to mobility), a periodic registration update (e.g., if the wireless device 100, 200 is in the RM-REGISTERED state and may initiate a registration procedure, such as due to the periodic registration update timer expiry) or an emergency registration (e.g., if the wireless device 100, 200 is in a limited service state).

The wireless device 100, 200 may include its SUCI or SUPI in the registration request. The wireless device 100, 200 may include its SUCI or SUPI in the registration request, for example, if the wireless device 100, 200 is performing an initial registration (e.g., if the wireless device 100 is in the RM-DEREGISTERED state) to a PLMN for which the wireless device 100, 200 does not already have a GUTI (e.g., 5G-GUTI). The SUCI may be included in the registration request, for example, if the home network has provisioned the public key to protect SUPI in the wireless device 100, 200. The wireless device 100, 200 may perform an initial registration. The wireless device 100, 200 may include the SUPI in a registration request message. The wireless device 100, 200 may include the SUPI in the registration request message, for example, if the wireless device 100, 200 receives a wireless device configuration update command indicating that the wireless device 100, 200 may be required to re-register and/or that the 5G-GUTI is invalid.

The SUPI may be included the registration request message, for example, for an emergency registration. The SUPI may be included for an emergency registration, for example, if the wireless device 100, 200 does not have a valid GUTI (e.g., 5G-GUTI) available. The PEI may be included for an emergency request, for example, if the wireless device 100, 20 has no SUPI and no valid GUTI (e.g., 5G-GUTI). The GUTI (e.g., 5G-GUTI) may be included and may indicate the old (e.g., last serving) AMF 856. The wireless device 100, 200 may not provide the GUTI (e.g., 5G-GUTI) allocated by the AMF 155, 255 over the 3GPP access, for example, during the registration procedure over the non-3GPP access. The wireless device 100, 200 may not provide the GUTI allocated by the AMF 155, 255, for example, if the wireless device 100 is already registered via a non-3GPP access in a PLMN different from the new PLMN (e.g., not the registered PLMN or a PLMN equivalent to the registered PLMN) of the 3GPP access. The wireless device 100, 200 may not provide access to the GUTI (e.g., 5G-GUTI) allocated by the AMF 155 over the non-3GPP during the registration procedure over the 3GPP access. The wireless device 100 may not provide access to the GUTI, for example, if the wireless device 100 is already registered via a 3GPP access in a PLMN (e.g., the registered PLMN) different from the new PLMN (e.g., not the registered PLMN or a PLMN equivalent to the registered PLMN) of the non-3GPP access. The wireless device 100, 200 may provide the wireless device's 100, 200 usage setting. The wireless device 100, 200 may provide the wireless device's 100, 200 usage setting, for example, based on its configuration.

The wireless device 100, 200 may include the mapping of requested NSSAI for initial registration or mobility registration updates. The mapping of requested NSSAI, for example, may comprise the mapping of each S-NSSAI of the requested NSSAI to the S-NSSAIs of the configured NSSAI for the HPLMN. The wireless device 100, 200 may include the mapping of requested NSSAI, for example, to ensure that the network is able to verify whether the S-NSSAI(s) in the requested NSSAI are permitted (e.g., based on the subscribed S-NSSAIs). The last visited TAI may be included in the mapping of requested NSSAI. The last visited TAI may be included in the mapping of requested NSSAI, for example, to help the AMF 155, 255 produce a registration area for the wireless device. Security parameters may be used for authentication and integrity protection. A requested NSSAI may indicate the network slice selection assistance information. The PDU session status may indicate the previously established PDU sessions in the wireless device 100, 200. The PDU session status may indicate the established PDU session of the current PLMN in the wireless device 100, 200. The PDU session status may indicate the established PDU session of the current PLMN in the wireless device 100, 200, for example, if the wireless device 100, 200 is connected to two AMF 155, 255 belonging to different PLMNs (e.g., via 3GPP access and via non-3GPP access). The PDU session(s) to be re-activated may be included, for example, to indicate the PDU session(s) for which the wireless device 100, 200 may intend to activate UP connections. A PDU session corresponding to an LADN may not be included in the PDU session(s) to be re-activated. The PDU session corresponding to a LADN may not be included in the PDU session(s) to be re-activated, for example, if the wireless device 100, 200 is outside the area of availability of the LADN. The follow-on request may be included, for example, if the wireless device 100, 200 has a pending uplink signaling that the wireless device 100, 200 does not include PDU session(s) to be re-activated, or if the registration type indicates the wireless device 100, 200 may want to perform an emergency registration.

The RAN 105, 205 may perform AMF selection 808. The RAN 105, 205 may perform AMF selection 808, for example, based on RAT and a requested NSSAI (e.g., if available). The RAN 105, 205 may perform AMF selection 808, for example, if an SUPI is included or if the GUTI (e.g., 5G-GUTI) does not indicate a valid AMF 155, 255. The RAN 105, 205 may forward the registration request message 810 to a new AMF 855. The RAN 105, 205 may forward the registration request message 810 to a new AMF 855, for example, on the N2 connection of the wireless device 100, 200 if the wireless device 100, 200 is in the CM-CONNECTED state. The RAN 105, 205 may forward the registration request 810 to the new AMF 855, which may have been configured to perform AMF selection 808. The RAN 105, 205 may forward the registration request 810 to the new AMF 855, for example, if the RAN 105, 205 does not select an appropriate new AMF 855.

The RAN 105, 205 may send an N2 registration request message 810 to the new AMF 855. The N2 registration request message 810, may comprise, for example, N2 parameters, RM-NAS registration request (e.g., registration type, SUPI or 5G-GUTI, last visited TAI (if available), security parameters, requested NSSAI, mapping of requested NSSAI, wireless device 5GC capability, PDU session status, PDU session(s) to be re-activated, follow on request, and MICO mode preference), and/or the like. The N2 parameters may comprise the selected PLMN ID, location information, cell identity, and the RAT type related to the cell in which the wireless device 100, 200 is communicating (e.g., camping on) for example, if the RAN 105, 205 is used. The N2 parameters may comprise the establishment cause. The N2 parameters may comprise the establishment cause, for example, if the RAN 105, 205 is used.

A new AMF 855 may send, to the old AMF 856, complete registration request (e.g., an Namf_Communication_UEContextTransfer) 815. The new AMF 855 may invoke an operation (e.g., the Namf_Communication_UEContextTransfer 815 service operation) on the old AMF 856. The new AMF 855 may invoke an operation (e.g., the Namf_Communication_UEContextTransfer 815 service operation) on the old AMF 856 (which may include the complete registration request IE), for example, if the wireless device's GUTI (e.g., 5G-GUTI) is included in the registration request and the serving AMF 155, 255 has changed since last registration procedure. The complete registration request IE may be integrity protected. The new AMF 855 may invoke the operation (e.g., the Namf_Communication_UEContext-Transfer 815 service operation) on the old AMF 856, for example, to request the wireless device's 100 SUPI and MM Context. The old AMF 856 may use the integrity protected complete registration request IE, for example, to verify whether the context transfer service operation invocation corresponds to the wireless device 100, 200 requested. The old AMF 856 may transfer the event subscriptions information by each NF consumer, for the wireless device 100, 200, to the new AMF 855. The SUPI request may or may not be skipped. The SUPI request may be skipped, for example, if the wireless device 100, 200 indicates (e.g., identifies) itself with PEI.

The old AMF 856 may send, to the new AMF 855, a response 815 to the transfer message (e.g., Namf_Communication_UEContextTransfer). The response 815 may comprise, for example, SUPI, MM context, SMF 160 information, and/or a PCF ID). The old AMF 856 may respond, to the new AMF 855, based on an operation (e.g., Namf_Communication_UEContextTransfer invocation). The old AMF 856 may respond to the new AMF 855, for example, by including the wireless device's SUPI and/or MM context. The old AMF 856 may include SMF 160, 260 information which may comprise, for example, S-NSSAI(s), SMF 160, 260 identities, and/or a PDU session ID (e.g., if the old AMF 856 has information about established PDU sessions). The old AMF 856 may have information about the NGAP wireless device-TNLA bindings. The old AMF 856 may include information about the NGAP wireless device-TNLA bindings in one or more messages, for example, if the old AMF 856 has information about active NGAP wireless device-TNLA bindings to the N3IWF 270.

The identity request procedure 820 may be initiated, for example, by the new AMF 855 sending an identity request message 820 to the wireless device 100, 200 from the SUCI. The identity request message 820 may be initiated, for example, if the SUPI has not been provided by the wireless device 100, 200 and/or if the SUPI has not been retrieved from the old AMF 856. The wireless device 100, 200 may respond, to the identity request message 820 (e.g., identity request procedure), with an identity response message 822. The identity response message 822 may include the SUCI. The wireless device 100, 200 may determine (e.g., derive) the SUCI, for example, by using the provisioned public key of the HPLMN.

The new AMF 855 may determine to initiate an AUSF selection 825. The AUSF selection 825 may be to initiate the wireless device authentication 830 (e.g., wireless device security). The new AMF 855 may initiate the AUSF selection 825, for example, by invoking an AUSF 150, 250. The new AMF 855 may select an AUSF 150, 250, for example, based on the SUPI and/or the SUCI. The new AMF 855 may perform or skip the authentication 830 and/or the security setup. The new AMF 855 may accept that the authentication 830 may fail and continue the registration procedure. The new AMF 855 may accept that the authentication 830 may fail and continue the registration procedure, for example, if the new AMF 855 is configured to support emergency registration for unauthenticated SUPIs. The new AMF 855 may accept that the authentication 830 may fail and continue the registration procedure, for example, if the wireless device 100, 200 indicates that the registration type is an emergency registration.

The authentication 830 may be performed by the Nudm_UEAuthenticate_Get operation. The AUSF 150 may discover a UDM 140, 240. The AUSF 150 may return the SUPI to the new AMF 855, for example, after the authentication 830 is successful. The AUSF 150, 250 may return the SUPI to the new AMF 855 after the authentication 830 is successful, for example, if the new AMF 855 provides a SUCI to AUSF 150, 250. The new AMF 855 may determine whether the registration request must/should be rerouted (e.g., rerouted from the AMF 155 operating as an initial AMF), for example, if network slicing is used. The new AMF 855 may initiate NAS security functions. The new AMF 855 may initiate an NGAP procedure. The initiation may, for example, enable an AN (e.g., 5G-AN) to use the NGAP procedure for securing procedures with the wireless device 100 upon completion of a NAS security function setup. The AN (e.g., 5G-AN) may store the security context. The AN may acknowledge completion of the NAS security function setup to the AMF 155, 255. The AN (e.g., 5G-AN) may use the security context, for example, to protect the messages exchanged with the wireless device 100, 200.

A new AMF 855 may send Namf_Communication_RegistrationCompleteNotify 835 to the old AMF 856. The new AMF 855 may notify the old AMF 856 that the registration of the wireless device 100, 200 in the new AMF 855 is completed. The new AMF 855 may notify the old AMF 856 that the registration of the wireless device 100, 200 in the new AMF 855 is completed (e.g., if the new AMF 855 has changed) by invoking the Namf_Communication_RegistrationCompleteNotify service operation. The registration may be rejected. The new AMF 855 may invoke the Namf_Communication_RegistrationCompleteNotify 835 service operation, for example, if the registration is rejected. The new AMF 855 may send a reject indication reason code to the old AMF 856. The old AMF 856 may continue as if the wireless device context transfer service operation was never received. The old AMF 856 may continue as if the wireless device context transfer service operation was never received, for example, if the authentication/security procedure fails. The new AMF 855 may determine which (if any) of one or more PDU sessions may not be supported in the new registration area. The new AMF 855 may determine which (if any) of one or more PDU sessions may not be supported in the new registration area, for example, if one or more of the S-NSSAIs used in the old registration area are not served in the target registration area. The new AMF 855 may invoke the Namf_Communication_RegistrationCompleteNotify 835 service operation, which may include the rejected PDU session ID and/or a reject cause (e.g., the S-NSSAI becomes no longer available) in one or more messages to the old AMF 856. The new AMF 855 may modify the PDU session status. The old AMF 856 may inform one or more SMFs (e.g., the corresponding SMF 160) to locally release the wireless device's SM context, for example, by invoking the Nsmf_PDUSession_ReleaseSMContext service operation.

The new AMF 855 may send an identity request/response 840 (e.g., PEI) to the wireless device 100, 200. An identity request procedure may be initiated by the new AMF 855. The identity request procedure may be initiated by the new AMF 855, for example, by sending an identity request message 840 to the wireless device 100 to retrieve the PEI (e.g., if the PEI was not provided by the wireless device 100, 200 and/or if the PEI was not retrieved from the old AMF 856). The PEI may be encrypted for transfer, unless, for example, the wireless device 100, 200 performs emergency registration and is not authenticated. The wireless device 100, 200 may include the PEI in the registration request for an emergency registration. The new AMF 855 may initiate ME identity check. The new AMF 855 may initiate ME identity check, for example, by invoking an N5g-eir_EquipmentIdentityCheck_Get service operation 845 (e.g., with an Equipment Identity Register (EIR)).

As shown in FIG. 9, the new AMF 855 (e.g., based on the SUPI) may perform UDM selection 905 to select a UDM 140, 240. The UDM 140, 240 may select a UDR instance. The new AMF 855 may register with the UDM 140, 240. The new AMF 855 may register with the UDM 140, for example, by using a Nudm_UECM_Registration 910. The new AMF 855 may subscribe to be notified if the UDM 140, 240 deregisters the AMF 155, 255, if the AMF 155, 255 has changed since the last registration procedure, if the wireless device 100, 200 provides a SUPI which may not refer to a valid context in the AMF 155, 255, and/or if the wireless device 100, 200 registers to the same AMF 155, 255 that it has already registered to a non-3GPP access (e.g., the wireless device 100, 200 is registered over a non-3GPP access and may initiate the registration procedure to add a 3GPP access).

The UDM 140, 240 may store the AMF 155, 255 identity associated with a first access type and may not remove the AMF 155, 255 identity associated with one or more second access types. The UDM 140, 240 may store information provided at registration in UDR with Nudr_UDM_Update. The AMF 155, 255 may retrieve the access and mobility subscription data and SMF 160, 260 selection subscription data, for example, by using Nudm_SDM_Get 915. The UDM 140, 240 may retrieve the access and mobility subscription data and SMF 160, 260 selection subscription data information from UDR, for example, with Nudr_UDM_Query. The AMF 155, 255 may subscribe to be notified based on a successful response and/or after a successful response is received. The AMF 155, 255 may subscribe to be notified based on a successful response and/or after a successful response is received, for example, if the data requested is modified using Nudm_SDM_Subscribe 920. The UDM 140, 240 may subscribe to UDR, for example, by using Nudr_UDM_Subscribe 920. The GPSI may be provided to the new AMF 855 in the subscription data from the UDM 140, 240. The GPSI may be provided in the subscription data from the UDM 140, 240, for example, if the GPSI is available in the wireless device 100, 200 subscription data. The new AMF 855 may provide the access type it serves for the wireless device 100 to the UDM 140. The access type may, for example, be set to 3GPP access. The UDM 140 may store the associated access type together with the serving AMF 155 in UDR, for example, with Nudr_UDM_Update. The new AMF 855 may create an MM context for the wireless device 100, 200. The new AMF 855 may create an MM context for the wireless device 100, 200, for example, in response to getting the mobility subscription data from the UDM 140, 240. The UDM 140, 240 may initiate Nudm_UECM_DeregistrationNotification 921 to the old AMF 856, corresponding to 3GPP, access. The UDM 140, 240 may initiate Nudm_UECM_DeregistrationNotification 921, for example, if the UDM 140, 240 stores the associated access type together with the serving AMF 155, 255. The old AMF 856 may remove the MM context of the wireless device 100, 200. The old AMF 856 may invoke a Namf_EventExposure_Notify service operation, for example, by sending one or more messages to the associated SMFs 160, 260 of the wireless device 100, 200. The old AMF 856 may invoke the service operation, for example, to notify the associated SMFs 160, 260 that the wireless device 100, 200 is deregistered from the old AMF 856. The SMF 160, 260 may release the PDU session(s). The SMF 160, 260 may release the PDU session(s), for example, based on the notification, if the serving NF removal reason indicated by the UDM 140, 240 is initial registration. The old AMF 856 may unsubscribe with the UDM 140, 240 for subscription data, for example, by using Nudm_SDM_unsubscribe 922.

The new AMF 855 may select 925 a PCF 135, 235. The new AMF 855 may select 925 a PCF 135, 235, for example, if the AMF 155, 255 determines to initiate PCF 135, 235 communication (e.g., the new AMF 855 has not yet obtained access and mobility policy for the wireless device 100, 200 and/or if the access and mobility policy in the new AMF 855 is no longer valid). The new AMF 855 may select the (V-)PCF identified by the PCF ID. The new AMF 855 may select the (V-)PCF identified by the PCF ID, for example, if the new AMF 855 receives a PCF ID from the old AMF 856 and successfully contacts the PCF 135, 235 indicated (e.g., identified) by the PCF ID. The new AMF 855 may select 925 a PCF 135, 235. The new AMF 855 may select 925 a PCF 135, 235, for example, if the PCF 135, 235 indicated (e.g., identified) by the PCF ID is not used (e.g., no response from the PCF 135 is received) and/or if there is no PCF ID received from the old AMF 856.

The new AMF 855 may perform a policy association establishment 930. The new AMF 855 may perform the policy association establishment 930, for example, during registration procedure. The new AMF 855 may include the PCF-ID in a Npcf_AMPolicyControl Get operation for the policy association establishment 930. The new AMF 855 may include the PCF-ID in the Npcf_AMPolicyControl Get operation, for example, if the new AMF 855 communicates with or contacts the PCF 135, 235 indicated (e.g., identified) by the (V-)PCF ID received, for example, during inter-AMF mobility. The PCF 135, 235 may provide the updated mobility restrictions to the new AMF 855. The PCF 135, 235 may provide the updated mobility restrictions to the new AMF 855, for example, if the AMF 155, 255 notifies the mobility restrictions (e.g., wireless device 100, 200 location) to the PCF 135, 235 for adjustment, or if the PCF 135, 235 updates the mobility restrictions itself due to some conditions (e.g., application in use, time and date). The PCF 135, 235 may invoke Namf_EventExposure_Subscribe 935 service operation for the wireless device 100, 200 event subscription.

The new AMF 855 may send, to the SMF 160, 260 an Nsmf_PDUSession_UpdateSMContext 936. The new AMF 855 may invoke the Nsmf_PDUSession_UpdateSMContext 936. The new AMF 855 may invoke the Nsmf_PDUSession_UpdateSMContext 936, for example, if the PDU session(s) to be re-activated is included in the registration request. The new AMF 855 may send the Nsmf_PDUSession_UpdateSMContext 936 request to the SMF(s) 160 associated with the PDU session(s). The new AMF 855 may send the Nsmf_PDUSession_UpdateSMContext 936 request, for example, to activate user plane connections of the PDU session(s). The SMF 160, 260 may decide to trigger (e.g., the intermediate UPF 110, 210 insertion) removal or change of PSA. The procedure may be performed without N11 and N2 interactions. The procedure may be performed without N11 and N2 interactions, for example, to update the N3 user plane between the RAN 105, 205 and the CN (e.g., 5GC) if the intermediate UPF 110, 210 insertion, removal, and/or relocation is performed for the PDU session(s) that is/are not included in PDU session(s) to be re-activated. The new AMF 855 may invoke the Nsmf_PDUSession_ReleaseSMContext 936 service operation towards the SMF 160, 260 (e.g., by sending one or more messages to the SMF 16, 260). The new AMF 855 may invoke the Nsmf_PDUSession_ReleaseSMContext 936 service operation, for example, if any PDU session status indicates that it is released at the wireless device 100, 200. The new AMF 855 may invoke the Nsmf_PDUSession_ReleaseSMContext 936 service operation towards the SMF 160, 260 (e.g., by sending one or more messages to the SMF 16, 260). The new AMF 855 may invoke the Nsmf_PDUSession_ReleaseSMContext 936 service operation, for example, in order to release any network resources related to the PDU session.

The new AMF 855 may send a wireless device Context Modification Request 940 to a N3IWF 938. The new AMF 855 may create an NGAP wireless device association, towards the N3IWF 938 to which the wireless device 100, 200 is connected (e.g., by sending one or more messages to the N3IWF 938). The new AMF 855 may create the NGAP wireless device association, for example, if the AMF 155, 255 has changed. The N3IWF 938 may respond to the new AMF 855, for example, with a wireless device Context Modification Response 942.

The new AMF 855 may send, to the wireless device 100, 200, a registration accept message 955. The registration accept message 955 may comprise, for example, GUTI (e.g., 5G-GUTI), registration area, mobility restrictions, PDU session status, allowed NSSAI (or mapping of allowed NSSAI), periodic registration update timer, LADN information and accepted MICO mode, IMS voice over PS session supported indication, emergency service support indicator, and/or the like. The new AMF 855 may send the registration accept message 955, for example, to the wireless device 100, 200. The registration accept message 955 may, for example, indicate that the registration request has been accepted. The registration accept message 955 may include GUTI (e.g., 5G-GUTI), for example, if the new AMF 855 allocates a new GUTI (e.g., 5G-GUTI). The new AMF 855 may send the registration area to the wireless device 100, 200. The new AMF 855 may send the registration area, for example, via a registration accept message 955 if, for example, the new AMF 855 allocates a new registration area. The wireless device 100, 200 may determine that the old registration area is valid or consider the old registration area to be valid. The wireless device 100, 200 may determine that the old registration area is valid (or consider the old registration area to be valid), for example, if there is no registration area included in the registration accept message. Mobility restrictions may be included in the registration accept message 955. Mobility restrictions may be included in the registration accept message 955, for example if mobility restrictions are used for the wireless device 100, 200 and if the registration type is not an emergency registration.

The new AMF 855 may indicate the established PDU sessions to the wireless device 100, 200, for example, in the PDU session status. The wireless device 100, 200 may locally remove internal resources related to PDU sessions. The wireless device 100, 200 may locally remove internal resources related to PDU sessions, for example, that are not marked as established in the received PDU session status. The wireless device 100, 200 may locally remove internal resources related to the PDU session of the current PLMN that are not marked as established in received PDU session status. The wireless device 100, 200 may locally remove internal resources related to the PDU session of the current PLMN that are not marked as established in received PDU session status, for example, if the wireless device 100, 200 is connected to the two AMFs 155, 255 belonging to different PLMN via 3GPP access and non-3GPP access. The new AMF 855 may indicate the PDU session status to the wireless device 100, 200. The new AMF 855 may indicate the PDU session status to the wireless device 100, 200, for example, if the PDU session status information is in the registration request. The mapping of the allowed NSSAI may be, for example, the mapping of each S-NSSAI of the allowed NSSAI to the S-NSSAIs of the configured NSSAI for the HPLMN. The new AMF 855 may include, in the registration accept message 955, the LADN information for LADNs that are or may be available within the registration area determined by the new AMF 855 for the wireless device 100, 200. The new AMF 855 may indicate whether MICO mode may be used. The new AMF 855 may indicate whether MICO mode may be used, for example, if the wireless device 100, 200 includes MICO mode in the request. The new AMF 855 may set the IMS voice over PS session supported indication. The new AMF 855 may perform a wireless device/RAN radio information and compatibility request procedure. The new AMF 855 may perform a wireless device/RAN radio information and compatibility request procedure, for example, to check the compatibility of the wireless device 100, 200 and RAN radio capabilities related to IMS voice over PS to set the IMS voice over PS session supported indication. The emergency service support indicator may inform the wireless device 100, 200 that emergency services are supported (e.g., the wireless device 100, 200 may request PDU session for emergency services.) The handover restriction list and wireless device-AMBR may be provided, to RAN 105, 205, by the new AMF 855.

The wireless device 100, 200 may send a registration complete message 960 to the new AMF 855. The wireless device 100, 200 may send the registration complete message 960 to the new AMF 855, for example, to acknowledge that a new GUTI (e.g., 5G-GUTI) has been assigned. The new AMF 855 may release the signaling connection with the wireless device 100, 200. The new AMF 855 may release the signaling connection with the wireless device 100, 200, for example, if information about the PDU session(s) to be re-activated is not included in the registration request. The new AMF 855 may not release the signaling connection after the completion of the registration procedure. The new AMF 855 may not release the signaling connection after the completion of the registration procedure, for example, if the follow-on request is included in the registration request. The new AMF 855 may not release the signaling connection after the completion of the registration procedure, for example, if the new AMF 855 is aware that some signaling is pending in the new AMF 855 or between the wireless device 100, 200 and the CN (e.g., 5GC).

Figure 10:
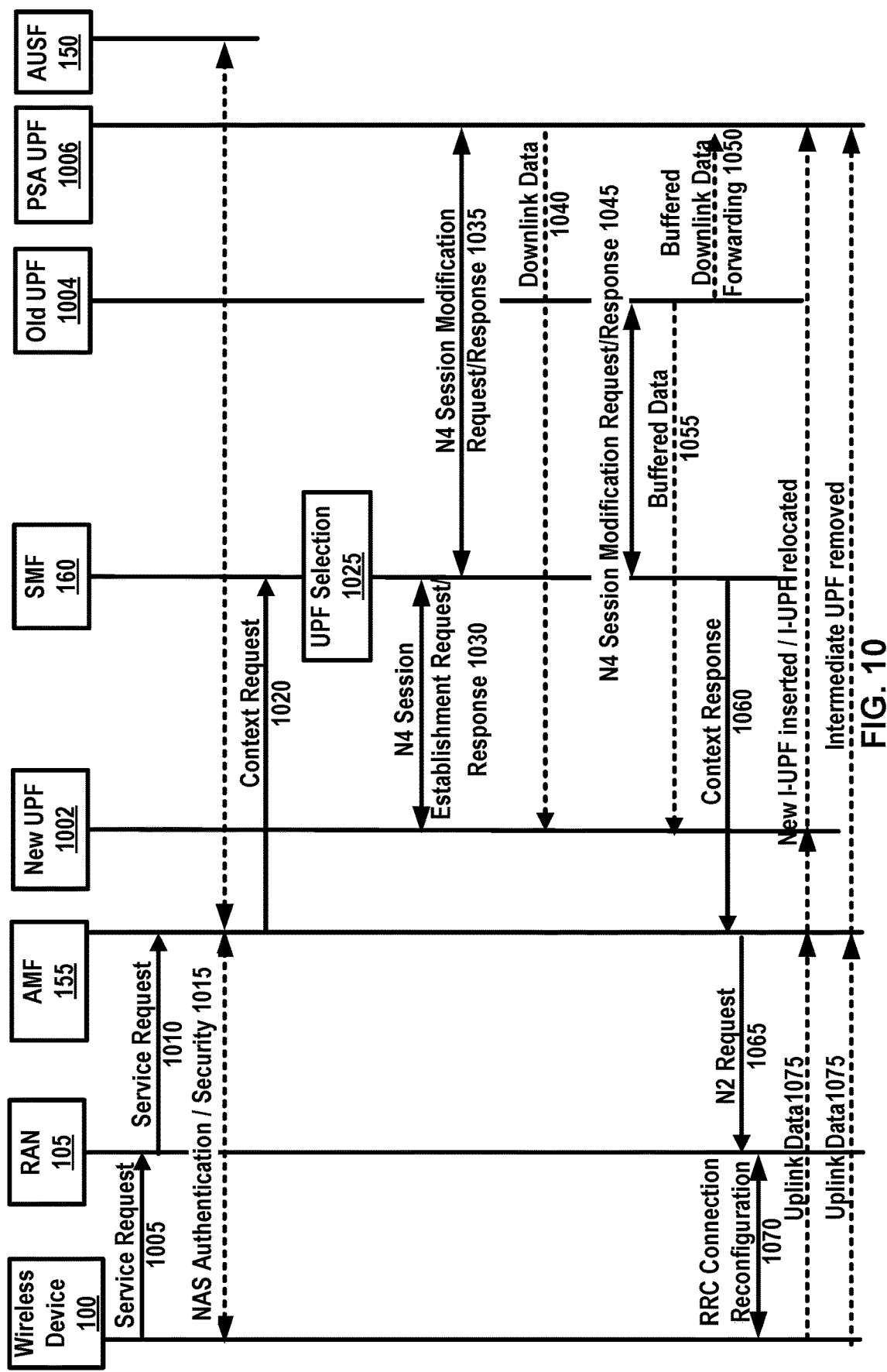
FIG. 10 shows an example call flow for a service request procedure.
Figure 11:
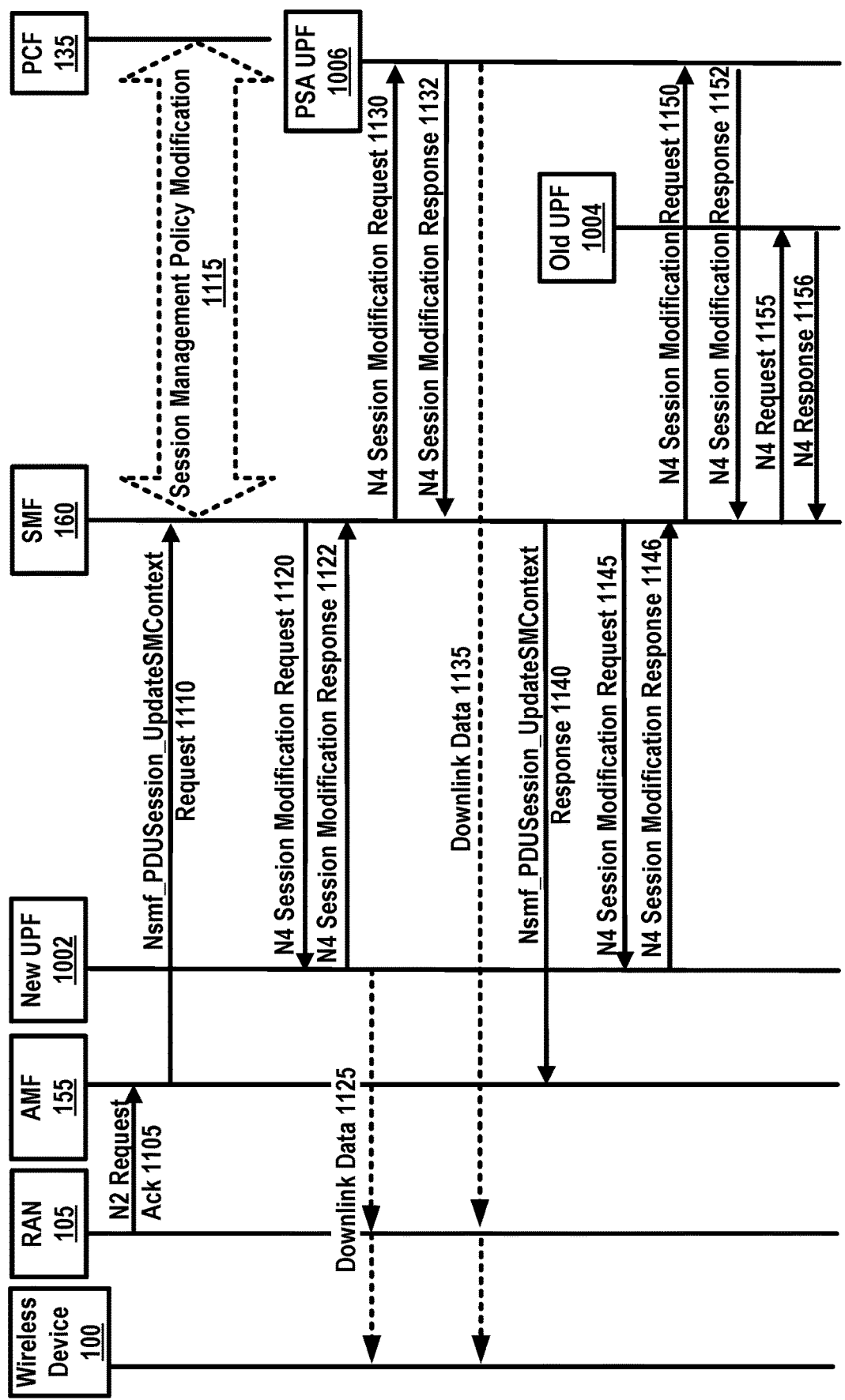
FIG. 11 shows an example call flow for a service request procedure.

FIG. 10 and FIG. 11 show an example call flow for a service request procedure. As shown in FIG. 10, a service request procedure (e.g., a wireless device 100 triggered service request procedure) may be used by a wireless device 100, 200 in a CM-IDLE state, for example, to request the establishment of a secure connection to an AMF 155, 255. FIG. 11 shows a service request procedure that may be a continuation of FIG. 10. The service request procedure may be used, for example, to activate a user plane connection for an established PDU session. The service request procedure may be triggered by the wireless device 100, 200 or the CN (e.g., 5GC). The service request procedure may be used, for example, if the wireless device 100, 200 is in the CM-IDLE state and/or in the CM-CONNECTED state. The service request procedure may, for example, selectively allow activation of user plane connections for some of the established PDU sessions.

A wireless device 100, 200 in the CM-IDLE state may initiate the service request procedure. A wireless device 100, 200 in the CM-IDLE state may initiate the service request procedure, for example, to send uplink signaling messages, user data, and/or the like, as a response to a network paging request, and/or the like. The wireless device 100, 200 may send the service request 1005 to a RAN 105, 205. The RAN may forward the service request 1010 to the AMF 155, 255. The AMF 155, 255 may perform authentication. The AMF 155, 255 may perform authentication, for example, after receiving the service request message 1010. The wireless device 100, 200 and/or a network device may send one or more messages (e.g., PDU session establishment from the wireless device 100, 200 to a SMF 160, 260) via the AMF 155, 255, for example, after the establishment of the signaling connection to the AMF 155, 255.

The AMF 155, 255 may respond, to the service request, with a service accept message. The AMF 155, 255 may respond with a service accept message, for example, to synchronize PDU session status between the wireless device 100, 200 and network. The AMF 155, 255 may respond with a service reject message to the wireless device 100, 200, for example, if the service request is not accepted by the network. The service reject message may include an indication and/or cause code requesting the wireless device 100, 200 to perform a registration update procedure. A network device (e.g., the CN) may perform one or more operations for a service request (e.g., based on user data). The network may take perform one or more operations for a service request, for example, if the user plane connection activation is unsuccessful. As shown in FIG. 10 and FIG. 11, more than one UPF (e.g., New UPF 1002, old UPF 1004, and PDU session Anchor PSA UPF 1006) may be involved in one or more operations relating to the service requests.

The wireless device 100, 200 may send, to the RAN 105, 205, an AN message. The AN message may comprise, for example, AN parameters, mobility management, MM NAS service request (e.g., list of PDU sessions to be activated, list of allowed PDU sessions, security parameters, PDU session status, and/or the like), and/or the like. The wireless device 100, 200 may provide the list of PDU sessions that may be activated, for example, if the wireless device 100, 200 re-activates the PDU session(s). The list of allowed PDU sessions may be provided by the wireless device 100, 200. The list of allowed PDU sessions may be provided by the wireless device 100, 200, for example, if the service request may be a response of a paging or a NAS notification. The list of allowed PDU sessions may indicate (e.g., identify) the PDU sessions that may be transferred and/or associated to the access on which the service request may be sent. The AN parameters may include a selected PLMN ID and/or an establishment cause for the RAN. The establishment cause may provide a reason for requesting the establishment of an RRC connection. The wireless device 100, 200 may send a NAS service request message 1005, encapsulated in an RRC message to the RAN 105, 205, towards the AMF 155, 255.

The wireless device 100, 200 may indicate (e.g., identify), using the list of PDU sessions to be activated, the PDU session(s) for which the UP connections are to be activated in the NAS service request message. The wireless device 100, 200 may indicate (e.g., identify) the PDU session(s) for which the UP connections are to be activated in the NAS service request message, for example, if the service request is triggered for user data. The wireless device 100, 200 may not indicate (e.g., identify) any PDU session(s). The wireless device 100, 200 may not indicate (e.g., identify) any PDU session(s), for example, if the service request is triggered for signaling. The wireless device 100, 200 may indicate (e.g., identify) the PDU session(s) having UP connections that may be activated in a MM NAS service request message. The wireless device 100, 200 may indicate (e.g., identify) the PDU session(s) having UP connections that may be activated, for example, by a list of PDU sessions to be activated if the identification procedure is triggered for a paging response, and/or if the wireless device 100, 200 has (e.g., at the same time) user data to be transferred.

The NAS service request message 1005 may indicate (e.g., identify), in the list of allowed PDU sessions, the list of PDU sessions associated with the non-3GPP access that may be re-activated over 3GPP. The NAS service request message 1005 may indicate (e.g., identify) the list of PDU sessions associated with the non-3GPP access that may be re-activated over 3GPP, for example, if the service request over 3GPP access is triggered in response to a paging indicating non-3GPP access. The PDU session status may indicate the PDU sessions available to the wireless device 100, 200. The wireless device 100, 200 may not trigger the service request procedure for a PDU session corresponding to a LADN. The wireless device 100, 200 may not trigger the service request procedure for a PDU session corresponding to a LADN, for example, if the wireless device 100, 200 is outside the area of availability of the LADN. The wireless device 100, 200 may not indicate (e.g., identify) such PDU session(s) in the list of PDU sessions to be activated. The wireless device 100, 200 may not indicate (e.g., identify) such PDU session(s) in the list of PDU sessions to be activated, for example, if the service request is triggered for other reasons.

The RAN 105, 205 may send an N2 service request message 1010 (e.g., a service request) to the AMF 155, 255. The N2 service request message 1010, for example, may comprise N2 parameters, a MM NAS service request, and/or the like. The AMF 155, 255 may reject the N2 message. The AMF 155, 255 may reject the N2 message, for example, if the AMF 155, 255 is unable to handle the service request. The N2 parameters may include, for example, the GUTI (e.g., 5G-GUTI), selected PLMN ID, location information, RAT type, establishment cause, and/or the like, for example, if the RAN 105, 205 (e.g., NG-RAN) is used. The GUTI (e.g., 5G-GUTI) may be obtained in an RRC procedure. The RAN 105, 205 may select the AMF 155, 255 based on or according to the GUTI (e.g., 5G-GUTI). The location information and/or the RAT type may relate to the cell in which the wireless device 100, 200 may be communicating (e.g., camping on). The AMF 155, 255 may initiate a PDU session release procedure. The AMF 155, 255 may initiate a PDU session release procedure, for example, in the network for the PDU sessions that have PDU session ID(s) that are indicated by the wireless device 100, 200 (e.g., based on the PDU session status) as not available.

The AMF 155, 255 may initiate a NAS authentication/security procedure 1015. The AMF 155, 255 may initiate a NAS authentication/security procedure 1015, for example, if the service request is not integrity protected or if integrity protection verification failed. The wireless device 100, 200 and the network may exchange NAS signaling based on or after successful establishment of the signaling connection. The wireless device 100, 200 and the network may exchange NAS signaling, for example, if the wireless device 100, 200 triggers the service request to establish a signaling connection. The AMF 155, 255 may send, to the SMF 160, 260, a PDU session update context request 1020 (e.g., Nsmf_P-DUSession_UpdateSMContext request comprising PDU session ID(s), cause(s), wireless device location information, access type, and/or the like).

The context request 1020 (e.g., Nsmf_PDUSession_UpdateSMContext) may be invoked by the AMF 155. The context request 1020 may be invoked, for example, if the wireless device 100, 200 indicated (e.g., identifies) PDU session(s) to be activated in the NAS service request message. The context request 1020 (e.g., Nsmf_PDUSession_UpdateSMContext request) may be triggered by the SMF 160, 260. The PDU session(s) indicated (e.g., identified) by the wireless device 100 may correlate to PDU session ID(s) other than the PDU session that may be triggering the procedure. The current wireless device location may be outside the area of validity for the N2 information provided by the SMF 160, for example, during a network triggered service request procedure. The AMF 155, 255 may not send the N2 information provided by the SMF 160, 260, for example, during the network triggered service request procedure.

The AMF 155, 255 may determine the PDU session(s) to be activated. The AMF 155, 255 may send a context request 1020 (e.g., Nsmf_PDUSession_UpdateSMContext request) to the SMF 160, 260 associated with the PDU session(s). The cause may indicate the establishment of user plane resources for the PDU session(s).

The AMF 155, 255 may notify the SMF 160, 260 that the user plane for the PDU session may not be re-activated. The AMF 155, 255 may notify the SMF 160, 260 that the user plane for the PDU session may not be re-activated, for example, if the procedure is triggered based on or in response to paging indicating non-3GPP access and/or if the list of allowed PDU sessions provided by the wireless device 100 does not include the PDU session for which the wireless device 100, 200 was paged. The service request procedure may succeed without re-activating the user plane of any PDU sessions. The AMF 155, 255 may notify the wireless device 100, 200 that the request procedure has succeeded (e.g., without re-activating the user plane of any PDU sessions).

The SMF 160, 260 may determine to keep the PDU session. The SMF 160, 260 may determine to keep the PDU session, for example, based on local policies and/or based on the wireless device location reporting from the AMF 155, 255, for example, if the PDU session ID corresponds to a LADN and/or if the SMF 160, 260 determines that the wireless device 100, 200 is outside the area of availability of the LADN. The SMF 160, 260 may reject the activation of a user plane connection. The SMF 160, 260 may reject the activation of a user plane connection, for example, for the PDU session. The SMF 160, 260 may inform the AMF 155, 255 of the determination that the wireless device 100, 200 is outside the area of availability of the LADN. The SMF 160, 260 may notify the new UPF 1002 that originated the data notification to discard downlink data for the PDU sessions and/or not to provide further data notification messages. The SMF 160, 260 may notify the new UPF 1002 that originated the data notification to discard downlink data for the PDU sessions and/or not to provide further data notification messages, for example, if the procedure is triggered by a network triggered service request. The SMF 160, 260 may respond to the AMF 155, 255 with an appropriate reject cause, and the user plane activation of PDU session may be stopped.

The SMF 160, 260 may determine to release the PDU session. The SMF 160, 260 may determine to release the PDU session, for example, based on local policies and/or based on the wireless device 100, 200 location reporting from the AMF 155, 255. The SMF 160, 260 may determine to release the PDU session, for example, if the PDU session ID corresponds to a LADN and/or if the SMF 160, 260 determines that the wireless device 100, 200 is outside the area of availability of the LADN. The SMF 160, 260 may locally release the PDU session and/or may inform the AMF 155, 255 that the PDU session may be released. The SMF 160, 260 may respond, to the AMF 155, 255, with an appropriate reject cause. The user plane activation of the PDU session may be stopped. The user plane activation of the PDU session may be stopped, for example, based on or in response to the reject cause.

The SMF 160, 260 may check the UPF Selection 1025 criteria. The SMF 160, 260 may check the UPF Selection 1025 criteria, for example, based on the location information received from the AMF 155, 255, (e.g., slice isolation requirements, slice coexistence requirements, UPF's dynamic load, UPF's relative static capacity among UPFs supporting the same DNN, UPF location available at the SMF 160, 260, wireless device 100, 200 location information, capability of the UPF and the functionality required for the particular wireless device 100, 200 session) if the UP activation of the PDU session is accepted by the SMF 160, 260. The appropriate UPF may be selected, for example, by matching the functionality and features required for a wireless device 100, 200, DNN, PDU session type (e.g., IPv4, IPv6, ethernet type or unstructured type) and/or, if applicable, the static IP address/prefix, SSC mode selected for the PDU session, wireless device 100, 200 subscription profile in UDM 140, 240, DNAI as included in the PCC rules, local operator policies, S-NSSAI, access technology being used by the wireless device 100, 200, UPF logical topology, and/or the like. The SMF may determine to continue using the current UPF(s). The SMF may determine to select a new UPF 1002 (or add/remove an intermediate UPF). The SMF may determine to select a new UPF 1002, for example, if the wireless device 100, 200 has moved out of the service area of an old UPF 1004 that was previously connecting to the RAN 105, 205 and maintaining the UPF(s) acting as PDU session anchor. The SMF may trigger re-establishment of the PDU session. The SMF may trigger re-establishment of the PDU session, for example, to perform relocation/reallocation of the UPF acting as PDU session anchor (e.g., the wireless device 100, 200 has moved out of the service area of the anchor UPF 110, 210 that is connecting to RAN 105, 205).

The SMF 160, 260 may send an N4 session establishment request message 1030 to the new UPF 1002 (e.g., new intermediate UPF). The N4 session establishment request message 1030 may be sent to the new UPF 1002. The N4 session establishment request message 1030 may provide, for example, packet detection, data forwarding, enforcement, and reporting rules to be installed on the new UPF 1002, if the SMF 160, 260 selects a new UPF 1002 to act as an intermediate UPF for the PDU session or if the SMF 160, 260 selects to insert an intermediate UPF for a PDU session which may not have an intermediate UPF. The PDU session anchor addressing information (on N9) for the PDU session may be provided to the new UPF 1002 (e.g., new intermediate UPF).

The SMF 160, 260 may include a data forwarding indication. The SMF 160, 260 may include a data forwarding indication, for example, if a new UPF 1002 is selected by the SMF 160, 260 to replace the old (intermediate) UPF 1004. The data forwarding indication may indicate, to the new UPF 1002, that a second tunnel endpoint may be reserved for buffered DL data from the old UPF 1004.

The new UPF 1002 (e.g., new intermediate UPF) may send an N4 session establishment response message 1030 to the SMF 160, 260. The new UPF 1002 may provide DL CN tunnel info for the new UPF 1002 and UL CN tunnel info (e.g., CN N3 tunnel info) to the SMF 160, 260. The new UPF 1002 may provide DL CN tunnel info for the new UPF 1002 and UL CN tunnel info (e.g., CN N3 tunnel info) to the SMF 160, 260, for example, if the new UPF 1002 may allocate CN tunnel information. The new UPF 1002 (e.g., new intermediate UPF), acting as N3 terminating point, may send the DL CN tunnel info for the old UPF 1004 (e.g., old intermediate UPF) to the SMF 160, 260. The new UPF 1002 (e.g., new intermediate UPF), acting as N3 terminating point, may send the DL CN tunnel info for the old UPF 1004 (e.g., old intermediate UPF) to the SMF 160, 260 if the data forwarding indication is received. The SMF 160, 260 may start a timer, for example, to release the resource in the old intermediate UPF 1004.

The SMF 160, 260 may send an N4 session modification request message 1035 to a PDU session anchor, PSA UPF 1006. The N4 session modification request message 1035 may provide, for example, the data forwarding indication and/or the DL tunnel information from the new UPF 1002, if the SMF 160 selects the new UPF 1002 for the PDU session or removes the old UPF 1004. The PSA UPF 1006 may send or begin to send the downlink data 1040 to the new UPF 1002, such as indicated in the DL tunnel information. PSA UPF 1006 may send or begin to send the downlink data 1040 to the new UPF 1002, for example, if the new UPF 1002 is added for the PDU session.

The SMF 160, 260 may include the data forwarding indication in a service request. The SMF 160, 260 may include the data forwarding indication in a service request, for example, if the service request is triggered by the network and/or if the SMF 160, 260 removes the old UPF 1004 and does not replace the old UPF 1004 with the new UPF 1002. The data forwarding indication may indicate, to the PSA UPF 1006 that a second tunnel endpoint may be reserved for buffered DL data from the old UPF 1004. The PSA UPF 1006 may buffer or begin to buffer the downlink data it receives from the N6 interface.

The PSA UPF 1006 may send an N4 session modification response 1035 to the SMF 160, 260. The PSA UPF 1006 may become, for example, an N3 terminating point. The PSA UPF 1006 may send CN DL tunnel information, for the old UPF 1004 (e.g., old intermediate UPF) to the SMF 160, 260, for example, if the data forwarding indication is received. The SMF 160, 260 may start a timer, for example, to release the resource in old UPF 1004.

The PSA UPF 1006 may send downlink data 1040 to the new UPF 1002. The SMF 160, 260 may send an N4 session modification request message 1045 (e.g., new UPF address, new UPF DL tunnel ID, and/or the like) to the old UPF 1004. The SMF 160, 260 may send the N4 session modification request message 1045 to the old UPF 1004. The SMF 160, 260 may provide the DL tunnel information for the buffered downlink data, for example, if the service request is triggered by the network and/or if the SMF 160, 260 removes the old UPF 1004. The DL tunnel information may be from the new UPF 1002 and/or may act as an N3 terminating point. The DL tunnel information may be from the new UPF 1002 and/or may act as an N3 terminating point, for example, if the SMF 160, 260 allocates a new UPF 1002. The DL tunnel information may be from the PSA UPF 1006, acting as N3 terminating point. The DL tunnel information may be from the PSA UPF 1006, acting as N3 terminating point, for example, if the SMF 160, 260 does not allocate a new UPF 1002. The SMF 160, 260 may start a timer to monitor the forwarding tunnel. The old UPF 1004 may send the N4 session modification response message 1045 to the SMF 160, 260.

The old UPF 1004 may forward its buffered data 1055 (e.g., buffered downlink data forwarding) to the new UPF 1002 acting as N3 terminating point. The old UPF 1004 may forward its buffered data 1055 to the new UPF 1002 acting as N3 terminating point, for example, if the old UPF 1004 is relocated and/or the forwarding tunnel was established to the new UPF 1002. The old UPF 1004 may forward its buffered data 1050 (e.g., buffered downlink data forwarding), to the PSA UPF 1006 acting as N3 terminating point. The old UPF 1004 may forward its buffered data 1050, to the PSA UPF 1006 acting as N3 terminating point, for example, if the old UPF 1004 is removed, the new UPF 1002 is not assigned for the PDU session, and the forwarding tunnel is established to the PSA UPF 1006.

The SMF 160 may send an N11 context response message 1060 to the AMF 155, 255. The SMF 160 may send the N11 context response message 1060 to the AMF 155, 255, for example, based on or after receipt of the context request 1020, (e.g., Nsmf_PDUSession_UpdateSMContext request) with a cause (e.g., establishment of user plane resources). The context response message 1060 may comprise a Nsmf_PDUSession_UpdateSMContext response. The Nsmf_PDUSession_UpdateSMContext response may comprise: N1 SM container (PDU session ID, PDU session re-establishment indication), N2 SM information (PDU session ID, QoS profile, CN N3 tunnel info, S-NSSAI), cause) The SMF 160, 260 may determine whether UPF reallocation may be performed. The SMF 160, 260 may determine whether UPF reallocation may be performed, for example, based on the wireless device 100, 200 location information, the UPF service area, and/or operator policies. The SMF 160, 260 may generate N2 SM information. The SMF 160, 260 may send an Nsmf_PDUSession_UpdateSMContext response to the AMF 155, 255. The SMF 160, 260 may send the Nsmf_PDUSession_UpdateSMContext response to the AMF 155, 255, for example, to establish the user plane(s) for a PDU session that the SMF 160, 260 may determine to be served by the current UPF (e.g., PDU session anchor or intermediate UPF). The N2 SM information may contain information that the AMF 155, 255 may provide to the RAN 105, 205. The SMF 160, 260 may reject the activation of UP of the PDU session. The SMF 160, 260 may reject the activation of UP of the PDU session, for example, by sending a context request 1020 (e.g., Nsmf_PDUSession_UpdateSMContext response) that may contain an N1 SM container, to the wireless device 100, 200 via the AMF 155, 255 for a PDU session that the SMF 160, 260 determines requires a UPF relocation for a PSA UPF 1006. The N1 SM container may include the corresponding PDU session ID and PDU session re-establishment indication.

The SMF 160, 260 may invoke an Namf_Communication_N1N2MessageTransfer service operation to the AMF 155, 255. The SMF 160, 260 may invoke the Namf_Communication_N1N2MessageTransfer service operation, for example, to establish the user plane(s) for the PDU sessions based on or after/upon reception of the Namf_EventExposure_Notify from the AMF 155, 255 to the SMF 160, 260. The Namf_EventExposure_Notify may have an indication that the wireless device 100, 200 is reachable, for example, if the SMF 160, 260 has pending DL data. The SMF 160, 260 may resume sending DL data notifications to the AMF 155, 255 for DL data.

The SMF 160, 260 may send a message, to the AMF 155, 255, to reject the activation of UP of the PDU session. The SMF 160, 260 may reject the activation of UP of the PDU session, for example, by including a cause in the Nsmf_PDUSession_UpdateSMContext response, if the PDU session corresponds to a LADN and the wireless device 100, 200 is outside the area of availability of the LADN. The SMF 160, 260 may reject the activation of UP of the PDU session, for example, if the AMF 155, 255 notifies the SMF 160, 260 that the wireless device 100, 200 may be reachable for regulatory prioritized service. The SMF 160, 260 may reject the activation of UP of the PDU session, for example, if the PDU session to be activated is not for a regulatory prioritized service and/or if the SMF 160, 260 determines to perform PSA UPF 1006 relocation for the requested PDU session.

The AMF 155, 255 may send, to the RAN 105, 205, an N2 request message 1065 (e.g., N2 SM information received from the SMF 160, 260, security context, AMF 155, 255 signaling connection ID, handover restriction list, MM NAS service accept, list of recommended cells/TAs/NG-RAN node identifiers). The RAN 105, 205 may store, for example, the security context, AMF 155, 255 signaling connection ID, QoS information for the QoS flows of the PDU sessions that may be activated, and/or N3 tunnel IDs in the wireless device RAN context. The MM NAS service accept may include the PDU session status in the AMF 155, 255. The MM NAS service accept may include the PDU session ID and/or the reason why the user plane resources may not be activated (e.g., LADN not available). The MM NAS service accept may include the PDU session ID and/or the reason why the user plane resources may not be activated, for example, if the activation of the UP of a PDU session is rejected by the SMF 160, 260. A local PDU session release for the session request procedure may be indicated to the wireless device 100, 200 via the session status.

The AMF 155, 255 may not wait to receive responses from all the SMFs 160, 260 before it sends the N2 SM information to the wireless device 100, 200. The AMF 155, 255 may not wait to receive responses from all the SMFs 160, 260 before it sends the N2 SM information to the wireless device 100, 200, for example, if there are multiple PDU sessions that may involve multiple SMFs 160, 260. The AMF 155, 255 may wait for all responses from the SMFs 160, 260 before it sends a MM NAS service accept message to the wireless device 100, 200.

The AMF 155, 255 may include at least one N2 SM information from the SMF 160, 260. The AMF 155, 255 may include at least one N2 SM information from the SMF 160, 260, for example, if the procedure is triggered for the PDU session user plane activation. The AMF 155, 255 may send additional N2 SM information, from the SMFs 160, 260, in separate N2 message(s) (e.g., N2 tunnel setup request), if there is additional N2 SM information. The AMF 155, 255 may send one or more N2 request messages to the RAN 105, 205. The AMF 155, 255 may send one or more N2 request messages to the RAN 105, for example, after all the context response messages 1060 are received from all the SMFs 160, 260 associated with the wireless device 100, 200 (e.g., if there are multiple SMFs 160, 260). The N2 request message 1065 may include the N2 SM information received in each of the context response messages 1060 (e.g., Nsmf_PDUSession_UpdateSMContext responses) and PDU session IDs. The N2 request message 1065 may include the N2 SM information received in each of the context response messages 1060 and PDU session IDs, for example, to enable the AMF 155, 255 to associate responses to the relevant SMF 160, 260 (e.g., if multiple SMFs 160, 260 are involved).

The AMF 155, 255 may include a list of recommended cells, TAs, and/or RAN (e.g., NG-RAN) node identifiers in the N2 request 1065. The AMF 155, 255 may include a list of recommended cells, TAs, and/or RAN (e.g., NG-RAN) node identifiers in the N2 request 1065, for example, if the RAN 105, 205 (e.g., NG RAN) node provides the list of recommended cells/TAs/NG-RAN node identifiers. The RAN 105, 205 may use the information from the N2 request, to allocate the RAN 105, 205 notification area. The RAN 105, 205 may use the information from the N2 request to allocate the RAN 105, 205 notification area, for example, if the RAN 105, 205 determines to enable the RRC inactive state for the wireless device 100, 200.

The AMF 155, 255 may include the wireless device's RRC inactive assistance information. The AMF 155, 255 may include the wireless device's RRC inactive assistance information, for example, if the AMF 155, 255 receives an indication, from the SMF 160, 260 (e.g., during a PDU session establishment procedure), that the wireless device 100, 200 is using a PDU session related to latency sensitive services for any of the PDU sessions established for the wireless device 100, 200, and/or if the AMF 155, 255 has received an indication from the wireless device 100, 200 that supports the CM-CONNECTED with RRC inactive state. The AMF 155, 255 may include the wireless device's RRC inactive assistance information. The AMF 155, 255 may include the wireless device's RRC inactive assistance information, for example, based on network configuration.

The RAN 105, 205 may send, to the wireless device 100, 200, a message to perform RRC connection reconfiguration 1070, with the wireless device 100, 200. The RAN 105, 205 may send the message to perform RRC connection reconfiguration 1070, for example, based on the QoS information, for all the QoS flows of the PDU sessions whose UP connections are activated and data radio bearers. The user plane security may be established.

The RAN 105, 205 may send/forward the MM NAS service accept to the wireless device 100, 200. The RAN 105, 205 may send/forward the MM NAS service accept to the wireless device 100, 200, for example, if the N2 request 1065 includes an MM NAS service accept message. The wireless device 100, 200 may locally delete the context of PDU sessions that may not be available in the CN (e.g., 5GC). The wireless device 100, 200 may send uplink data 1075 to the RAN 105, 205, AMF 155, 255, and the PSA UPF 1006.

The wireless device 100, 200 may initiate PDU session re-establishment for the PDU session(s) that may be re-established. The wireless device 100, 200 may initiate PDU session re-establishment, for example, after the service request procedure is complete. The wireless device 100, 200 may initiate PDU session re-establishment, for example, if the N1 SM information is sent (e.g., transmitted) to the wireless device 100 and indicates that some PDU session(s) may be re-established. The uplink data from the wireless device 100 may be sent/forwarded to the RAN 105, 205. The uplink data from the wireless device 100 may be sent/forwarded to the RAN 105, 205, for example, after the user plane radio resources are setup. The RAN 105, 205 (e.g., NG-RAN) may send the uplink data to the provided UPF address and the tunnel ID. The new UPF 1002 may be inserted and/or relocated as a new intermediate UPF for communications (e.g., uplink data 1075) between the AMF (or new UPF 1002) and the PSA UPF 1006. The new UPF 1002 may be removed. The AMF 1002 may communicate (e.g., send uplink data 1075) with the PSA UPF 1006, for example, after the new UPF 1002 may be removed.

As shown in FIG. 11, the RAN 105, 205 may send an N2 request Ack message 1105 to the AMF 155, 255. The N2 request Ack message 1105 may comprise N2 SM information. The N2 SM information may comprise, for example, AN tunnel information, a list of accepted QoS flows for the PDU sessions whose UP connections are activated, and/or a list of rejected QoS flows for the PDU sessions whose UP connections are activated. The N2 request message 1065 may include N2 SM information(s) (e.g., AN tunnel information). The RAN 105, 205 may respond to the N2 SM information by sending a separate N2 message (e.g., N2 tunnel setup response). The N2 request Ack message 1105 may comprise, for example, multiple N2 SM information and/or information to enable the AMF 155, 255 to associate the responses to an SMF 160, 260 (e.g., a relevant SMF 160, 260), if multiple N2 SM information is included in the N2 request message 1065.

The AMF 155, 255 may send, to the SMF 160, 260, an Nsmf_PDUSession_UpdateSMContext request message 1110 (e.g., N2 SM information, such as AN tunnel information, and RAT type) for each or at least one PDU session. The AMF 155, 255 may send/forward the N2 SM information to the relevant SMF 160, 260. The AMF 155, 255 may send/forward the N2 SM information to the relevant SMF 160, 260, for example, if the AMF 155, 255 receives N2 SM information (one or multiple) from the RAN 105, 205. The AMF 155, 255 may include the wireless device time zone (e.g., in the Nsmf_PDUSession_UpdateSMContext request message 1110). The AMF 155, 255 may include the wireless device time zone, for example, if the wireless device time zone changes relative to a last reported wireless device time zone.

The SMF 160, 260 and PCF 135, 235 may perform session management policy modification 1115. The session management policy modification 1115 may comprise, for example, updating and/or removal of session related policies. The SMF 160, 260 may send a notification containing new location information to the PCF 135, 235 (if subscribed). The SMF 160, 260 may send a notification containing new location information to the PCF 135, 235, for example, if dynamic PCC is deployed, such as by invoking an event exposure notification operation (e.g., a Nsmf_EventExposure_Notify service operation). The PCF 135, 235 may provide updated policies. The PCF 135, 235 may provide updated policies, for example, by invoking a policy control update notification message (e.g., an Npcf_SMPolicyControl_UpdateNotify operation).

The SMF 160, 260 may initiate an N4 session modification procedure. The SMF 160, 260 may initiate an N4 session modification procedure, for example, by sending an N4 session modification request message 1120, to the new UPF 1002. The SMF 160, 260 may provide, for example, AN tunnel information if the SMF 160, 260 selects a new UPF 1002 to act as an intermediate UPF for the PDU session. The new UPF 1102 may send an N4 session modification response 1122 to the SMF 160. Downlink data 1125 from the new UPF 1002 may be sent/forwarded to the RAN 105, 205 and wireless device 100, 200. The SMF 150, 250 may send an N4 session modification request message 1130 to the PCF 135, 235. The PCF 135, 235 may send an N4 session modification response message 1132 to the SMF 160, 260. The PCF 135, 235 may send downlink data 1135 to the RAN 105, 205. The wireless device 100, 200. The SMF 160, 260 may send an Nsmf_PDUSession_UpdateSMContext response 1140 to the AMF 155, 255.

The SMF 160, 260 may send an N4 session modification request 1145 to the new UPF 1002 (e.g., new intermediate UPF) acting as an N3 terminating point. The SMF 160, 260 may send an N4 session modification request 1145 to the new UPF 1002 (e.g., new intermediate UPF) acting as an N3 terminating point, for example, to release the forwarding tunnel, if the forwarding tunnel is established to the new UPF 1002 and/or if the timer set, by the SMF 160, 260, for forwarding tunnel is expired. The new UPF 1002 (e.g., new intermediate UPF) may send an N4 session modification response 1146 to the SMF 160, 260. The SMF 160, 260 may send an N4 session modification request 1150 or an N4 session release request to the PSA UPF 1006 and/or the old UPF 1004. The SMF 160, 260 may send an N4 Request 1155 comprising, for example, an N4 session modification request or an N4 session release request. A N4 session modification request, for example, may provide AN tunnel information, if the SMF 160, 260 continues using the old UPF 1004. The SMF 160, 260 may initiate resource release. The SMF 160, 260 may initiate resource release, for example, if the SMF 160, 260 selects a new UPF 1002 to act as intermediate UPF and if the old UPF 1004 may not be a PSA UPF 1006, by sending an N4 session release request (release cause) to the old UPF 1004 after the timer expires.

The old UPF 1004 (e.g., old intermediate UPF) may send an N4 Response 1156. The N4 Response 1156 may comprise, for example, a N4 session modification response and/or an N4 session release response to the SMF 160, 260. The old UPF 1004 may confirm the modification and/or release of resources with the N4 session modification response and/or the N4 session release response message. The AMF 155, 255 may invoke an Namf_EventExposure_Notify service operation. The AMF 155, 255 may invoke an Namf_EventExposure_Notify service, for example, to notify the NFs, that have subscribed to the events, of the mobility related events. The AMF 155, 255 may invoke the Namf_EventExposure_Notify. The AMF 155, 255 may invoke the Namf_EventExposure_Notify, for example, towards the SMF 160, 260 (e.g., by sending one or more messages to the SMF 160, 260), if the SMF 160, 260 subscribed for notification of a wireless device 100, 200 moving into or out of an area of interest and/or if the wireless device's current location indicates that it may be moving into or moving out of the area of interest to which the wireless device may be subscribed. The AMF 155, 255 may invoke the Namf_EventExposure_Notify, for example, towards the SMF 160, 260 (e.g., sending one or more messages to the SMF 160, 260), for example, if the SMF 160, 260 subscribed for LADN DNN and/or if the wireless device 100, 200 may be moving into or outside of an area where the LADN is available, and/or if the wireless device 100, 200 may be in MICO mode and the AMF 155, 255 notified an SMF 160, 260 of the wireless device 100, 200 being unreachable and that SMF 160, 260 may not be able to send DL data notifications to the AMF 155, 255. The AMF 155, 255 may inform the SMF 160, 260 that the wireless device 100, 200 may be or is reachable. The AMF 155, 255 may inform the SMF 160, 260 if the SMF 160, 260 subscribed for wireless device 100, 200 reachability status. Then the AMF 155, 255 may, for example, notify the SMF 160, 260 of wireless device 100, 200 reachability.

Figure 12:
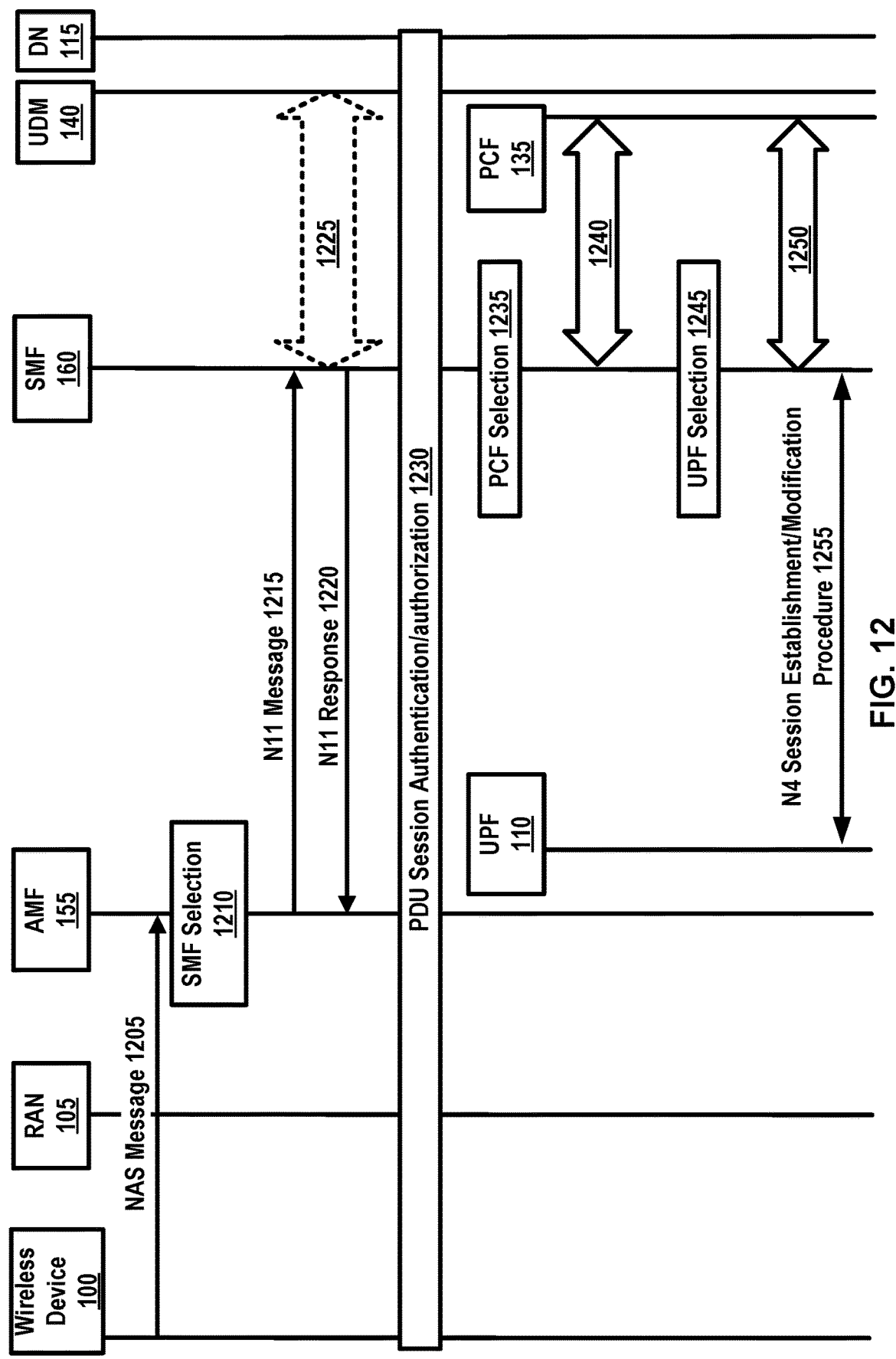
FIG. 12 shows an example of a PDU session establishment procedure.
Figure 13:
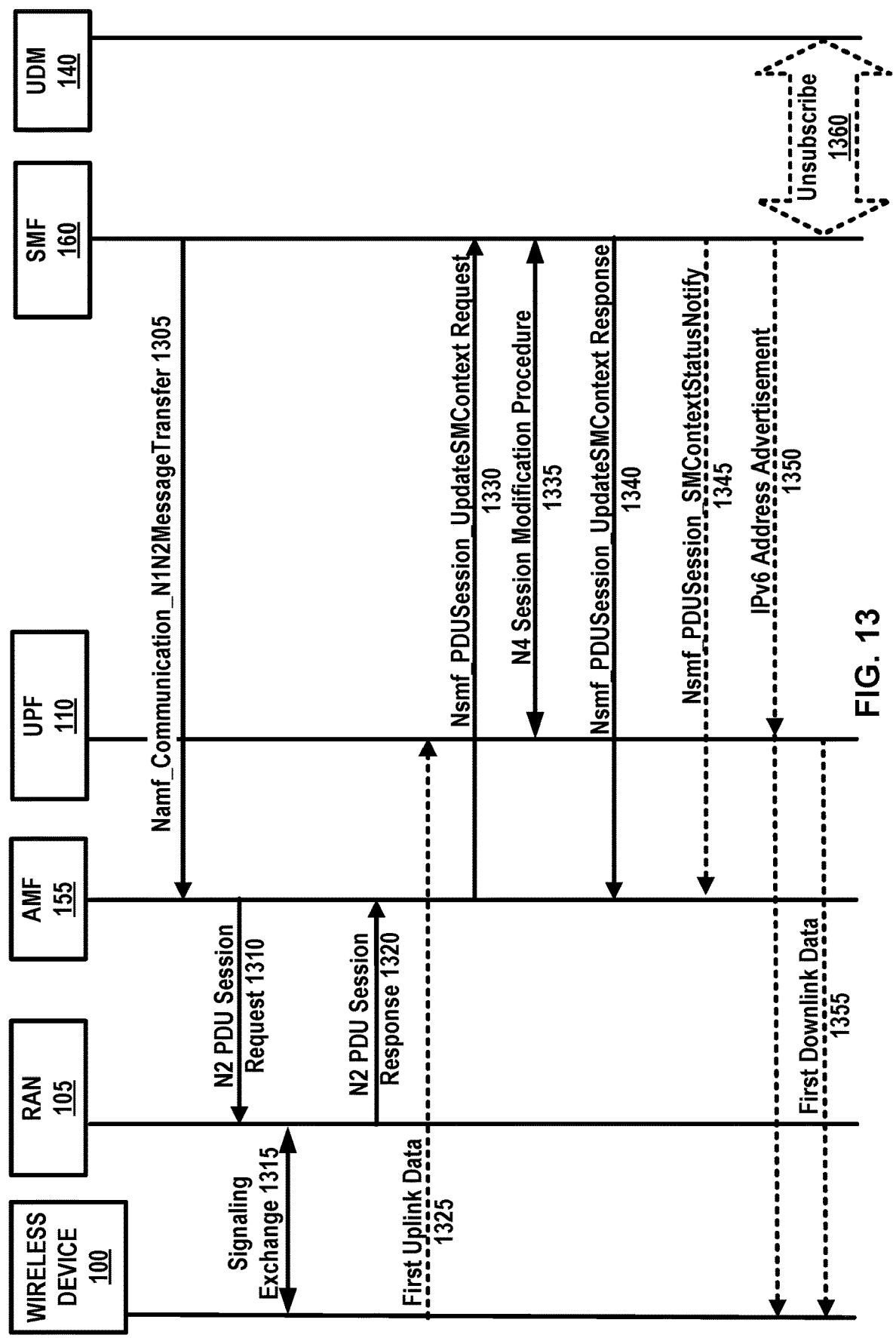
FIG. 13 shows an example PDU session establishment procedure.

A PDU session establishment procedure is shown in FIG. 12 and FIG. 13. A wireless device 100, 200 may send, to an AMF 155, 255, a NAS message 1205 (e.g., PDU session establishment request message, SM NAS message). The NAS message 1205 may comprise, for example, NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like (e.g., if the PDU session establishment procedure is used). The wireless device 100, 200 may generate a new PDU session ID. The wireless device 100, 200 may generate a new PDU session ID, for example, to establish a new PDU session. The wireless device 100, 200 may initiate the wireless device's requested PDU session establishment procedure. The wireless device 100, 200 may initiate the wireless device's requested PDU session establishment procedure, for example, by sending a request type indicating an emergency request, if emergency services are required and if an emergency PDU session may not already be established. The wireless device 100 may initiate the wireless device's requested PDU session establishment procedure. The wireless device 100 may initiate the wireless device's requested PDU session establishment procedure, for example, by sending (e.g., transmitting) a NAS message containing a PDU session establishment request within the N1 SM container. The PDU session establishment request, may comprise, for example, a PDU type, SSC mode, protocol configuration options, and/or the like. The request type, for example, may indicate an initial request, for example, if the PDU session establishment is a request to establish the new PDU session. The request type may indicate an existing PDU session, for example, if the request refers to an existing PDU session between a 3GPP access and a non-3GPP access or to an existing PDN connection in EPC. The request type, for example, may indicate an emergency request, for example, if the PDU session establishment is a request to establish a PDU session for emergency services. The request type, for example, may indicate an existing emergency PDU session, for example, if the request refers to an existing PDU session for emergency services between a 3GPP access and a non-3GPP access.

The NAS message 1205 sent by the wireless device 100, 200 may be encapsulated, by the AN, in an N2 message to the AMF 155, 255. The N2 message to the AMF 155, 255 may comprise, for example, user location information and/or access technology type information. The PDU session establishment request message may comprise a SM PDU DN request container. The SM PDU DN request container may comprise information for the PDU session authorization by the external DN. The wireless device 100, 200 may include the old PDU session ID in the request message. The wireless device 100, 200 may include the old PDU session ID in the request message, for example, if the procedure may be triggered for SSC mode 3 operation. SSC mode 3 operation may indicate the PDU session ID of the on-going PDU session to be released, in the NAS message. The old PDU session ID may be an optional parameter that may be included in the PDU session establishment request message. The AMF 155, 255 may receive, from the AN, the NAS message 1205 (e.g., NAS SM message). The NAS message 1205, for example, may comprise the user location information (e.g., cell ID for the RAN 105, 205). The wireless device 100, 200 may not trigger a PDU session establishment, for a PDU session corresponding to a LADN, for example, if the wireless device 100, 200 is outside the area of availability of the LADN.

The AMF 155, 255 may determine that the NAS message or the SM NAS message corresponds to the request for the new PDU session. The AMF 155, 255 may determine that the NAS message or the SM NAS message corresponds to the request for the new PDU session, for example, based on a request type indicating initial request and/or based on whether the PDU session ID may (or may not) be used for an/any existing PDU session(s) of the wireless device 100, 200. The AMF 155, 255 may determine a default S-NSSAI for the requested PDU session. The AMF 155, 255 may determine a default S-NSSAI for the requested PDU session, for example, if the NAS message does not contain an S-NSSAI, according to the wireless device 100, 200 subscription, if it contains only one default S-NSSAI, and/or based on operator policy. The AMF 155, 255 may perform SMF selection 1210 to select an SMF 160, 260. The AMF 155, 255 may store an association of the S-NSSAI, the PDU session ID, and an SMF ID. The AMF 155, 255 may store an association of the S-NSSAI, the PDU session ID, and an SMF ID, for example, if the request type may indicate an initial request and/or if the request may be due to handover from an Evolved Packet System (EPS). The AMF 155, 255 may select the SMF 160, 260. The AMF 155, 255 may store an association of the new PDU session ID and/or the selected SMF ID. The AMF 155, 255 may select the SMF 160, 260 and may store an association of the new PDU session ID and the selected SMF ID, for example, if the request type is an initial request and/or if the old PDU session ID indicates the existing PDU session is (or may be) contained in the message.

The AMF 155, 255 may send, to the SMF 160, 260, an N11 message 1215 (e.g., Nsmf_PDUSession_CreateSMContext request or Nsmf_PDUSession_UpdateSMContext request). The Nsmf_PDUSession_CreateSMContext request, for example, may comprise SUPI or PEI, DNN, S-NSSAI, PDU session ID, AMF ID, request type, N1 SM container (PDU session establishment request), user location information, access type, PEI, and/or GPSI. The Nsmf_PDUSession_UpdateSMContext request, for example, may comprise SUPI, DNN, S-NSSAI, PDU session ID, AMF ID, request type, N1 SM container (PDU session establishment request), user location information, access type, RAT type, and/or PEI. The AMF 155, 255 may invoke the Nsmf_PDUSession_CreateSMContext request. The AMF 155, 255 may invoke the Nsmf_PDUSession_CreateSMContext request, for example, if the AMF 155, 255 may not have an association with the SMF 160, 260 for the PDU session ID provided by the wireless device 100, 200 (e.g., if the request type indicates initial request). The AMF 155, 255 may invoke the Nsmf_PDUSession_UpdateSMContext request. The AMF 155, 255 may invoke the Nsmf_PDUSession_UpdateSMContext request, for example, if the AMF 155, 255 already has an association with an SMF 160, 260 for the PDU session ID provided by the wireless device 100, 200 (e.g., if the request type indicates an existing PDU session). The AMF ID may be the wireless device's GUAMI, which may uniquely indicate (e.g., identify) the AMF 155, 255 serving the wireless device 100, 200. The AMF 155, 255 may forward the PDU session ID with the N1 SM container containing the PDU session establishment request received from the wireless device 100, 200. The AMF 155, 255 may provide the PEI instead of the SUPI. The AMF 155, 255 may provide the PEI instead of the SUPI, for example, if the wireless device 100, 200 has registered for emergency services without providing the SUPI. The AMF 155, 255 may indicate that the SUPI has not been authenticated. The AMF 155, 255 may indicate that the SUPI has not been authenticated, for example, if the wireless device 100, 200 has registered for emergency services and has not been authenticated.

The SMF 160, 260 may perform registration and subscription retrieval and update 1225 with the UDM 140, 240. The SMF 160, 260 may retrieve the subscription data. The SMF 160, 260 may subscribe to be notified, for example, if subscription data is modified. The SMF 160, 260 may retrieve the subscription data (and subscribe to be notified if subscription data is modified), for example, if the request type indicates neither emergency request nor existing emergency PDU session, if the SMF 160, 260 is not yet registered, and/or if the subscription data is not (or may not be) available. The SMF 160, 260 may determine that the request may be due to a handover between 3GPP access and non-3GPP access or due to a handover from EPS. The SMF 160, 260 may determine that the request may be due to a handover between 3GPP access and non-3GPP access, or due to a handover from the EPS, for example, if the request type indicates an existing PDU session or an existing emergency PDU session. The SMF 160, 260 may indicate (e.g., identify) the existing PDU session based on the PDU session ID. The SMF 160, 260 may not create a new SM context. The SMF 160, 260 may instead update the existing SM context and/or provide the representation of the updated SM context to the AMF 155, 255 in the response. The SMF 160, 260 may indicate (e.g., identify) the existing PDU session to be released. The SMF 160, 260 may indicate (e.g., identify) the existing PDU session to be released, for example, based on the old PDU session ID, if the request type is an initial request, and/or if the old PDU session ID may be included in the Nsmf_PDUSession_CreateSMContext request.

The SMF 160, 260 may send, to the AMF 155, 255, a N11 message response 1220. The N11 response message 1220 may comprise, for example, a PDU session create/update response, a Nsmf_PDUSession_CreateSMContext response (cause, SM context ID or N1 SM container (PDU session reject(cause)), or an Nsmf_PDUSession_UpdateSMContext response. The SMF 160, 260 may select a UPF 110. The SMF 160, 260 may trigger a PDU session establishment authentication/authorization 1230. The SMF 160, 260 may select a UPF 110 (and may trigger the PDU session establishment authentication/authorization 1230), for example, if the SMF 160, 260 performs secondary authorization/authentication, for example, during the establishment of the PDU session by the DN 115 (e.g., DN-AAA server).

The SMF 160, 260 may select an SSC mode for the PDU session. The SMF 160, 260 may select an SSC mode for the PDU session, for example, if the request type indicates an initial request. The SMF 160, 260 may select one or more UPFs as needed. The SMF 160, 260 may allocate an IP address/prefix for the PDU session. The SMF 160, 260 may allocate the IP address/prefix for the PDU session, for example, based on the PDU type (e.g., IPv4 or IPv6). The SMF 160, 260 may allocate an interface identifier to the wireless device 100, 200 for the wireless device 100, 200. The SMF 160, 260 may allocate an interface identifier to the wireless device 100, 200 for the wireless device 100, 200, for example, to build its link-local address if the PDU type is IPv6. The SMF 160, 260 may allocate an IPv6 prefix for the PDU session and N6 point-to-point tunneling (based on UDP/IPv6). The SMF 160, 260 may allocate an IPv6 prefix for the PDU session and N6 point-to-point tunneling, for example, if the PDU type is unstructured.

The SMF 160, 260 may perform PCF selection 1235. The SMF 160, 260 may perform PCF selection 1235, for example, if dynamic PCC is deployed. The SMF 160, 260 may use the PCF 135, 235 already selected for the PDU session. The SMF 160, 260 may use the PCF 135, 235 already selected for the PDU session, for example, if the request type indicates an existing PDU session or an existing emergency PDU session. The SMF 160, 260 may use local policy. The SMF 160, 260 may use local policy, for example, if dynamic PCC is not deployed.

The SMF 160, 260 may perform a session management policy establishment procedure 1240. The SMF 160, 260 may perform the session management policy establishment procedure 1240, for example, to establish a PDU session with the PCF 135, 235. The session management policy establishment procedure 1240 may receive/retrieve, for example, the default PCC Rules for the PDU session from the UDM 140, 240. The GPSI, may be included, if available, at the SMF 160, 260. The SMF 160, 260 may notify an event previously subscribed to by the PCF 135, 235 with a session management policy modification procedure. The PCF 135, 235 may update policy information in the SMF 160, 260. The PCF 135, 235 may update policy information in the SMF 160, 260, for example, if the request type in the N11 message 1215 indicates an existing PDU session. The PCF 135, 235 may provide authorized session-AMBR, the authorized 5QI, and/or ARP to the SMF 160, 260. The PCF 135, 235 may subscribe to the IP allocation/release event in the SMF 160, 260 (and/or may subscribe to other events). The PCF 135, 235 may set the ARP of the PCC rules to a value that may be reserved for emergency services, for example, based on the emergency DNN.

The SMF 160, 260 may select an SSC mode for the PDU session. The SMF 160, 260 may select an SSC mode for the PDU session, for example, if the request type in the N11 message 1215 indicates an initial request. The SMF 160, 260 may, for example, select, during UPF selection 1245, one or more UPFs as needed. The SMF 160, 260, for example, may allocate an IP address/prefix for the PDU session for PDU type IPv4 or IPv6. The SMF 160, 260 may allocate an interface identifier to the wireless device 100, 200. The SMF 160, 260 may allocate an interface identifier to the wireless device 100, 200, for example, for the wireless device 100, 200 to build its link-local address for PDU type IPv6. The SMF 160, 260 may allocate an IPv6 prefix for the PDU session and N6 point-to-point tunneling (e.g., based on UDP/IPv6) for an unstructured PDU type. A MAC and an IP address may not be allocated, for example, by the SMF 160, 260, to the wireless device 100, 200, for the PDU session for an Ethernet PDU type PDU session.

The SMF 160, 260 may maintain the same IP address/prefix that may be allocated to the wireless device 100 in the source network. The SMF 160, 260 may maintain the same IP address/prefix that may be allocated to the wireless device 100 in the source network, for example, if the request type in the N11 message 1215 is an existing PDU session. The SMF 160, 260 may maintain the SSC mode of the PDU session (e.g., the current PDU session Anchor and IP address). The SMF 160, 260 may maintain the SSC mode of the PDU session, for example, if the request type in the N11 message 1215 indicates an existing PDU session referring to an existing PDU session moved between 3GPP access and non-3GPP access. The SMF 160, 260 may trigger new intermediate UPF insertion or allocation of a new UPF 110. The SMF 160 may select the UPF 110, 210 and/or select SSC mode 1, for example, if the request type indicates emergency request.

The SMF 160, 260 may perform a session management policy modification procedure 1250. The SMF 160, 260 may perform a session management policy modification procedure 1250, for example, to report an event to the PCF 135, 235 that has previously subscribed. The SMF 160, 260 may send to the PCF 135, 235 (that may have been previously subscribed) an indication/notification of the allocated wireless device IP address/prefix. The SMF 160, 260 may send to the PCF 135, 235 (that has previously subscribed) an indication/notification of the allocated wireless device IP address/prefix, for example, if the request type is an initial request, if dynamic PCC is deployed, and if the PDU type is IPv4 or IPv6. The PCF 135, 235 may provide one or more updated policies to the SMF 160, 260. The PCF 135 may provide authorized session-AMBR, the authorized 5QI, and/or the ARP to the SMF 160, 260.

The SMF 160, 260 may initiate an N4 session establishment/modification procedure 1255 with the selected UPF 110, 210. The SMF 160, 260 may initiate an N4 session establishment/modification procedure 1255, for example, if the request type indicates an initial request. The N4 session establishment procedure 1255 may comprise an N4 establishment/modification request and/or an N4 establishment/modification response. The SMF 160, 260 may initiate the N4 session modification procedure 1255. The SMF 160, 260 may initiate the N4 session modification procedure 1255, for example, with the selected UPF 110, 210. The SMF 160, 260 may send an N4 session establishment/modification request to the UPF 110, 210, for example, for the PDU session. The SMF 160, 260 may provide packet detection, enforcement, reporting rules, and/or the like to be installed on the UPF 110, 210, for example, for the PDU session. The CN tunnel information may be provided to the UPF 110, 210. The CN tunnel information may be provided to the UPF 110, 210, for example, if the CN tunnel information is allocated by the SMF 160, 260. The SMF 160, 260 may determine an inactivity timer and/or may provide the inactivity timer to the UPF 110, 210. The SMF 160, 260 may determine the inactivity timer and/or may provide the inactivity timer to the UPF 110, 210, for example, if selective user plane deactivation is required for the PDU session. The UPF 110, 210 may acknowledge the inactivity timer. The UPF 110, 210 may acknowledge the inactivity timer, for example, by sending an N4 session establishment/modification response. CN tunnel information may be provided to SMF 160, 260. CN tunnel information may be provided to SMF 160, 260, for example, if CN tunnel information is allocated by the UPF. The SMF 160, 260 may initiate the N4 session establishment/modification procedure 1255 with each UPF 110, 210 of the PDU session. The SMF 160, 260 may initiate the N4 session establishment/modification procedure 1255 with one or more (or each) UPF 110, 210 of the PDU session, for example, if multiple UPFs are selected for the PDU session.

As shown in FIG. 13, the SMF 160, 260 may send, to the AMF 155, 255, an Namf_Communication_N1N2MessageTransfer 1305 message. The Namf_Communication_N1N2MessageTransfer message 1305, for example, may comprise the PDU session ID, access type, N2 SM information (PDU session ID, QFI(s), QoS profile(s), CN tunnel info, S-NSSAI, session-AMBR, PDU session type, and/or the like), and N1 SM container (PDU session establishment accept (QoS Rule(s), selected SSC mode, S-NSSAI, allocated IPv4 address, interface identifier, session-AMBR, selected PDU session type, and/or the like)). The CN tunnel information may comprise tunnel information for the UPF 110, 210 that terminates N3, for example, if multiple UPFs are used for the PDU session. The N2 SM information may carry information that the AMF 155, 255 may forward to the RAN 105, 205 (e.g., the CN tunnel information corresponding to the core network address of the N3 tunnel corresponding to the PDU session; one or multiple QoS profiles and the corresponding QFIs may be provided to the RAN 105; the PDU session ID may be used by AN signaling with the wireless device 100, 200 to indicate to the wireless device 100, 200 the association between AN resources and a PDU session for the wireless device 100, 200; and/or the like). A PDU session may be associated to an S-NSSAI and a DNN. The N1 SM container may comprise the PDU session establishment accept. The AMF 155, 255 may provide the PDU session establishment accept to the wireless device 100, 200. Multiple QoS rules and/or QoS profiles may be included within the N1 SM and in the N2 SM information and/or in the PDU session establishment accept. The Namf_Communication_N1N2MessageTransfer 1305 may comprise the PDU session ID and/or information allowing the AMF 155, 255 to know which access to use for the wireless device.

The AMF 155, 255 may send, to the RAN 105, 205, an N2 PDU session request 1310. The N2 PDU session request 1310 may comprise N2 SM information, NAS message (e.g., PDU session ID, N1 SM container (PDU session establishment accept, and/or the like)). The AMF 155, 255 may send a NAS message. The NAS message may comprise the PDU session ID, the PDU session establishment accept targeted to the wireless device 100, 200, and the N2 SM information received from the SMF 160, 260 within the N2 PDU session request 1310 to the RAN 105, 205.

The RAN 105, 205 may issue an AN specific signaling exchange 1315 (e.g., AN specific resource setup) with the wireless device 100, 200. The RAN 105, 205 may issue an AN specific signaling exchange 1315 (e.g., AN specific resource setup) with the wireless device 100, 200, for example, that may be related to the information received from the SMF 160, 260. An RRC connection reconfiguration procedure may be performed by the wireless device 100, 200 and the RAN 105, 205. The RRC connection reconfiguration procedure may be performed, for example, to establish the necessary RAN 105, 205 resources related to the QoS Rules for the N2 PDU session request 1310 for a RAN 105, 205 (e.g., 3GPP RAN). The RAN 105, 205 may allocate RAN N3 tunnel information for the PDU session. The master RAN 105, 205 node may assign some (e.g., zero or more) QFIs to be setup to a master RAN 105, 205 node. The master RAN 105, 205 node may assign one or more other QFIs to a secondary RAN 105, 205 node, for example, for dual connectivity. The AN tunnel information may comprise a tunnel endpoint for each involved RAN 105, 205 node and the QFIs assigned to each tunnel endpoint. A QFI may be assigned to either the master RAN 105, 205 node or the secondary RAN 105, 205 node. The RAN 105, 205 may send/forward the N2 PDU Session Request 1310 (e.g., NAS message, PDU session ID and N1 SM container (PDU session establishment accept)), for example, to the wireless device 100, 200. The RAN 105, 205 may send/provide the NAS message to the wireless device 100, 200. The RAN 105, 205 may send/provide the NAS message to the wireless device 100, 200, for example, if the necessary RAN 105, 205 resources are established and if the allocation of RAN 105, 205 tunnel information is successful.

The N2 PDU session response 1320 (e.g., N2 PDU Session Request ACK) may comprise a PDU session ID, cause, N2 SM information (e.g., PDU session ID, AN tunnel info, and list of accepted/rejected QFI(s)), and/or the like. The AN tunnel information may correspond to the access network address of the N3 tunnel corresponding to the PDU session. The wireless device 100, 200 may send first uplink data to the UPF 110, 210.

The AMF 155, 255 may forward the N2 SM information received from RAN 105, 205, to the SMF 160, 260, via a Nsmf_PDUSession_UpdateSMContext request 1330. The Nsmf_PDUSession_UpdateSMContext request 1330, may comprise N2 SM information, request type, and/or the like. The SMF 160, 260 may release the rejected QFI associated QoS profiles. The SMF 160, 260 may release the rejected QFI associated QoS profiles, for example, if the list of rejected QFI(s) is included in N2 SM information.

The SMF 160, 260 may initiate an N4 session modification procedure 1335 with the UPF 110, 210. The N4 session modification procedure 1335 may comprise an N4 session modification request and/or an N4 session modification response. The N4 session modification request may be sent, from the SMF 160, 260, to the UPF 110, 210. The N4 session modification response may be sent, from the UPF 110, 210, to the SMF 160, 260. The SMF 160, 260 may provide AN tunnel information and/or the corresponding forwarding rules to the UPF 110, 210. The UPF 110, 210 may provide an N4 session modification response 1335 to the SMF 160, 260.

The SMF 160, 260 may send, to the AMF 155, 255, an Nsmf_PDUSession_UpdateSMContext response message 1340 (e.g., cause message). The SMF 160, 260 may subscribe to the wireless device 100, 200 mobility event notification, from the AMF 155, 255 (e.g., location reporting and wireless device 100, 200 moving into or out of area of interest), by invoking an Namf_EventExposure_Subscribe service operation. The SMF 160, 260 may subscribe, for LADN, to the wireless device 100, 200 moving into or out of LADN service area event notification. The SMF 160, 260 may subscribe, for LADN, to the wireless device 100, 200 moving into or out of LADN service area event notification, for example, by providing the LADN DNN as an indicator for the area of interest. The AMF 155, 255 may forward relevant subscribed to events to the SMF 160, 260.

The SMF 160, 260 may send, to the AMF 155, 255, an Nsmf_PDUSession_SMContextStatusNotify message 1345 (e.g., release message). The SMF 160, 260 may inform the AMF 155, 255, that the PDU session establishment is not successful. The SMF 160, 260 may inform the AMF 155, 255, that the PDU session establishment is not successful, for example, by invoking Nsmf_PDUSession_SMContextStatusNotify 1345. The SMF 160, 260 may release N4 session(s) created, PDU session addresses if allocated (e.g., IP address), and association with the PCF 135, 235. The SMF 160, 260 may generate an IPv6 router advertisement 1350 (e.g., IPv6 router configuration), for PDU type IPv6. The SMF 160, 260 may send the IPv6 router advertisement 1350 to the wireless device 100, 200 via N4 and/or the UPF 110, 210. The UPF 110, 210 may send first downlink data 1355 to the wireless device 100, 200.

The SMF 160, 260 may unsubscribe 1360 (e.g., deregister) from the modification of session management subscription data. The SMF 160, 260 may unsubscribe 1360 (e.g., deregister) from the modification of session management subscription data, for example, for the corresponding SUPI, DNN, and/or S-NSSAI, if the PDU session is not established. The SMF 160, 260 may unsubscribe 1360, for example, by using Nudm_SDM_Unsubscribe (SUPI, DNN, S-NSSAI), if the SMF 160, 260 is not handling a PDU session of the wireless device 100, 200 for the SUPI, DNN, and/or S-NSSAI. The SMF 160, 260 may deregister 1360, from a PDU session. The SMF 160, 260 may deregister 1360, from a PDU session, for example, if the PDU session is not established by using Nudm_UECM_Deregistration, for the SUPI, DNN, and/or PDU session ID.

A wireless device may operate in one or more states. The wireless device may be managed/controlled/instructed/etc. by another device. The device that may manage the wireless device may be determined, for example, based on the state of the wireless device. For example, for a wireless device in an RRC-IDLE state, a core network (e.g., AMF) may manage the mobility of the wireless device, such as using CN paging, a registration procedure, and/or releasing RRC security. For a wireless device in an RRC-Inactive stage, a RAN device (e.g., a base station, gNB, etc.) may manage the mobility of the wireless device, such as using RAN paging, RAN area updates, and/or maintaining RRC security. Releasing and/or resuming an RRC connection of a wireless device in the RRC-Inactive state (e.g., transitioning the wireless device into and/or out of the RRC-Inactive state) may be inefficient, waste radio resources, and/or cause delay, for example, which may be due to paging procedures (e.g., CN paging, RAN paging, etc.) between: the CN or RAN; and the wireless device. Methods, apparatuses, and systems described herein achieve advantages for transitioning a wireless device into (e.g., resuming operation) and/or out of (e.g., releasing operation) the RRC-Inactive state via communications that provide efficiencies over paging procedures.

A network node (e.g., a common network node, an access and mobility management function (AMF), mobility management entity (MME), etc.) may assist in a release operation of a wireless device for a first access technology (e.g., 3GPP network) using a connection established via a second access technology (e.g., non-3GPP network, wireless LAN, CDMA, or any other access technology) with the wireless device. A wireless device may register, to the network node, via one or more (e.g., multiple) base stations of different access technologies. The wireless device may register with the network node via a 3GPP access technology (e.g., LTE, 5G-NR, and/or any other 3GPP access technology) and via a non-3GPP access technology (e.g., wireless LAN, Wi-Fi, etc.).

Release processes for a wireless device in an RRC-INACTIVE state, in at least some systems, may require RAN paging of the wireless device. RAN paging may be used, for example, even if the wireless device is connected via a second access technology. RAN paging may not be an efficient use of resources for the resume process. For example, the base station may already know the state (e.g., RRC-INACTIVE, RRC-IDLE, etc.) of a wireless device, but an AMF may not know the state of the wireless device (e.g., the AMF may be unaware that the wireless device is in RRC-IDLE state). The AMF may be unable to message the wireless device, for example, if it does not know the state of the wireless device. In such systems, a CN may not receive an indication that a wireless device is in a specific RRC state. Additional messaging to the CN to indicate the RRC state of a wireless device may be performed, but may require additional overhead. Messaging the CN to indicate the RRC state of a wireless device, however, may enable wireless device resume procedures without paging. A reduction in paging may provide a reduction of resources necessary to perform resume procedures, and/or may provide power savings over existing technologies that may use inefficient paging (e.g., RAN paging, CN paging, etc.). The improvements described herein may provide resource conservation, faster transition into and out of inactive RRC states (e.g., RRC-INACTIVE state), and/or faster release of an inactive wireless device.

Figure 14:
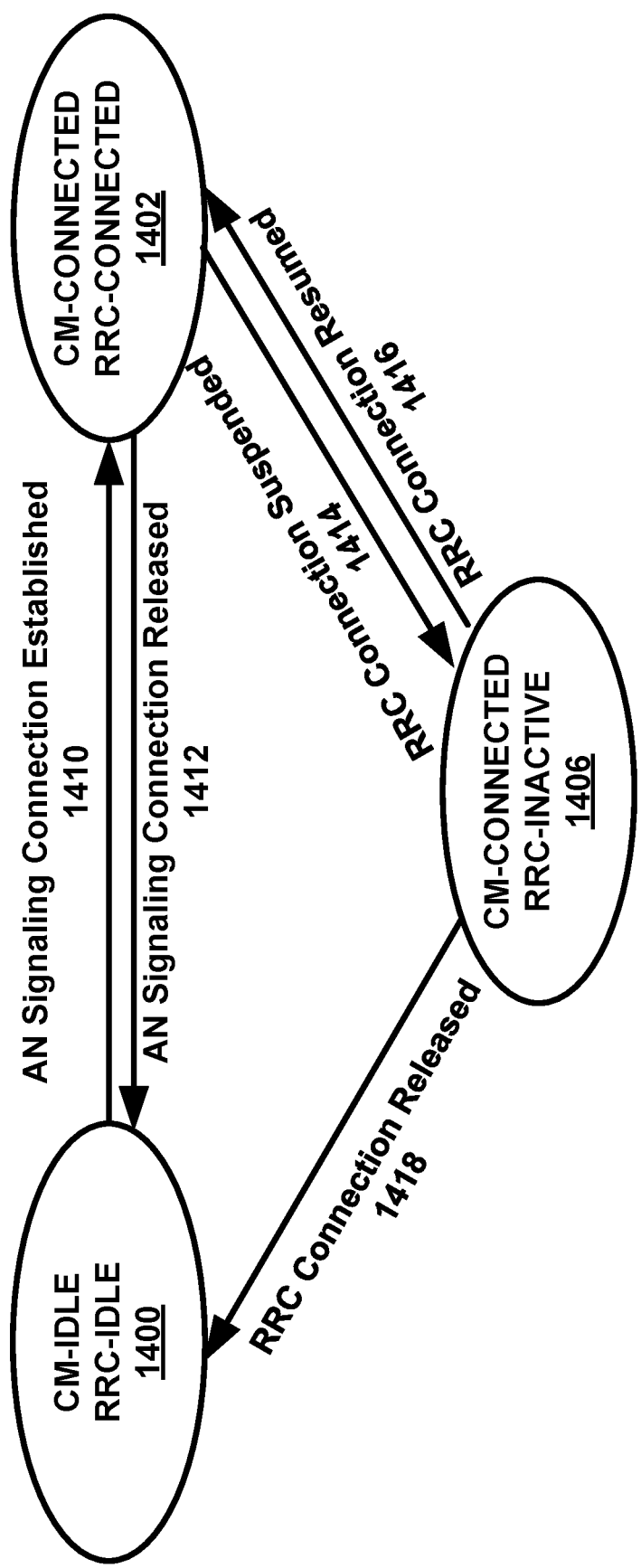
FIG. 14 shows example radio resource control (RRC) state transitions.

FIG. 14 shows example RRC state transitions. A connection management (CM) state may be related to an RRC state.

An RRC inactive state (e.g., RRC-INACTIVE) may be a state in which a wireless device (e.g., wireless device 100, 200) remains in a connected state (e.g., CM-CONNECTED state). The wireless device 100, 200 may move within an area configured by a RAN (e.g., RAN 105, 205, an NG-RAN, etc.), which may be referred to as a RAN notification area (RNA). The wireless device 100, 200 may move within the RNA, for example, without notifying the RAN 105, 205. In an RRC_INACTIVE state, the last base station (e.g., gNB) of a RAN 105, 205 to serve the wireless device 100, 200 may keep the wireless device 100, 200 context and the wireless device-associated connection with the serving AMF 155, 255 and UPF 110, 210 (e.g., N2 connection, N3 connection). A wireless device 100, 200 in an idle state (e.g., CM-IDLE) may be in an RRC-IDLE state. A wireless device 100, 200 in a connected state (e.g., CM-CONNECTED) may be in an RRC-CONNECTED state. The mobility behavior of the wireless device 100, 200 in the RRC-INACTIVE state may be similar to RRC-IDLE state behavior (e.g., cell reselection based on serving cell quality, paging monitoring, periodic system information acquisition, etc.). The wireless device 100, 200 may apply different parameters for RRC-IDLE and RRC-INACTIVE.

A wireless device 100, 200 in CM-IDLE and/or RCC-IDLE 1400 may transition to CM-CONNECTED and/or RCC-CONNECTED 1402. The transition from CM-IDLE and/or RCC-IDLE 1400 to CM-CONNECTED and/or RCC-CONNECTED 1402 may correspond to an AN signaling connection established message 1410 (e.g., initial NAS message). A wireless device 100, 200 in CM-CONNECTED and/or RCC-CONNECTED 1402 may transition to CM-IDLE and/or RRC-IDLE 1400. The transition from CM-CONNECTED and/or RCC-CONNECTED 1402 to CM-IDLE and/or RRC-IDLE 1400 may correspond to an AN signaling connection released message 1412.

A wireless device 100, 200 in CM-CONNECTED and/or RRC-CONNECTED 1402 may transition to CM-CONNECTED and/or RRC-INACTIVE 1406. The transition from CM-CONNECTED and/or RRC-CONNECTED 1402 may correspond to an RRC connection suspended message 1414. A wireless device 100, 200 in CM-CONNECTED and/or RRC-INACTIVE 1406 may transition to CM-CONNECTED and/or RRC-CONNECTED 1402. The transition from CM-CONNECTED and/or RRC-INACTIVE 1406 to CM-CONNECTED and/or RRC-CONNECTED 1402 may correspond to an RRC connection resumed message 1416. A wireless device in CM-CONNECTED and/or RRC-INACTIVE 1406 may transition to CM-IDLE and/or RRC-IDLE 1400. The transition from CM-CONNECTED and/or RRC-INACTIVE 1406 to CM-IDLE and/or RRC-IDLE 1400 may correspond to an RRC connection released message 1418.

Figure 15:
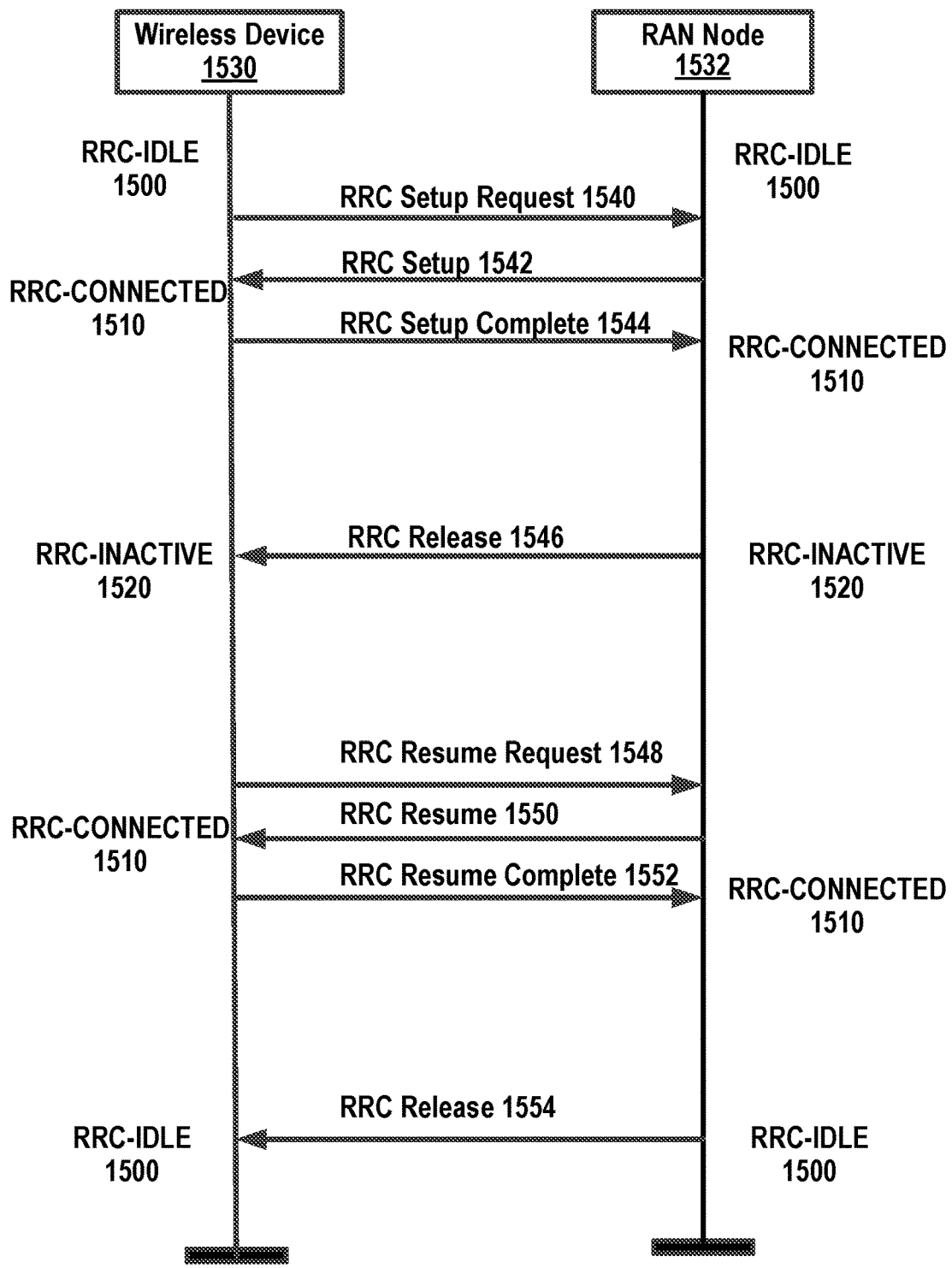
FIG. 15 shows an example call flow for RRC state transitions.

FIG. 15 shows an example call flow for example RRC state transitions. The RRC state transitions include: RRC-IDLE 1500 to RRC-CONNECTED 1510; RRC-CONNECTED 1510 to RRC-INACTIVE 1520; RRC-INACTIVE 1520 to RRC-CONNECTED 1510; and RRC-CONNECTED 1510 to RRC-IDLE 1500. The RRC state transitions are shown in FIG. 15 as part of a single call flow. Each RRC state transition call flow may be performed independently from each other.

Starting with the RRC state transition from RRC-IDLE 1500 to RRC-CONNECTED 1510, a wireless device 1530 (e.g., which may be the same as wireless device 100, 200, 400, or another wireless device) in RRC-IDLE 1500 may send an RRC setup request message 1540 to a RAN node 1532 (e.g., NG-RAN node, base station, gNB, etc.). The wireless device 1530 in RRC-IDLE 1500 may send the RRC setup request message 1540 to the RAN node, for example, to request RRC connection setup with the RAN node 1532. The wireless device 1530 may receive an RRC setup message 1542 from the RAN node 1532. The wireless device 1530 may receive the RRC setup message 1542 from the RAN node 1532, for example, based on or in response to the RRC setup request message 1540. The wireless device 1530 may transition from the RRC-IDLE 1500 to RRC-CONNECTED 1510. The wireless device 1530 may transition from RRC-IDLE 1500 to RRC-CONNECTED 1510, for example, based on or in response to the RRC setup message 1542 from the RAN node 1532. The RRC state maintained at the wireless device 1530 may be updated to reflect that the current RRC state of the wireless device 1530 is RRC-CONNECTED 1510 after the state transition. The wireless device may respond to the RRC setup message 1542. The wireless device may respond to the RRC setup message 1542, for example, by sending an RRC setup complete message 1544 to the RAN node 1532. The RRC state maintained at the RAN node 1532 may be updated to reflect the current RRC state of the wireless device 1530. The RRC state maintained at the RAN node 1532 may be updated to reflect that the current RRC state of the wireless device 1530, for example, is RRC-CONNECTED 1510 after receiving the RRC setup complete message 1544.

For the RRC state transition from RRC-CONNECTED 1510 to RRC-INACTIVE 1520, the RAN node 1532 may send an RRC release 1546 message, to the wireless device 1530. The RAN node 1532 may send the RRC release 1546 message, for example, to request suspension of an RRC connection. The RRC release message 1546, for example, may include suspend information that indicates, to the wireless device 1530, that the RRC release message 1546 is for suspending instead of releasing the RRC connection. The suspend information, for example, may comprise a radio network temporary identity (RNTI) value, a radio access network (RAN) paging cycle, RAN notification area information, and/or the like. The wireless device 1530 may transition from RRC-CONNECTED 1510 to RRC-INACTIVE 1520. The wireless device 1530 may transition from RRC-CONNECTED 1510 to RRC-INACTIVE 1520, for example, based on or in response to the RRC release message 1546 from the RAN node 1532. The RRC state maintained at both the wireless device 1530 and the RAN 1532 node may be updated, for example, to reflect that the current RRC state of the wireless device 1530 is RRC-INACTIVE 1520.

The wireless device 1530 may send an RRC resume request message 1548 to the RAN node 1532 for the RRC state transition from RRC-INACTIVE 1520 to RRC-CONNECTED 1510. The wireless device 1530 may send the RRC resume request message 1548, for example, to request that the suspended RRC connection be resumed. The wireless device 1530 may receive an RRC resume message 1550 from the RAN node 1532. The wireless device 1530 may receive the RRC resume message 1550 from the RAN node 1532, for example, based on or in response to the RRC resume request message 1548. The wireless device 1530 may transition from RRC-INANCTIVE 1520 to RRC-CONNECTED 1510 state. The wireless device 1530 may transition from RRC-INANCTIVE 1520 to RRC-CONNECTED 1510 state, for example, based on or in response to the RRC resume message 1550 from the RAN node 1532. The wireless device may send an RRC resume complete message 1552 to the RAN node 1532. The RRC state maintained at the wireless device 1530 may be updated, for example, to reflect that the current RRC state of the wireless device 1530 is RRC-CONNECTED 1510 after the state transition. The RRC state maintained at the RAN node 1532 may be updated, for example, to reflect that the current RRC state of the wireless device 1530 is RRC-CONNECTED 1510 after receiving the RRC resume complete message 1552 from the wireless device 1530.

The RAN node 1532 may send an RRC release message 1554, to the wireless device 1530, for the RRC state transition from RRC-CONNECTED 1510 to RRC-IDLE 1500. The NG-RAN node 1532, for example, may send an RRC release message 1554, to the wireless device 1530, to request that the RRC connection be released. The wireless device 1530 may transition from RRC-CONNECTED 1510 to RRC-IDLE 1500. The wireless device 1530 may transition from RRC-CONNECTED 1510 to RRC-IDLE 1500, for example, based on or in response to receiving the RRC release message 1554 from the RAN node. The RRC state maintained at both the wireless device 1530 and the RAN node 1532 may be updated to reflect the current RRC state of the wireless device 1530. The RRC state maintained at both the wireless device 1530 and the RAN node 1532 may be updated, for example, to reflect that the current RRC state of the wireless device 1530 is RRC-IDLE 1500.

An access technology may comprise one or more radio access technologies. A 3GPP access technology may comprise a radio access technology defined/developed by 3GPP, such as GPRS, UMTS, EDGE, HSPA, LTE, LTE Advanced, new radio (e.g., 5G), 3GPP-integrated satellite communications access technologies (e.g., 5G-integrated satellite communications access technologies), 6G or any other generation of access technology, and/or the like. Non-3GPP access technology may comprise access technologies defined/developed by one or more standards bodies (e.g., IEEE, 3GPP2, ITU-T, ANSI, etc.) other than 3GPP, or an access technology not specific to a particular standards body. Non-3GPP access technologies may comprise, for example, CDMA2000, Wi-Fi, WiMAX, fixed network, non-3GPP-integrated satellite communications access technologies (e.g., non-5G-integrated satellite communications access technologies), and/or the like.

In at least some wireless communications systems, a wireless device may not respond to a message requesting a connection setup. The wireless device may be unable to respond to a message requesting a connection setup (e.g., a paging message) via a first access technology (e.g., a 3GPP access technology) from a first wireless network, for example, due to the wireless device being engaged in an active communication with a second wireless network using the same first access technology and/or if the wireless device otherwise lacks capability for communications via the first access technology. The wireless device's inability to respond may be due to, for example, transmitter hardware limitations and/or processing limitations of the wireless device. The wireless device may determine not to respond, for example, even if the wireless device may be capable to respond. The wireless device may determine not to respond, for example, if doing so would cause the wireless device to drop/cancel active communications via the first access technology. The wireless device may determine not to respond, for example, in order to conserve resources. The wireless device may determine to accept a connection setup request (e.g., by responding to establish the requested communications via the first access technology) or ignore the connection setup request (e.g., not responding to the message). As the quantity of wireless devices in a network increases and/or as the requirements for network performance in a network increases, such as may be required by 5G and/or other wireless communication technology, failing to respond to a message requesting a connection setup may lead to retransmissions by the device (e.g., base station, node, etc.) requesting the connection setup with the wireless device, which may in turn cause a waste in wireless resources and/or reduced wireless communications performance Increases in noise and/or congestion in the wireless network, for example, may be caused by or associated with the retransmission(s) of the request. Additionally or alternatively, active wireless communications via the second wireless network may be interrupted and/or cancelled, if the wireless device drops/cancels the active communications via the first access technology to respond to the request (e.g., if the request and the active communications use the same access technology). Dropping/canceling active wireless communications may cause or be associated with reductions in network reliability, reductions in network performance, reductions in data throughput, data loss, and/or network congestion due to attempts to re-establish dropped/cancelled communications.

As described herein, a wireless device may respond to the message requesting a connection setup for a first access technology (e.g., 3GPP access technology) using a second access technology (e.g., a non-3GPP access technology). The wireless device may send a response message via the second access technology, for example, if the wireless device is unable to respond to the message using the first access technology (e.g., the access technology via which the message requesting a connection setup was received). The wireless device may send a response message via the second access technology, for example, if the wireless device already has an active communication via the first access technology and responding to the message using the first access technology may cause the wireless device to drop/cancel the active communication. The wireless device may send the response message to indicate a decision to reject and/or to not accept the connection setup request, to indicate to stop transmission and/or retransmission of the connection setup request, and/or to indicate a failure of the connection setup request.

A wireless device may communicate with a second device (e.g., base station, node, core network device, etc.) via a wireless network. The wireless device may communicate with the second device via a first access technology (e.g., 3GPP or other access technology). The wireless device may communicate with a third device via a second access technology (e.g., non-3GPP, wireless LAN, Wi-Fi, satellite communications, or other access technology). The wireless device may communicate via multiple wireless networks. The wireless device may receive one or more messages from the multiple wireless networks. The wireless device may communicate via multiple access technologies on one or more wireless networks. The wireless device may comprise multiple subscriber/user identities/modules/identifiers (e.g., subscriber identity modules (SIMs), embedded and/or electronic SIMs (eSIMs), physical and/or electronic profiles, etc.), for example, each of which may comprise subscription information for a wireless network (e.g., different wireless networks). The wireless device may be able to (e.g., be configured to) transmit in one wireless network (e.g., using 3GPP access technology) at a time, for example, due to limitations of the wireless device (e.g., limitations of hardware, software, processing, etc.) and/or limitations of a second device and/or a network. The wireless device may be able to (e.g., be configured to) transmit and/or receive messages via 3GPP access technology (e.g., 5G, 4G, or any other 3GPP access technologies) and via one or more non-3GPP access technologies (e.g., wireless LAN, Wi-Fi, CDMA, satellite communications, or other non-3GPP access technologies) at a same time (or at substantially the same time). The wireless device may receive a request for communications using a 3GPP access technology via a first wireless network simultaneously (or substantially simultaneously) with the wireless device communicating via a second wireless network using a 3GPP access technology. At least some wireless devices may ignore a request for communications, for example, if the wireless device is not able to communicate via multiple access technologies at the same (or substantially the same) time. The first wireless network may retransmit the request, for example, if the wireless device does not respond. Retransmissions of a request to the wireless device (or to other wireless devices) may lead to network congestion and/or decreased network throughput capacity in the first wireless network. The retransmissions may lead to delays in network connections and/or a decrease in connection reliability in the first wireless network. Wireless resources of the first wireless network may be wasted, for example, if the first wireless network initiates mobile terminated services for the wireless device that is not able to respond to the first wireless network's request for a connection setup. As described herein, a wireless device may send a notification (e.g., using a non-3GPP access technology) to the first wireless network, for example, after or based on receiving the request for communications, indicating that the wireless device declines, rejects, and/or does not accept the request (e.g., connection setup request). The notification may indicate to avoid or stop transmission and/or retransmission of the request. The first wireless network may refrain from retransmitting the request, for example, after or based on receiving the notification from the wireless device.

Wireless network resources may be saved based on the above notification (e.g., via a non-3GPP access technology), such as by avoiding a need for retransmissions of the request. Reducing transmission of repeated requests may reduce interference and noise in the communications channels of the first wireless network, which may increase available communications bandwidth, data throughput, connection speed, and/or reliability. Wireless resources of the first wireless network may be conserved by devices in the first wireless network waiting to initiate mobile terminated services with the wireless device, for example, at least until after the wireless device sends a message to the first wireless network indicating whether the wireless device accepts the communications request. Avoiding interruption or cancelation of active communications between the wireless device and the second wireless network, after or based on the wireless device receiving the request (e.g., for a 3GPP access technology communications connection with the first wireless network), may increase reliability of communications between the wireless device and the second wireless network.

Figure 16:
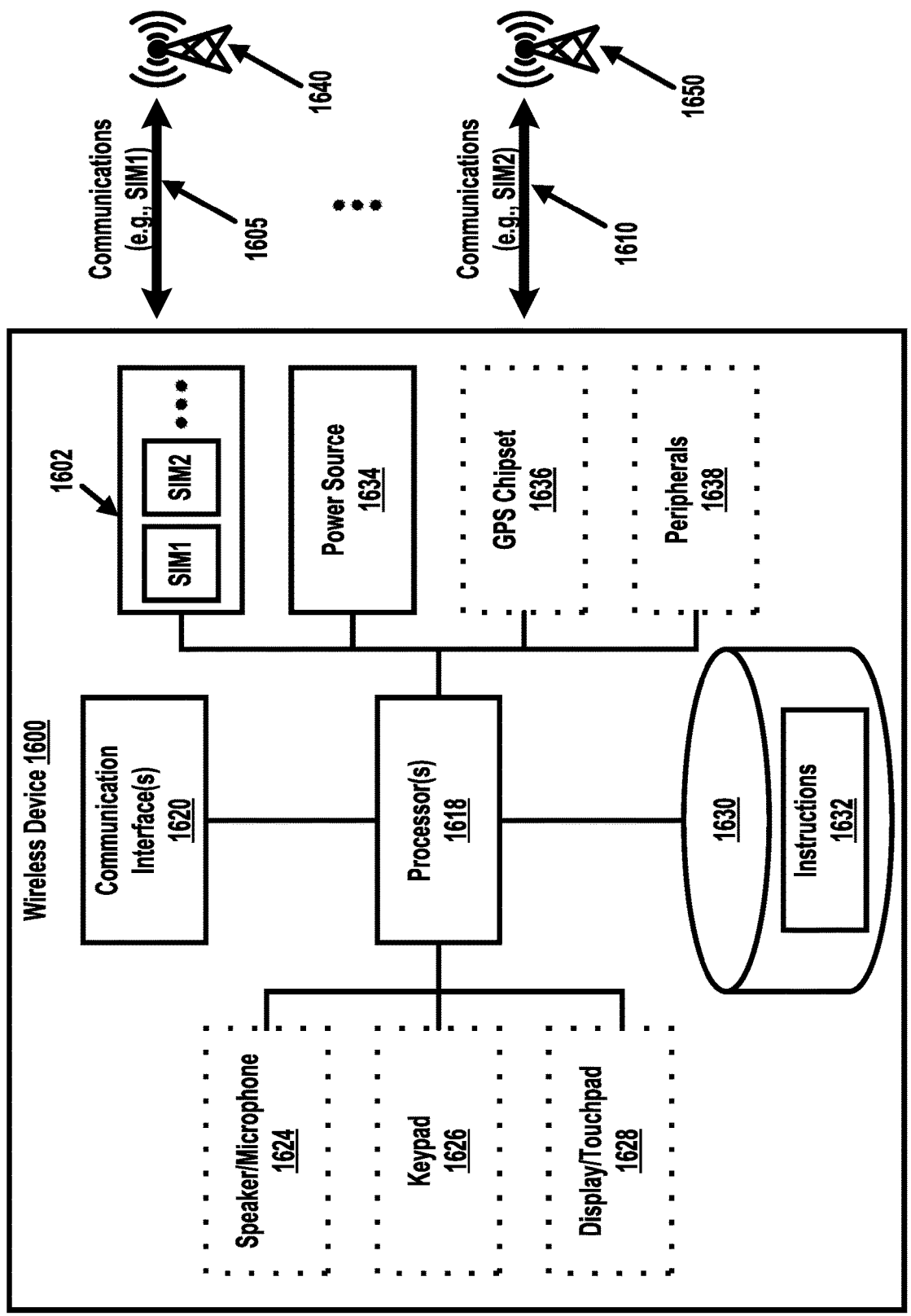
FIG. 16 shows an example architecture for a wireless device comprising multiple subscriber/user identities/modules/identifiers.

FIG. 16 shows an example architecture for a wireless device 1600 comprising multiple subscriber identity modules (SIMs) 1602. The SIMs 1602 may comprise any type of subscriber/user identity/module/identifier, for example, embedded and/or electronic SIMs (eSIMs), physical SIM cards, electronic or physical profiles, or any combination thereof. The wireless device 1600 may be referred to as a "multi-SIM" device. A wireless device that supports two SIMs 1602 may also or alternatively be referred to as a "dual-SIM" device. The wireless device 1600 may be used to address various use cases. The wireless device 1600 may comprise (e.g., be configured with) a personal wireless subscription (e.g., SIM1) and/or a business wireless subscription (e.g., SIM2). This use case may be particularly advantageous for bring-your-own-device (BYOD) initiatives and/or other examples in which a user may communicate via multiple networks and/or using multiple services. The wireless device 1600 may comprise (e.g., be configured with) multiple wireless subscriptions (e.g., an individual plan subscription via SIM1 and a family or business plan subscription via SIM2). The wireless device 1600 may use one of the multiple wireless subscriptions at a given time based on a selected service. The SIMs 1602 of the wireless device 1600 may be registered with a same or different mobile network operators (MNOs). The wireless device 1600 may engage in communications 1605 (e.g., communicate using SIM1) with a first base station 1640 (e.g., a gNB or any other communication device) of a first wireless network (e.g., a PLMN or any other communication device). The wireless device 1600 may engage in communications 1610 (e.g., communicate using SIM2) with a second base station 1650 of a second wireless network (e.g., a PLMN or any other communication device). The wireless device 1600 may engage in other communications (e.g., communicate using one or more other SIMs 1602) with one or more other base stations (e.g., gNBs or any other communication devices) of one or more other wireless networks (e.g., PLMNs or any other communication devices).

The wireless device 1600 may include one or more processors 1618, which may execute instructions stored in memory, such as non-removable memory 1630, removable memory 1632 (such as a Universal Serial Bus (USB) drive, compact disk (CD) or digital versatile disk (DVD), or floppy disk drive), or any other desired storage medium. Instructions may be stored in an attached (or internal) hard drive. The wireless device 1600 may include a security processor (not shown), which may execute instructions of a one or more computer programs to monitor the processes executing on the processor(s) 1618 and any process that requests access to any hardware and/or software components of the wireless device 1600 (e.g., the non-removable memory 1630, the removable memory 1632, the hard drive, a device controller (e.g., a keypad 1626, a display and/or touchpad 1628, a speaker and/or microphone 1624, and/or one or more peripherals 1638), one or more communication interfaces 1620 (e.g., transceiver, network interface, Bluetooth interface, Wi-Fi interface, etc.), and/or a GPS 1636 (e.g., a GPS chipset). The one or more communication interfaces 1620 may include a wired interface, a wireless interface, or a combination of the two. The network interface may facilitate communications with a network (e.g., a RAN, or any other network). The network interface may include a modem (e.g., a cable modem, wired modem, wireless modem, etc.). The network may include communication links, an external network, an in-home network, a provider's wireless, coaxial, fiber, a hybrid fiber/coaxial distribution system (e.g., a DOCSIS network), and/or any other desired network. The wireless device 1600 may include one or more output devices, such as the display and/or touchpad 1628 (e.g., a screen, a display device, a monitor, a television, etc.), and/or one or more output device controllers, such as a video processor. The wireless device 1600 may comprise one or more user input devices, such as a remote control, keyboard, mouse, touch screen, microphone, etc., that may be configured, for example, as one or more of the peripherals 1638. The wireless device 1600 may comprise a location-detecting device, for example, a GPS chipset 1636, which may be able to (e.g., be configured to) receive and/or process global positioning signals and determine, with possible assistance from an external server and antenna, a geographic position of the wireless device 1600.

FIG. 17A, FIG. 17B, and FIG. 17C show example wireless devices 1710, 1720, and 1730, respectively, comprising various quantities of transmitters and receivers. The wireless device 1710 may comprise a communication module 1712 that communicates using a single receiver RX 1714 and a single transmitter TX 1718. The wireless device 1720 may comprise a communication module 1722 that communicates using two receivers RX 1724 and RX 1726 and a single transmitter TX 1728. The wireless device 1730 may comprise a communication module 1732 that communicates using two receivers RX 1734 and RX 1736 and two transmitters TX 1738 and 1740. A wireless device may have any quantity of receivers and/or transmitters.

The wireless device 1710 may send a message to a first base station 1750 (e.g., a gNB or any other communication device) of a first wireless network (e.g., a PLMN or any other communication device) using the transmitter TX 1718. The wireless device 1710 may receive a message from the first base station 1750 (e.g., a gNB or any other communication device) of the first wireless network (e.g., a PLMN or any other communication device) using the receiver RX 1714. The wireless device 1710 may send a message to a second base station 1760 (e.g., a gNB or any other communication device) of a second wireless network (e.g., a PLMN or any other communication device) using the transmitter TX 1718, The wireless device 1710 may receive a message from the second base station 1760 (e.g., a gNB or any other communication device) of the second wireless network (e.g., a PLMN or any other communication device) using the receiver RX 1714. The wireless device 1710 may communicate (e.g., send and/or receive a message) with one of the first base station 1750 (e.g., a gNB or any other communication device) or the second base station 1760 (e.g., a gNB or any other communication device) at a given time.

The wireless device 1720 may send a message to the first base station 1750 (e.g., a gNB or any other communication device) of the first wireless network (e.g., a PLMN or any other communication device) using the transmitter TX 1728. The wireless device 1720 may receive a message from the first base station 1750 (e.g., a gNB or any other communication device) of the first wireless network (e.g., a PLMN or any other communication device) using the receiver RX 1724. The wireless device 1720 may send a message to the second base station 1760 (e.g., a gNB or any other communication device) of the second wireless network (e.g., a PLMN or any other communication device) using the transmitter TX 1728. The wireless device 1720 may receive a message from the second base station 1760 (e.g., a gNB or any other communication device) of the second wireless network (e.g., a PLMN or any other communication device) using the receiver RX 1726. The wireless device 1720 may send a message to one of the first base station 1750 (e.g., a gNB or any other communication device) or the second base station 1760 (e.g., a gNB or any other communication device) at a given time using the transmitter TX 1728. The wireless device 1720 may receive one or more messages from one or both of the first base station 1750 (e.g., a gNB or any other communication device) and/or the second base station 1760 (e.g., a gNB or any other communication device) at a given time.

The wireless device 1730 may send a message to the first base station 1750 (e.g., a gNB or any other communication device) of the first wireless network (e.g., a PLMN or any other communication device) using the transmitter TX 1738. The wireless device 1730 may receive a message from the first base station 1750 (e.g., a gNB or any other communication device) of the first wireless network (e.g., a PLMN or any other communication device) using the receiver RX 1734. The wireless device 1730 may send a message to the second base station 1760 of the second wireless network (e.g., a PLMN or any other communication device) using the transmitter TX 1740. The wireless device 1730 may receive a message from the second base station 1760 (e.g., a gNB or any other communication device) of the second wireless network (e.g., a PLMN or any other communication device) using the receiver RX 1736. The wireless device 1730 may communicate (e.g., send and/or receive one or more messages) with one or both of the first base station 1750 (e.g., a gNB or any other communication device) and/or the second base station 1760 (e.g., a gNB or any other communication device) at a given time.

Multi-SIM devices may support a variety of implementations and/or behaviors (e.g., Dual-SIM Single Standby (DSSS), Dual-SIM Dual Standby (DSDS), Dual SIM Dual Active (DSDA), etc.). A multi-SIM device may use a common radio and/or baseband component that may be shared among the multiple SIMs of the multi-SIM device.

A wireless device 1710, 1720 may receive a signal/message (e.g., a paging message) from a first wireless network (e.g., a PLMN or any other communication device) at a time that the wireless device 1710, 1720 may be actively communicating (e.g., in a connected state) with a second wireless network (e.g., a PLMN or any other communication device). The wireless device 1710, 1720 may be unable to respond to the signal received from the first wireless network (e.g., a PLMN or any other communication device) due to, for example, transmitter limitations of the wireless device 1710, 1720 (e.g., limitations due to hardware, software, processing, etc.), if the wireless device 1710, 1720 is actively communicating with the second wireless network (e.g., a PLMN or any other communication device). The wireless device 1710, 1720 may be unable to initiate a connection establishment procedure with the first wireless network (e.g., a PLMN or any other communication device), if the wireless device 1710, 1720 is actively communicating with the second wireless network (e.g., a PLMN or any other communication device). The transmission of the signal/message from the first wireless network (e.g., a PLMN or any other communication device) to the wireless device 1710, 1720 may be a waste of resources, for example, if the wireless device 1710, 1720 does not respond to the signal/message, for example, even after successfully receiving the signal/message. The transmission of the signal/message for which a response is not received from the wireless device 1710, 1720 may reduce the resource utilization efficiency of the first wireless network (e.g., a PLMN or any other communication device). The first wireless network (e.g., a PLMN or any other communication device) retransmitting the signal/message to the wireless device 1710, 1720 if the wireless device 1710, 1720 did not respond to the first transmission of the signal by the first wireless network (e.g., a PLMN or any other communication device) may further compound the waste of resources. The first wireless network (e.g., a PLMN or any other communication device) may determine that the wireless device 1710, 1720 did not respond, for example, due to a weak radio channel conditions and/or a lack of retransmission of the signal/message.

A wireless network architecture may reduce the above-mentioned waste in resources. A first base station 1750 (e.g., a gNB or any other communication device) of a first wireless network (e.g., a PLMN or any other communication device)

may send a signal/message (e.g., a paging message) to a wireless device 1710, 1720 to request a connection with the wireless device 1710, 1720 using a first access technology (e.g., a first 3GPP access technology). The wireless device 1710, 1720 may receive the signal from the first base station 1750 (e.g., a gNB or any other communication device) of the first wireless network (e.g., a PLMN or any other communication device). The wireless device 1710, 1720 may be unable to send a response via the first access technology, for example, if the wireless device 1710, 1720 is engaged in active communication with a second wireless network (e.g., a PLMN or any other communication device) using a second access technology (e.g., a second 3GPP access technology that may be the same as or different from the first 3GPP access technology). Transmitter hardware of the wireless device 1710, 1720 may limit the wireless device 1710, 1720 to sending one or more messages via one wireless network (e.g., a PLMN or any other communication device) at a given time. The wireless device 1710, 1720 may respond to the received signal by sending a message, such as a notification response message (e.g., a non-access stratum (NAS) notification response message), via a second base station of a non-3GPP access technology (e.g., wireless LAN, Wi-Fi, and/or any other non-3GPP access technology), to the first wireless network (e.g., a PLMN or any other communication device). The wireless device 1710, 1720 may send the response message to indicate a rejection or failure of the connection request using the first access technology, thereby increasing resource utilization efficiency and increasing service continuity of the wireless device 1710, 1720, as described further herein.

Paging Occasions (POs) may be determined/calculated based on a wireless device identifier (e.g., IMSI and/or 5G-S-TMSI for EPS and/or 5GS, respectively) and the shortest discontinuous reception (DRX) cycle (e.g., the shorter of a wireless-device-specific DRX cycle and a cell-specific-DRX cycle) of the wireless device. The first base station 1750 (e.g., a gNB or any other communication device) of the first wireless network (e.g., a PLMN or any other communication device) may send a paging message to the wireless device 1710, 1720 during a PO. The wireless device 1710, 1720 may receive the paging message via the first wireless network (e.g., a PLMN or any other communication device) during the PO. The wireless device 1710, 1720 may determine whether to respond to the paging message (e.g., based on user-configured rules and/or information comprised in the paging message), for example, if the wireless device 1710, 1720 is engaged in an active communication with a second communication system (e.g., a second wireless network (e.g., a PLMN or any other communication device)). The wireless device 1710, 1720 may determine whether to stop/drop the active communication with the second communication system if the wireless device makes a determination to respond to the paging message. The wireless device 1710, 1720 may autonomously release an RRC connection locally (e.g., without engaging in signaling exchanges) with the second communication system and abruptly discontinue the active communication with the second communication system, for example, in an absence of a procedure for suspension of an ongoing activity/communication (e.g., the signaling activity and/or the active communication with the second communication system). The second communication system may interpret the wireless device 1710, 1720's abrupt discontinuation of the active communication as an error case. The wireless device 1710, 1720's abrupt discontinuation of the active communication may distort statistics in the second communication system and/or may misguide algorithms that are based on the statistics in the second communication system.

Dual-SIM Dual-Standby (DSDS) terminals may be registered in two wireless networks (e.g., PLMNs or any other communication devices) simultaneously (or substantially simultaneously), and/or may use a single transmitter and more than one receiver (e.g., the wireless device 1720). A wireless device 1710, 1720 may be RRC connected to one wireless network (e.g., the second wireless network (e.g., a PLMN or any other communication device)) at a time. The wireless device 1710, 1720 may attempt to at least receive paging messages from the other wireless network (e.g., the first wireless network (e.g., a PLMN or any other communication device)) if the wireless device 1710, 1720 is presently RRC connected to the one wireless network (e.g., the second wireless network (e.g., a PLMN or any other communication device)). The wireless device 1710 may create time gaps on an active connection with the one wireless network (e.g., the second wireless network (e.g., a PLMN or any other communication device)) during which the wireless device 1710 may listen for paging messages via the other wireless network, for example, for paging message reception from the other wireless network (e.g., the first wireless network (e.g., a PLMN or any other communication device)) with a single receiver (e.g., receiver RX 1714 of wireless device 1710). The wireless device 1710 may stop/drop a connection on the second wireless network (e.g., a PLMN or any other communication device), if the wireless device 1710 receives a paging message via the first wireless network (e.g., a PLMN or any other communication device). The unexpected behavior of the wireless device 1710 abruptly stopping/dropping the connection on the second wireless network (e.g., a PLMN or any other communication device) (e.g., not cleanly releasing the connection) may cause decreased performance and/or reduced system capacity.

Examples herein are described with respect to a wireless device 1710 or 1720 responding to a request for two-way communications vi a paging message from a first wireless network (e.g., a PLMN or any other communication device) at a time that the wireless device 1710 or 1720 is engaged in active two-way communications with a second wireless network (e.g., a PLMN or any other communication device), for example, based on the wireless device 1710 or 1720 being limited by only having one transmitter TX 1718 or TX 1728, respectively. These examples may be applicable to a wireless device having any quantity greater than one transmitter TX, for example, wireless device 1730 that comprises two transmitters TX 1738 and TX 1740, if the wireless device already has one active connection with a different wireless network (e.g., a PLMN or any other communication device) for each transmitter TX comprised by the wireless device and receives a paging message from yet another wireless network (e.g., a PLMN or any other communication device) requesting two-way communications with the wireless device that already has one active connection with a different wireless network (e.g., a PLMN or any other communication device) for each transmitter TX comprised by the wireless device. These examples may be applicable to a wireless device that has as many active two-way communications as the wireless device is capable of maintaining with any wireless base stations (e.g., gNBs or any other communication devices) of any terrestrial and/or satellite wireless networks (e.g., PLMNs or any other communication devices) at a time that the wireless device receives a paging message from a base station (e.g., a gNB or any other communication device) of yet another wireless network (e.g., a PLMN or any other communication device) requesting two-way communications with the wireless device.

Figure 18:
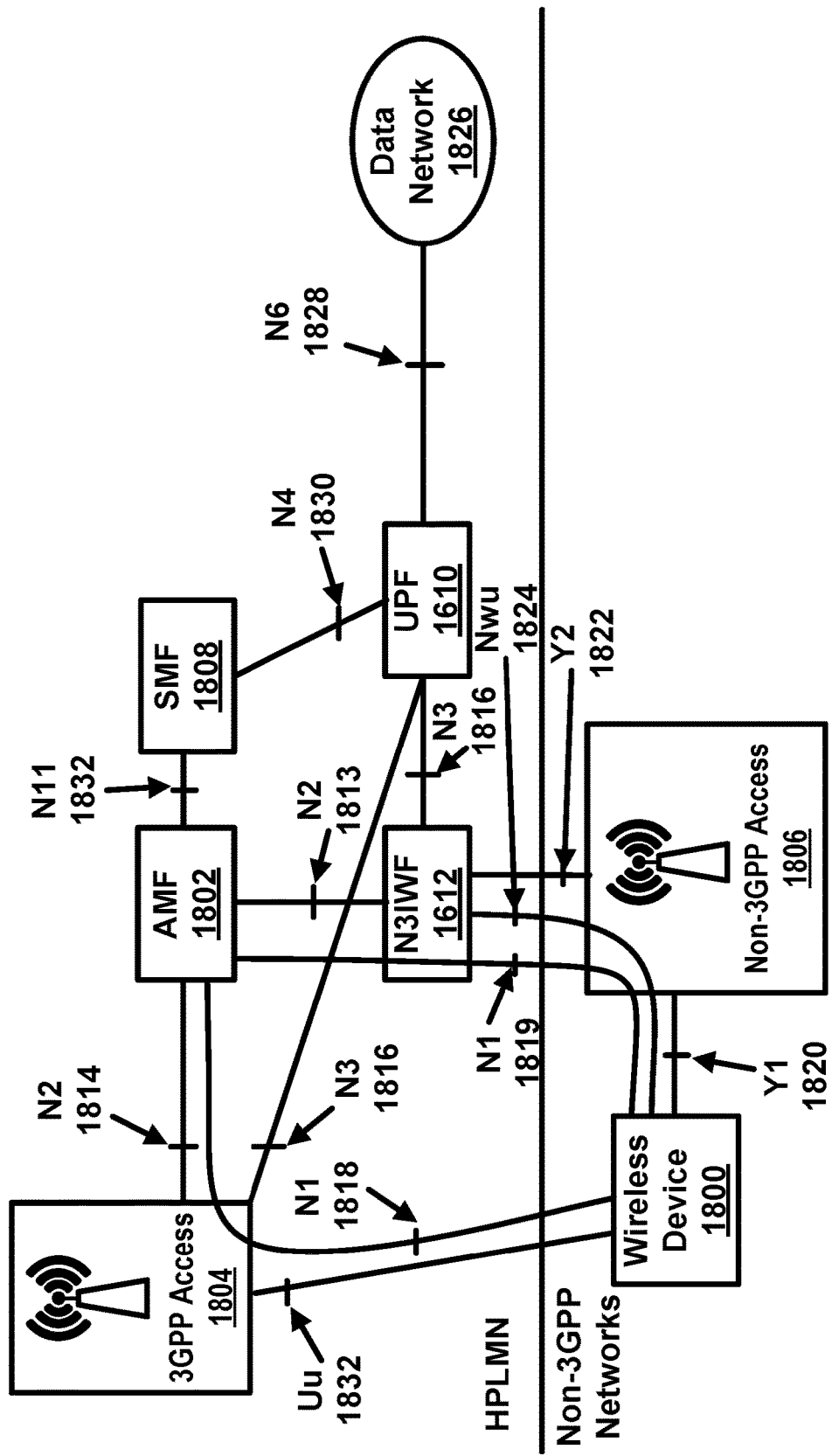
FIG. 18 shows an example system architecture for simultaneous access via a first access technology and a second access technology.

FIG. 18 shows an example for simultaneous access via a first access technology and a second access technology. A wireless device 1800 (e.g., which may be the same as wireless device 100, 200, 400, or another wireless device) may register to or with an AMF 1802 via both a 3GPP access network 1804 (e.g., via path 1818) and a non-3GPP access network 1806 (e.g., via path 1819), as shown in FIG. 18. The 3GPP access network 1804 may be, for example, a 5G access network (e.g., NG-RAN), a 4G access network (e.g., LTE), or any other 3GPP access network. The non-3GPP access network 1806 may, for example, be a wireless local access network (WLAN), such as a WLAN implemented in accordance with one of IEEE's 802.11 specifications, a satellite communications network, a wired LAN, or any other non-3GPP access network.

A core network (e.g., a 5GC network), may support connectivity to the wireless device 1800 via the non-3GPP access network 1806. The CN may comprise, for example, the AMF 1802, an SMF 1808, a UPF 1810, and a non-3GPP InterWorking Function (N3IWF) 1812. The non-3GPP access network 1806 may connect to or communicate with the CN via the N3IWF 1812. The interface between the N3IWF 1812 and the AMF 1802 (e.g., CN CP) may be an N2 interface 1813. The interface between the N3IWF 1812 and the UPF 1810 (e.g., 5G Core UP functions) may be one or more N3 interfaces 1816. The UPF 1810 may interface with a data network 1826 over an N6 interface 1828.

The CN (e.g., a 5GC) may use the N2 interface 1813 and N3 interface 1816 to communicate with non-3GPP access networks 1806. A wireless device 1800 that accesses the CN (e.g., 5GC) via a non-3GPP access network 1806 may send NAS signaling to the AMF 1802 (e.g., CN CP) functions using the N1 1818 reference point. The 3GPP access network 1804 may communicate with the AMF 1802 via the N2 interface 1814.

The wireless device 1800 may communicate with the AMF 1802 via a 3GPP access 1804 (e.g., NG-RAN). The wireless device 1800 may communicate, via a non-3GPP 1806 access network, with the AMF 1802. Two N1 instances 1818, 1819 (or any other quantity of N1 instances) may be provided for the wireless device 1800. The N1 instance 1818 may be provided between the 3GPP access 1804 (e.g., NG-RAN) and the wireless device 1800. The N1 instance 1819 may be provided between the non-3GPP access 1806 and the wireless device 1800. A wireless device 1800 having a connection to the same CN (e.g., 5GC) of a PLMN over a 3GPP access network 1804 and a non-3GPP access network 1806 may register via a single AMF (e.g., the AMF 1802).

The SMF 1808 may communicate with the UPF 1810 via an N4 interface 1830. The UPF 1810 may communicate with the 3GPP access network 1804 via the N3 interface 1816. The SMF 1808 may communicate with the AMF 1802 via and N11 interface 1832. The 3GPP access network 1804 may communicate with the wireless device 1800 via a Uu interface 1832.

A Y1 reference point 1820 may be used as an interface between the wireless device 1800 and the non-3GPP access network 1806. A Y2 reference point 1822 between the non-3GPP access network 1806 and the N3IWF 1812 may be provided for the transport of NWu traffic. An NWu reference point 1824 may be provided between the wireless device 1800 and the N3IWF 1812, for example, to establish a secure tunnel between the wireless device 1800 and the N3IWF 1812.

Figure 19:
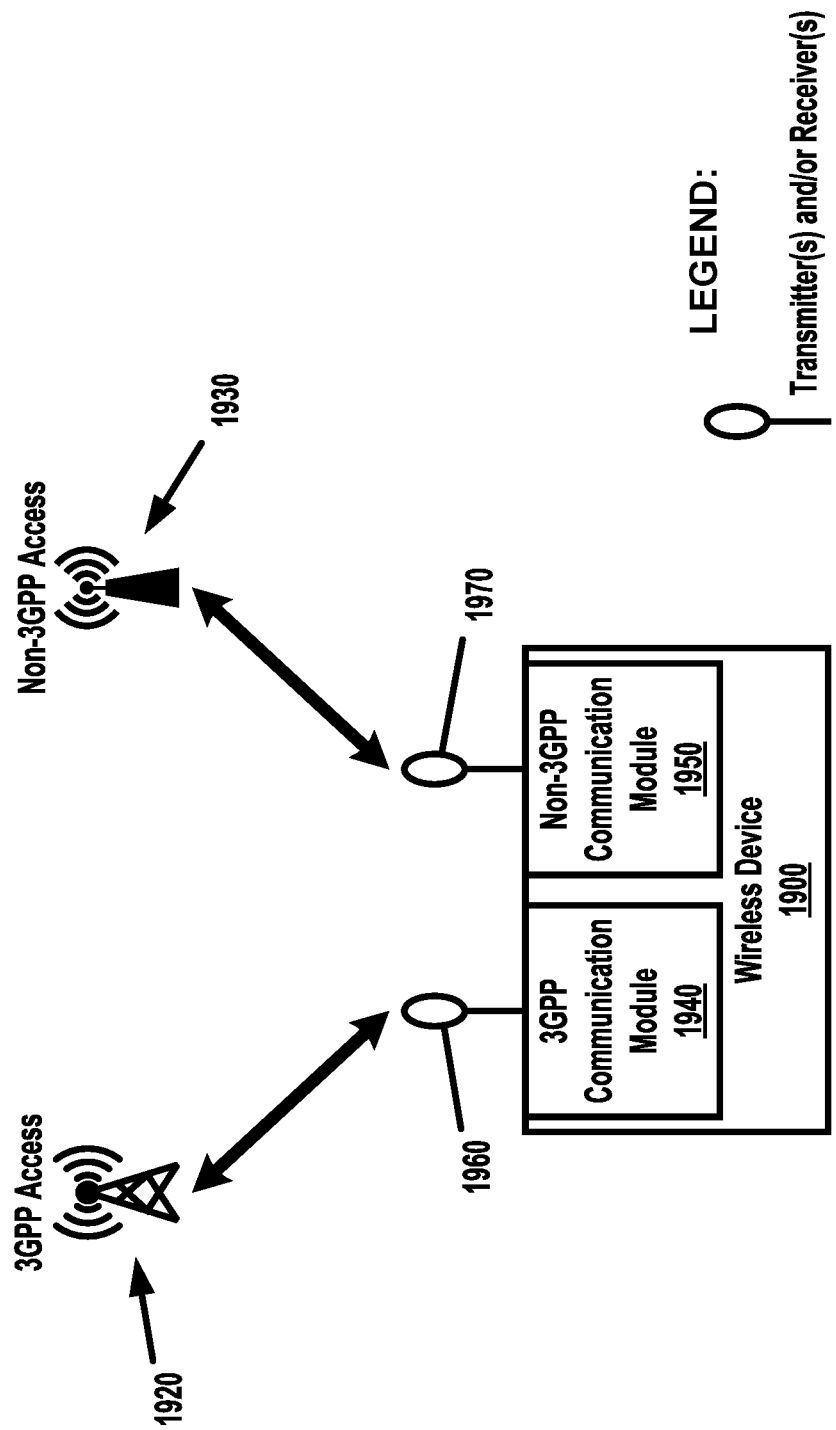
FIG. 19 shows an example wireless device for simultaneous wireless network access via a first access technology and a second access technology.

FIG. 19 shows an example wireless device 1900 for simultaneous wireless network access via a first access technology and a second access technology. The first access technology may include 3GPP access technology (e.g., LTE, 5G-NR, and/or any other 3GPP access technology) provided via one or more wireless base stations 1920 (e.g., a gNB or any other communication device) of one or more wireless networks (e.g., a PLMN or any other communication device). The second access technology may include non-3GPP access technology (e.g., wireless LAN, Wi-Fi, CDMA, satellite, and/or any other non-3GPP access technology) provided via one or more wireless base stations 1930 of one or more non-3GPP networks. The wireless device 1900 may comprise a 3GPP communication module 1940 for communication via the first access technology using one or more transmitters and/or receivers 1960. The wireless device 1900 may comprise a non-3GPP communication module 1950 for communication via the second access technology using one or more transmitters and/or receivers 1970.

Figure 20:
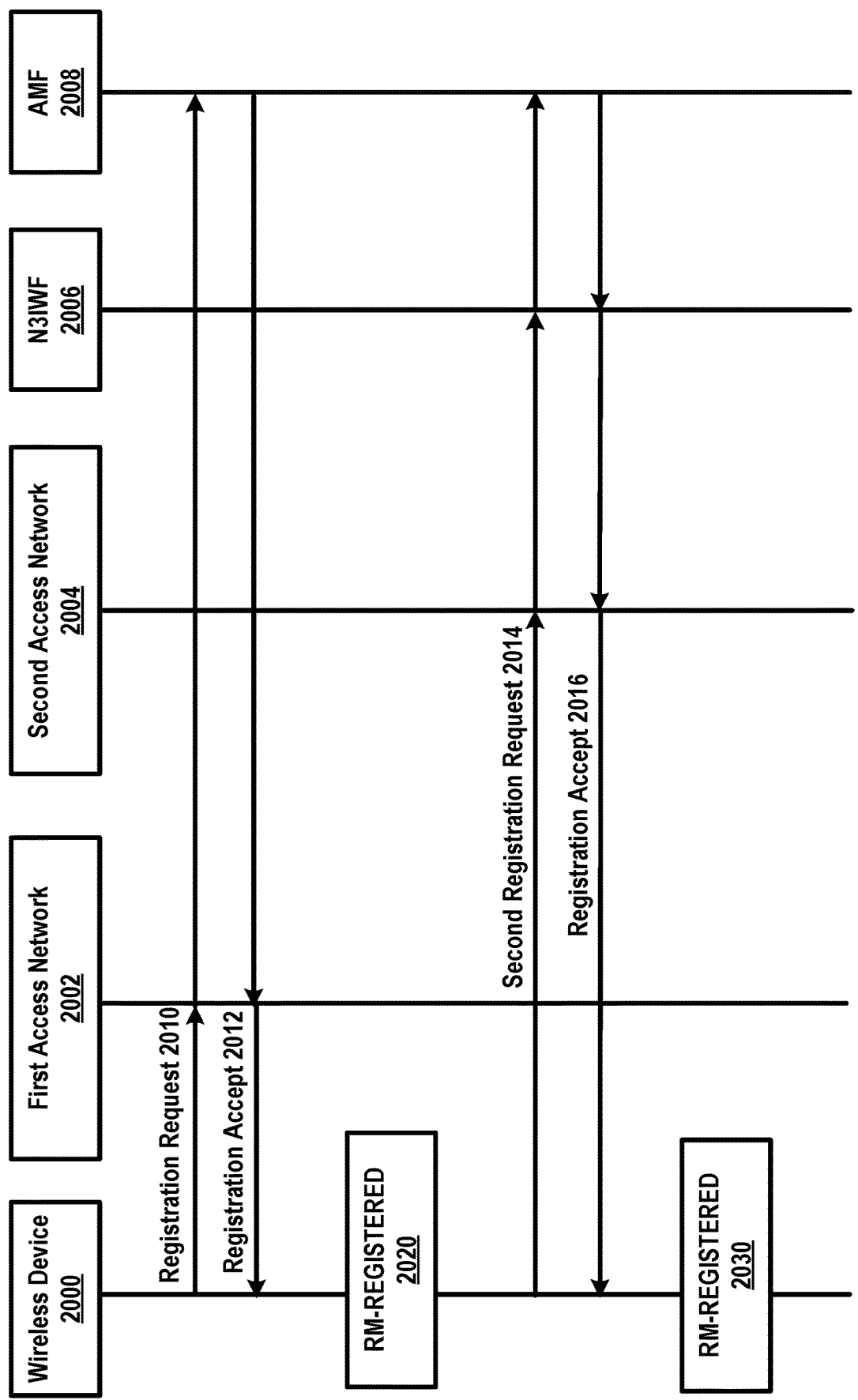
FIG. 20 shows an example registration call flow for registration of a wireless device.

FIG. 20 shows an example registration call flow for registration of a wireless device (e.g., the wireless device 100, 200, 400, or any other wireless device). A wireless device 2000 (e.g., which may be the wireless device 100, 200, 400, or any other wireless device) may register, via a first access network 2002 (e.g., a 3GPP access network) and via a second access network 2004 (e.g., a non-3GPP access network), to a same AMF 2008. The wireless device 2000 may send a registration request message 2010 to the AMF 2008. The wireless device 2000 may send the registration request message 2010 to the AMF 2008, for example, via a first access network 2002. The wireless device 2000 may include, in the registration request message 2010, a wireless device identity (e.g., a 5G globally unique temporary identifier (GUTI) and/or a subscription concealed identifier (SUCI)) for the initial registration via the first access network 2002. The AMF 2008 may accept the registration request 2010. The AMF 2008 may accept the registration request 2010, for example, by sending a registration accept message 2012 to the wireless device 2000 via the first access network 2002. The registration accept message 2012 may comprise a wireless device temporary identity (e.g., a 5G-GUTI). The wireless device 2000 may be in the RM-REGISTERED state 2020 for the first access network 2002, for example, based on or in response to the registration message exchange. The wireless device 2000 may register with the same AMF 2008 via the second access network 2004. The wireless device 2000 may register with the same AMF 2008 via the second access network 2004, for example, by sending a second registration request message 2014 comprising a wireless device identity (e.g., a 5G globally unique temporary identifier (GUTI)) for the initial registration via the second access network 2004. The wireless device 2000 may use the GUTI (e.g., 5G-GUTI) assigned by the AMF, for example, during the registration with the first access network to route to the same AMF. The AMF 2008 may accept the second registration request 2014. The AMF 2008 may accept the second registration request 2014, for example, by sending a second registration accept message 2016 to the wireless device 2000 via the second access network 2004. The second registration accept message 2016 may comprise the wireless device temporary identity (e.g., a 5G-GUTI). The wireless device 2000 may be in the RM-REGISTERED state 2030 for the second access network 2004, for example, based on or in response to the second registration message exchange.

Figure 21:
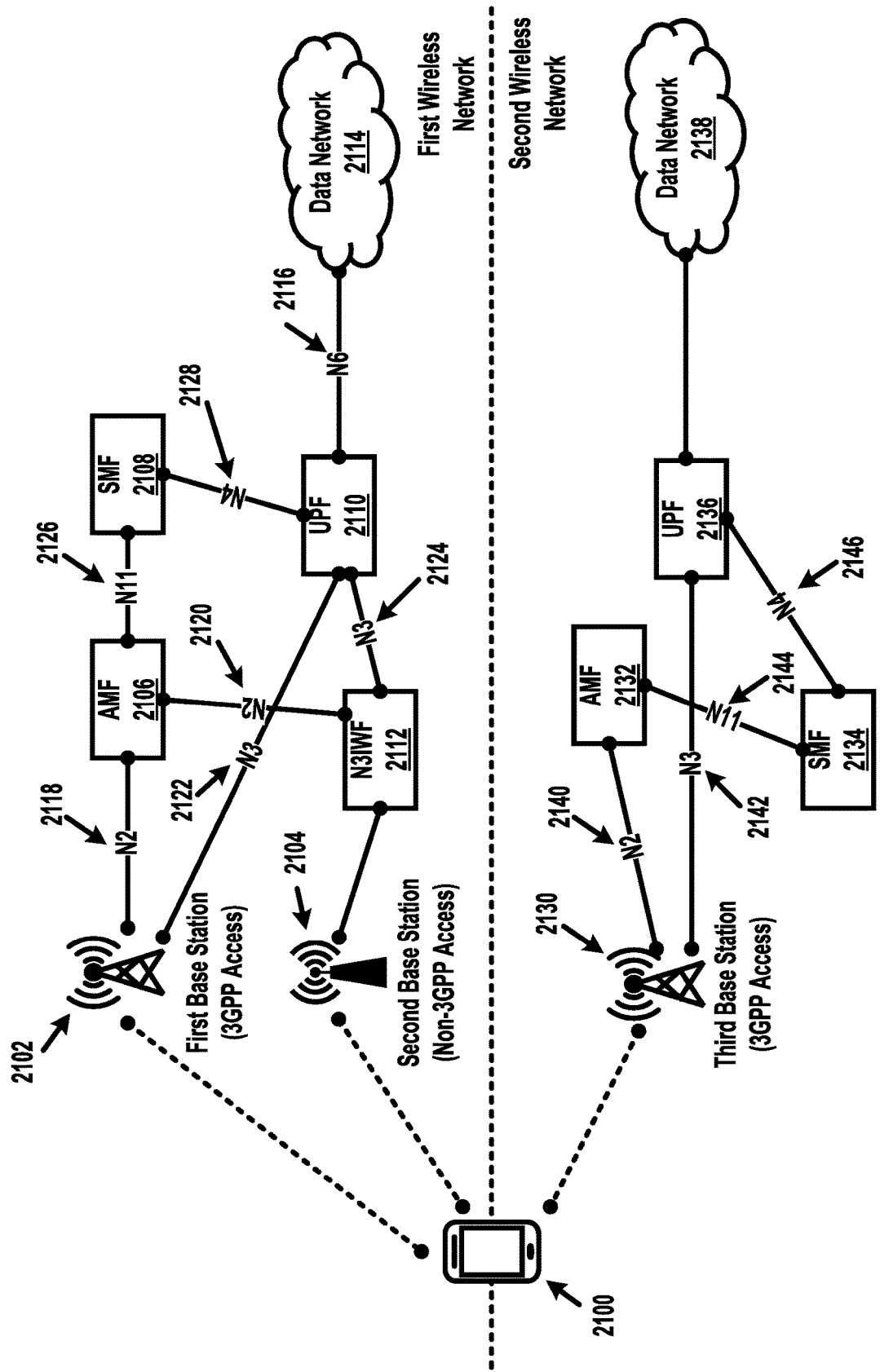
FIG. 21 shows an example network architecture.

FIG. 21 shows an example network architecture (e.g., 5G network architecture). The network architecture may comprise a wireless device 2100 (e.g., which may be the same as wireless device 100, 200, 400, 1600, or another wireless device) and two wireless networks (e.g., PLMNs, or any other communication devices), a first wireless network (e.g., a PLMN, or any other communication device) and a second wireless network (e.g., a PLMN, or any other communication device), as shown in FIG. 21. Both the first wireless network (e.g., a PLMN, or any other communication device) and the second wireless network (e.g., a PLMN, or any other communication device) may use a 3GPP access technology for communications with the wireless device 2100. The first wireless network (e.g., a PLMN, or any other communication device) may also use a non-3GPP access technology for communications with the wireless device 2100. The wireless device 2100 may comprise a multi-SIM wireless device, for example, a dual-SIM wireless device.

The wireless device 2100 may be capable of transmitting (e.g., configured to transmit) on one of the first or second wireless network (e.g., PLMNs, or any other communication devices) via a 3GPP access technology at a time. The wireless device 2100 may receive a message (e.g., paging message) comprising a request for 3GPP access technology communications via the first wireless network (e.g., a PLMN, or any other communication device) simultaneously (or near simultaneously) with the wireless device 2100 actively communicating via the second wireless network (e.g., a PLMN, or any other communication device) using a 3GPP access technology. The wireless device 2100 may determine a quality of service and/or a radio broadcast signal quality provided by the first wireless network (e.g., a PLMN, or any other communication device) based on the received message (e.g., paging message). The wireless device 2100 may avoid (e.g., may be configured to avoid) interrupting or canceling active communications via one wireless network (e.g., the second wireless network), after or based on the wireless device 2100 receiving a request for communications via another wireless network (e.g., the first wireless network). The wireless device 2100 may send a notification via a non-3GPP access technology to the first wireless network (e.g., a PLMN, or any other communication device), after or based on the request received from the first wireless network (e.g., a PLMN, or any other communication device), indicating that the wireless device 2100 declines, rejects, and/or does not accept the communications request. The notification may indicate to the first wireless network to prevent and/or stop transmission or retransmissions of the request for communications. The wireless device 2100 may decline, reject, and/or not accept the communications request from the first wireless network (e.g., a PLMN, or any other communication device) regardless of a quality of service provided by the first wireless network (e.g., a PLMN, or any other communication device) and/or based on the quality of service provided by the active connection with the second wireless network (e.g., a PLMN, or any other communication device) satisfying a minimum threshold level of quality.

The first wireless network (e.g., a PLMN, or any other communication device) may comprise a first base station 2102 (e.g., a gNB or an ng-eNB) that may use a first 3GPP access technology (e.g., 5G, NG-RAN, or other 5G 3GPP access technology) for communicating with the wireless device 2100, a second base station 2104 that may use a non-3GPP access technology (e.g., a wireless LAN, Wi-Fi, or other non-3GPP access technology) for communicating with the wireless device 2100, a first access and mobility function (AMF) 2106, a first session management function (SMF) 2108, a first user plane function (UPF) 2110, and/or a non-3GPP interworking function (N3IWF) 2112. The first UPF 2110 may interface with a data network 2114 via an N6 interface 2116. The first base station 2102 and the second base station 2104 may communicate with and/or be connected to the AMF 2106. The second base station 2104 may communicate with and/or be connected to the AMF 2106 via the N3IWF 2112. The second base station 2104 may comprise an access node. The second base station 2104 may comprise at least one of an access point (AP), a wireless access point (WAP), and/or a Wi-Fi router. An interface between the first base station 2102 and the first AMF 2106 may comprise an N2 interface 2118. An interface between the N3IWF 2112 and the first AMF 2106 may comprise an N2 interface 2120. An interface between the first base station 2102 and the first UPF 2110 may comprise an N3 interface 2122. An interface between the N3IWF 2112 and the first UPF 2110 may comprise an N3 interface 2124. An interface between the first AMF 2106 and the first SMF 2108 may comprise an N11 interface 2126. An interface between the first UPF 2110 and the first SMF 2108 may comprise an N4 interface 2128.

The second wireless network (e.g., a PLMN, or any other communication device) may comprise a third base station 2130 (e.g., a gNB or an ng-eNB) that uses a second 3GPP access technology (e.g., 4G, 5G, LTE, NG-RAN, or other 3GPP access technology) for communicating with the wireless device 2100, a second AMF 2132, a second SMF 2134, and a second UPF 2136. The first 3GPP access technology may be the same as or different from the second 3GPP access technology. The second UPF 2136 may interface with a data network 2138. An interface between the third base station 2130 and the second AMF 2132 may comprise an N2 interface 2140. An interface between the third base station 2130 and the second UPF 2136 may comprise an N3 interface 2142. An interface between the second AMF 2132 and the second SMF 2134 may comprise an N11 interface 2144. An interface between the second UPF 2136 and the second SMF 2134 may comprise an N4 interface 2146.

The wireless device 2100 may register with the first wireless network (e.g., a PLMN, or any other communication device) via the first base station 2102, and may register with the second wireless network (e.g., a PLMN, or any other communication device) via the third base station 2130. The wireless device 2100 may simultaneously (or near simultaneously) register/communicate with the first wireless network (e.g., a PLMN, or any other communication device) via the first base station 2102 and via the second base station 2104. The wireless device 2100 may establish more than one PDU session with the first wireless network (e.g., a PLMN, or any other communication device). A first PDU session may be routed via the first base station 2102 and a second PDU session may be routed via the second base station 2104. The wireless device 2100 may communicate with the second wireless network (e.g., a PLMN, or any other communication device) via the third base station 2130.

The wireless device 2100 may support at least two SIMs 1602, for example, as shown in FIG. 16. The wireless device 2100 may comprise a dual-SIM or a multi-SIM device. The at least two SIMs 1602 may comprise a first SIM (e.g., SIM1) for communicating with the first wireless network (e.g., a PLMN, or any other communication device) and a second SIM (e.g., SIM2) for communicating with second wireless network (e.g., a PLMN, or any other communication device), as shown in FIG. 16. One or more of the first SIM (e.g., SIM1) and the second SIM (e.g., SIM2) may comprise a physical SIM card (e.g., a plastic SIM card) or an embedded SIM (e.g., an electronic SIM card).

The wireless device 2100 may comprise a first/cellular communication module and a second/non-cellular communication module (e.g., a non-3GPP communication module, such as a WLAN/Wi-Fi communication module, a Bluetooth communication module, a satellite communication module, etc.). The first/cellular communication module may comprise at least one receiver and at least one transmitter. The wireless device 2100 may use the first/cellular communication module to communicate with the first wireless network (e.g., a PLMN, or any other communication device) via the first base station 2102 and to communicate with the second wireless network (e.g., a PLMN, or any other communication device) via the third base station 2130. The wireless device 2100 may use the second/non-cellular communication module to communicate with the first wireless network (e.g., a PLMN, or any other communication device) via the second base station 2104.

Figure 22:
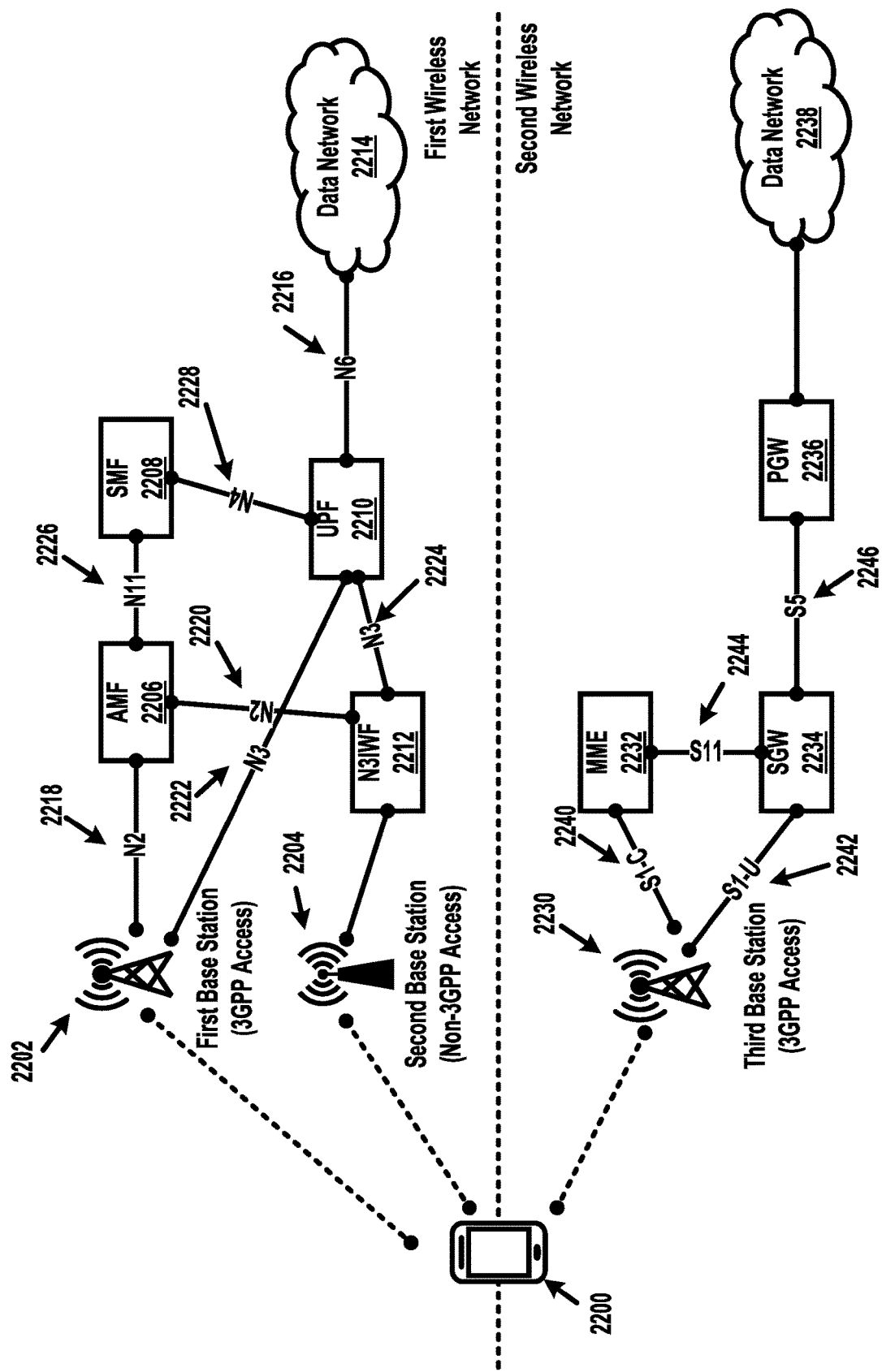
FIG. 22 shows an example network architecture.

FIG. 22 shows an example network architecture (e.g., 4G and 5G network architecture). The network architecture may comprise a wireless device 2200 (e.g., which may be the same as wireless device 100, 200, 400, 1600, 2100, or another wireless device) and two wireless network PLMNs, a first wireless network (e.g., a PLMN, or any other communication device) and a second wireless network (e.g., a PLMN, or any other communication device), as shown in FIG. 22. The network architecture shown in FIG. 22 may be similar to the network architecture shown in FIG. 21, except, for example, for the 3GPP access technology used by the second wireless network (e.g., a PLMN, or any other communication device). The first wireless network (e.g., a PLMN, or any other communication device) shown in FIG. 22 may use a first core network (e.g., 5G core network or any other core network) 3GPP access technology, whereas the second wireless network (e.g., a PLMN, or any other communication device) shown in FIG. 22 may use a second core network (e.g., 4G core network) 3GPP access technology, for example, evolved packet core (EPC). The wireless device 2200 may comprise a multi-SIM wireless device, for example, a dual-SIM wireless device.

The first wireless network (e.g., a PLMN, or any other communication device) may comprise a first base station 2202 (e.g., a gNB) that uses a first 3GPP access technology (e.g., 5G, NG-RAN, or other 5G 3GPP access technology) for communicating with the wireless device 2200, a second base station 2204 that uses a non-3GPP access technology (e.g., a wireless LAN, Wi-Fi, or other non-3GPP access technology) for communicating with the wireless device 2200, a first access and mobility function (AMF) 2206, a first session management function (SMF) 2208, a first user plane function (UPF) 2210, and a non-3GPP interworking function (N3IWF) 2212. The first UPF 2210 may interface with a data network 2214 via an N6 interface 2216. The first base station 2202 and the second base station 2204 may communicate with/be connected to the AMF 2206. The second base station 2204 may communicate with/be connected to the AMF 2206 via the N3IWF 2212. The second base station 2204 may comprise an access node. The second base station 2204 may comprise at least one of an access point (AP), a wireless access point (WAP), and/or a Wi-Fi router. An interface between the first base station 2202 and the first AMF 2206 may comprise an N2 interface 2218. An interface between the N3IWF 2212 and the first AMF 2206 may comprise an N2 interface 2220. An interface between the first base station 2202 and the first UPF 2210 may comprise an N3 interface 2222. An interface between the N3IWF 2212 and the first UPF 2210 may comprise an N3 interface 2224. An interface between the first AMF 2206 and the first SMF 2208 may comprise an N11 interface 2226. An interface between the first UPF 2210 and the first SMF 2208 may comprise an N4 interface 2228.

The second wireless network (e.g., a PLMN, or any other communication device) may comprise a third base station 2230 (e.g., an eNB) that uses a second 3GPP access technology (e.g., 4G, LTE, or other 4G 3GPP access technology) for communicating with the wireless device 2100, an MME 2232, an SGW 2234, and a PGW 2236. The PGW 2236 may interface with a data network 2238. An interface between the third base station 2230 and the MME 2232 may comprise an S1-C interface 2240. An interface between the third base station 2230 and the SGW 2234 may comprise an S1-U interface 2242. An interface between the MME 2232 and the SGW 2234 may comprise an S11 interface 2244. An interface between the SGW 2234 and the PGW 2236 may comprise an S5 interface 2246.

The wireless device 2200 may register with the first wireless network (e.g., a PLMN, or any other communication device) via the first base station 2202, and may register with the second wireless network (e.g., a PLMN, or any other communication device) via the third base station 2230. The wireless device 2200 may simultaneously (or near simultaneously) register/communicate with the first wireless network (e.g., a PLMN, or any other communication device) via the first base station 2202 and via the second base station 2204. The wireless device 2200 may establish more than one PDU session with the first wireless network (e.g., a PLMN, or any other communication device). A first PDU session may be routed via the first base station 2202 and a second PDU session may be routed via the second base station 2204. The wireless device 2200 may communicate with the second wireless network (e.g., a PLMN, or any other communication device) via the third base station 2230.

The wireless device 2000, 2100, 2200 may simultaneously (or near simultaneously) communicate via a non-3GPP access technology of the first wireless network (e.g., a PLMN, or any other communication device) during a time period that the wireless device 2000, 2100, 2200 may be communicating via a 3GPP access technology of the second wireless network (e.g., a PLMN, or any other communication device), as shown in FIG. 20, FIG. 21, and FIG. 22. A multi-SIM wireless device using a single transmission channel for 3GPP wireless network access may simultaneously (or near simultaneously) use non-3GPP transmission, for example, to communicate with a 3GPP wireless network.

Figure 23:
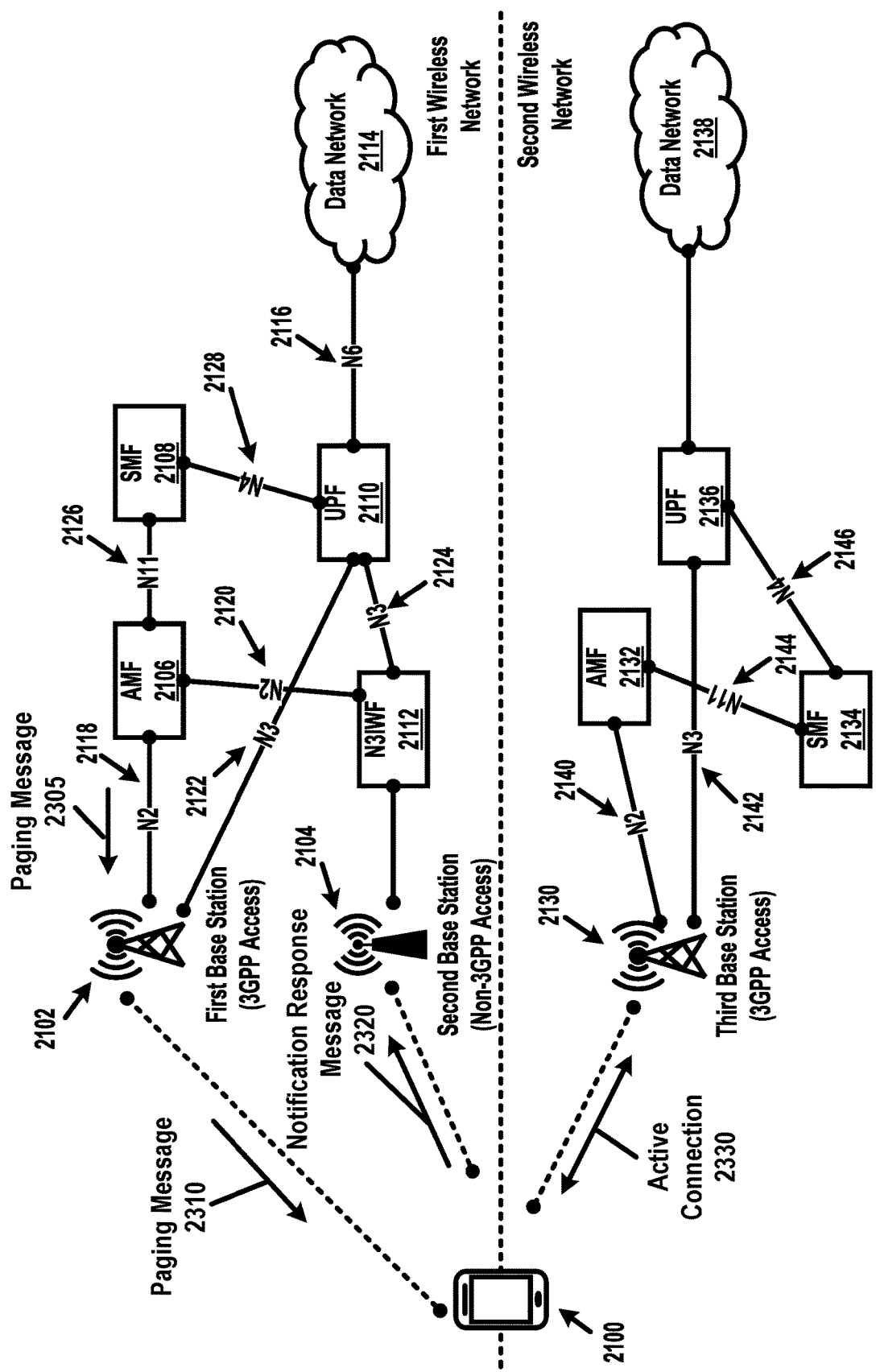
FIG. 23 shows an example network architecture in which a wireless device may respond to a paging message received via a first access technology by sending a notification response message via a second access technology.

FIG. 23 shows an example network architecture. The network architecture may correspond to the network architecture of FIG. 21 in which the wireless device 2100 may respond to a paging message 2310 received via a first access technology by sending a notification response message 2320 via a second access technology.

Figure 24:
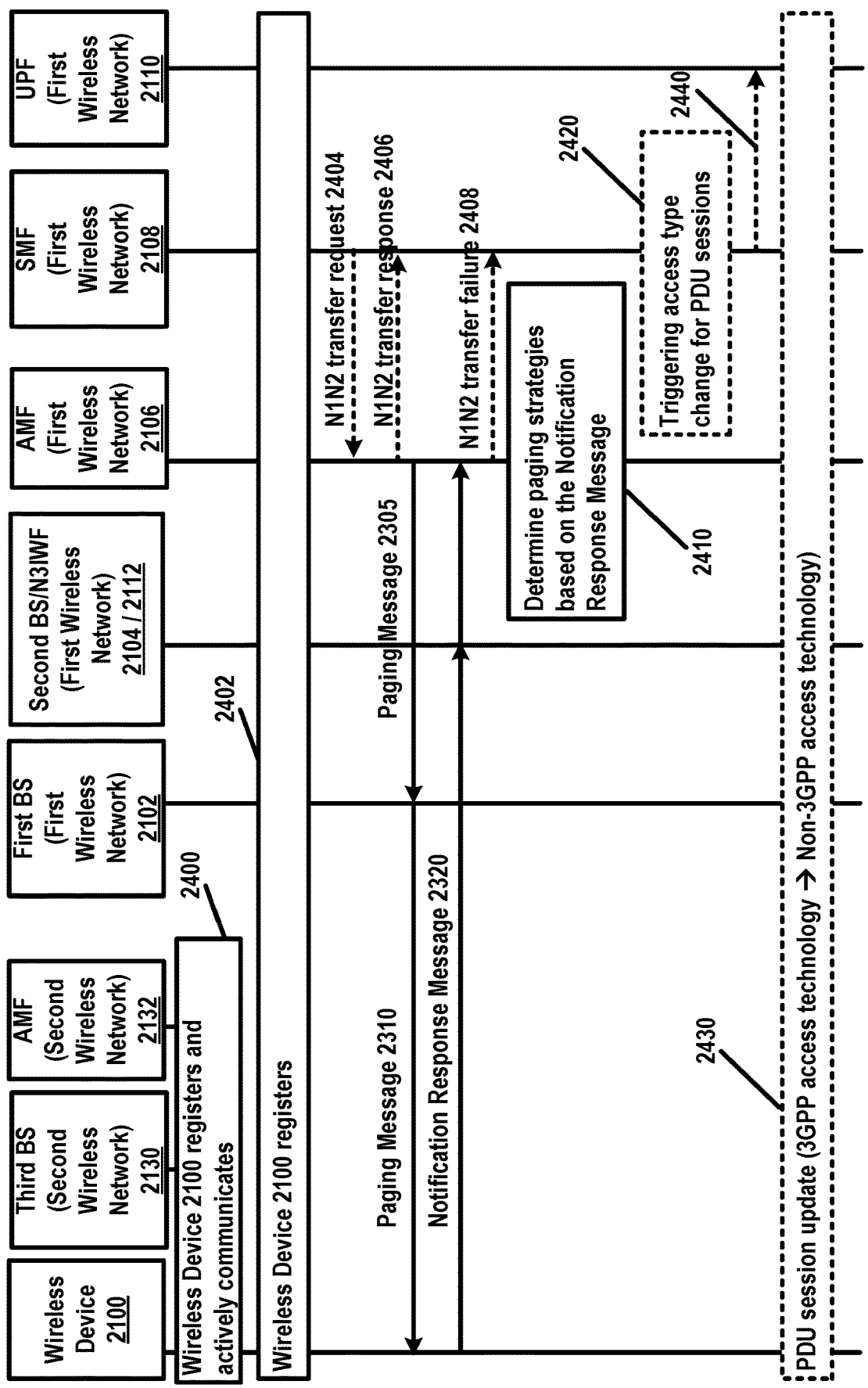
FIG. 24 shows an example call flow for a wireless device responding to a paging message received via a first access technology by sending a notification response message via a second access technology.

FIG. 24 shows an example call flow for a wireless device. A wireless device, such as the wireless device 2100, may respond to the paging message 2310 received via a first access technology, for example, by sending the notification response message 2320 via the second access technology. The wireless device 2100 may register with and/or actively communicate with the second wireless network (e.g., a PLMN, or any other communication device) via communications with the third base station 2130 and the second AMF 2132 (e.g., block 2400). The wireless device 2100 may register with the first wireless network (e.g., a PLMN, or any other communication device) via communications with the first base station 2102, the second base station 2104, the N3IWF 2112, the first AMF 2106, the first SMF 2108, and/or the UPF 2110 (e.g., block 2402). A state of the wireless device 2100 may be the CM-IDLE state for the first wireless network (e.g., a PLMN, or any other communication device).

The first SMF 2108 may send, to the first AMF 2106, an N1N2 transfer request 2404. The N1N2 transfer request 2404 may comprise information and/or data as described above with respect to the Namf_Communication_N1N2MessageTransfer 1305 message. The N1N2 transfer request 2404 may request establishment of one or more user plane(s) for PDU sessions. The first AMF 2106 may send, to the SMF 2108, an acknowledgment message, e.g., an N1N2 transfer response 2406, after or based on receiving the N1N2 transfer request 2404. The first AMF 2106 may send, to the SMF 2108, the N1N2 transfer response 2406, for example, if a paging message 2310 fails and/or a service request and/or RRC setup message is rejected.

The first AMF 2106 may send a paging message 2305 (e.g., an N2 paging message) to the first base station 2102. The first base station 2102 may send a paging message 2310 (e.g., an RRC paging message) to the wireless device 2100, for example, after receiving or based on the paging message 2305. The paging message 2310 may be sent to the wireless device 2100 via the first base station 2102, for example, if the wireless device 2100 is in the CM-IDLE state for the first wireless network (e.g., a PLMN, or any other communication device). The first AMF 2106 may be triggered to send the paging message 2305 to the first base station 2102 to cause the first base station 2102 to send the paging message 2310 to the wireless device 2100, for example, based on data received by the AMF 2106 via the SMF 2108, the UPF 2110, and/or the data network 2114. The data received by the AMF 2106 may, for example, be intended for delivery to the wireless device 2100. The paging message 2310 may comprise an access type, a wireless device identity, and/or the like. The access type may indicate at least one of 3GPP access, non-3GPP access, and/or the like. The wireless device identity may indicate at least one of an SAE-temporary mobile subscriber identity (S-TMSI), an international mobile subscriber identity (IMSI), a 5th-generation S-TMSI (5G-S-TMSI), a 5G inactive radio network temporary identifier (I-RNTI), and/or the like. The paging message 2310 may further comprise a paging cause value. The paging cause value may indicate at least one of a NAS signaling for mobility management, a NAS signaling for policy update, a wireless device context update, a wireless device policy update, an indication requesting a registration, an IP multimedia subsystem (IMS) voice, an IMS video, an IMS SMS, an IMS MMS, an IMS signaling, other IMS, ultra-reliable low latency communications (URLLC), emergency, and/or the like. The access type may comprise a 3GPP access, the wireless device identity may comprise a 5G-S-TMSI, and the paging cause value may comprise an other IMS, for example.

The wireless device 2100 may determine whether the wireless device 2100 is available or unavailable to communicate with the first base station 2102 using the first 3GPP access technology, for example, after or in response to receiving the paging message 2310. The wireless device 2100 may be available or unavailable based on at least one of a first/cellular communication module (e.g., communications module 1712, 1722) of the wireless device 2100, a connection state of the wireless device 2100 with the second wireless network (e.g., a PLMN, or any other communication device) using the first/cellular communication module of the wireless device 2100, the paging cause value indicated in the paging message 2310, and/or the like.

The wireless device 2100 may determine that the wireless device 2100 is unavailable to communicate with the first base station 2102 using the first 3GPP access technology, for example, based on the wireless device 2100 having an active connection 2330 (e.g., actively communicating in a connected state) with the third base station 2130 of the second wireless network (e.g., a PLMN, or any other communication device) using the second 3GPP access technology. The determination may further be based on an implementation of the wireless device 2100's cellular communication module (e.g., 3GPP communication module 1940). The wireless device 2100's cellular communication module may comprise a transmitter (e.g., transmitter 1960) that is capable of transmitting to one 3GPP access technology (e.g., the 3GPP access technology of the first base station 2102 or the third base station 2130) at a time, for example. The wireless device 2100's cellular communication module may otherwise be capable of receiving the paging message 2310 via the first base station 2102, but not capable of responding to the paging message 2310 or conducting two-way communications with the first base station 2102, for example.

The wireless device 2100 may determine that the wireless device 2100 is available to communicate with the first base station 2102 using the first 3GPP access technology, for example, even though the wireless device 2100 has an active connection 2330 (e.g., is actively communicating in a connected state) with the third base station 2130 of the second wireless network (e.g., a PLMN, or any other communication device) using the second 3GPP access technology, for example, based on a paging cause value in the paging message 2310. The paging cause value may indicate a service type (e.g., IMS voice, a wireless device context update, URLLC, an emergency) that has a higher priority than the service type associated with the wireless device 2100's active communication 2330 with the third base station 2130 of the second wireless network (e.g., a PLMN, or any other communication device).

The wireless device 2100 may determine that the wireless device 2100 is available to communicate with the first base station 2102 using the first 3GPP access technology, for example, based on the wireless device 2100 being in an idle state/RRC-INACTIVE state with the second wireless network (e.g., a PLMN, or any other communication device) using the second 3GPP access technology. The wireless device 2100 may send a radio resource control (RRC) setup request message requesting a connection setup with the first base station 2102, for example, if the wireless device 2100 determines that the wireless device 2100 is available to communicate with the first base station 2102 using the first 3GPP access technology. The wireless device 2100 may check a connection state of the wireless device 2100 with the second base station using a non-3GPP access technology, for example, if the wireless device 2100 determines that the wireless device 2100 is unavailable to communicate with the first base station 2102 using the first 3GPP access technology (e.g., as explained above). The connection management state of the non-3GPP access technology of the wireless device 2100 may be a connected state (CM-CONNECTED), for example.

The wireless device 2100 may send a message, such as a notification response message 2320 (e.g., a NAS notification response message), to the first AMF 2106 via the second base station 2104 using the non-3GPP access technology and via the N3IWF 2112, for example, if the wireless device 2100 is unavailable to communicate with the first base station 2102 using the first 3GPP access technology and the non-3GPP access technology is in a connected state. The notification response message 2320 may inform (or indicate) a failure or rejection of (or a decision not to accept) the connection setup request with the first 3GPP access technology, for example, after or in response to the paging message 2310.

The wireless device 2100's determination that the wireless device 2100 is unavailable to communicate with the first base station 2102 using the first 3GPP access technology may be based on an operating mode of the wireless device 2100, a threshold communications priority level of the wireless device 2100, user settings of the wireless device 2100, and/or a priority level or code indicated by the paging message 2310. The paging message 2310 may indicate two-way communications protocols or parameters with which the wireless device 2100's communication module may not be compatible, for example. The paging message 2310 may indicate a type or priority level of communications that the wireless device 2100 is configured to reject and/or are lower priority than the active communication between the wireless device 2100 and the second wireless network (e.g., a PLMN, or any other communication device), for example. The wireless device 2100 may send the notification response message 2320 via the third base station 2130, for example, if a communication channel with the second base station 2104 is not available, an error message is received by the wireless device 2100 indicating that the notification response message 2320 sent via the third base station 2130 failed, or a retransmission of the paging message 2310 is received by the wireless device 2100 after having already sent the notification response message 2320 via the second base station 2104.

FIG. 25 shows an example of message contents for a message, such as a notification response message 2320. The notification response message 2320 may comprise a cause value (e.g., reject cause). The cause value may indicate at least one of a connection status is busy, a connection status is weak, a connection state is in CM-CONNECTED with another wireless network PLMN, a wireless device (e.g., UE) comprises a multi-SIM device, a wireless device comprises a dual-SIM device, a wireless device comprises multiple subscriber/user identities/modules/identifiers/profiles, other causes, and/or the like. The cause value may indicate that a connection status is busy, that a connection state is in CM-CONNECTED with another wireless network PLMN, and/or that a wireless device comprises a dual-SIM device, for example, if the wireless device 2100 comprises a dual-SIM device and a communication connection with the first base station 2102 using the first 3GPP access technology is unavailable. The cause value may indicate that the wireless device does not comprise a multi-SIM device, the wireless device does not comprise a dual-SIM device, the wireless device does not comprise multiple subscriber/user identities/modules/identifiers/profiles, and/or that the wireless device is actively connected with another wireless network PLMN and/or a communication connection with the first base station 2102 using the first 3GPP access technology is unavailable. The communication connection with the first base station 2102 using the first 3GPP access technology may be unavailable, for example, due to the wireless device 2100 having an active connection 2330 (e.g., actively communicating) with the second wireless network PLMN. The cause value may indicate that a connection status is weak, for example, if the wireless device 2100 is located in a weak coverage area of the first base station 2102.

The notification response message 2320 may further comprise an allowed PDU session(s) identity list, an indication of available service type(s) to respond to a paging message, an indication of unavailable service type(s) to respond to a paging message, frequency/band information, and/or the like. The notification response message 2320 may comprise a NAS notification response message or a notification reply message. The notification response message 2320 may comprise a notification response message identity and corresponding message type.

The allowed PDU session(s) identity list may indicate user-plane resources of PDU session(s) associated with a 3GPP access technology and allowed to be re-established via a non-3GPP access technology. The allowed PDU session(s) identity list may be based on a policy received from a PCF and/or non-3GPP radio signal quality. An SMF may use the allowed PDU session(s) identity list to re-establish the existing PDU session to an alternative access technology (e.g., from 3GPP access technology to non-3GPP access technology, or vice versa). The wireless device 2100 may determine that a PDU session identity (e.g., PDU session identity 1) is allowed to be re-established via the non-3GPP access technology from the 3GPP access technology, for example, based on or in response to receiving the paging message 2310 comprising the access type as a 3GPP access technology. The first AMF 2106 may send the information 'PDU session identity 1' to the first SMF 2108 (the SMF associated with PDU session identity 1) and the first SMF 2108 may perform re-establishing of the PDU session 1 from 3GPP access technology to non-3GPP access technology. The communications service using PDU session identity 1 may be maintained via non-3GPP access technology using the second base station 2104, for example, if the first 3GPP access technology using the first base station 2102 is unavailable.

The available service type(s) for responding to a paging message 2310 may comprise a data network name (DNN), a single network slice selection assistance information (S-NSSAI), packet data unit (PDU) session identities, and/or the like. The DNN may comprise at least one of an IP multimedia subsystem (IMS), a DNN requiring delay sensitive service, and/or the like. The available service type(s) for responding to a paging message 2310 may indicate terminating service type(s) that the wireless device 2100 may receive via the first access technology simultaneously (or near simultaneously) with the wireless device 2100 actively communicating with the second wireless network (e.g., a PLMN, or any other communication device). The wireless device 2100 may drop/stop the active communication with the second wireless network (e.g., a PLMN, or any other communication device) to respond to the paging message from the first wireless network (e.g., a PLMN, or any other communication device), for example, if the wireless device receives a paging message corresponding to the available service type(s).

The unavailable service type(s) for responding to a paging message 2310 may comprise a data network name (DNN), a single network slice selection assistance information (S-NSSAI), packet data unit (PDU) session identities, and/or the like. The DNN may comprise at least one of a Non-IMS, a less-urgent or delay-tolerant type DNN, internet, and/or the like. The unavailable service type(s) for responding to a paging message 2310 may indicate terminating service type(s) that the wireless device 2100 may reject via the first access technology simultaneously (or near simultaneously)

with the wireless device 2100 actively communicating with the second wireless network (e.g., a PLMN, or any other communication device). The wireless device 2100 may avoid responding to the paging message 2310 received from the first wireless network (e.g., a PLMN, or any other communication device), for example, if the wireless device 2100 receives a paging message 2310 corresponding to the unavailable service type(s) at a time that the wireless device 2100 communicates with the second wireless network (e.g., a PLMN, or any other communication device). The first AMF 2106 may determine to decrease a paging priority or to not send paging messages 2310 to the wireless device 2100, for the services corresponding to the unavailable service type(s).

The first AMF 2106 may determine the paging strategies 2410 and/or determine to stop sending paging messages 2310 to the wireless device 2100 based on the value(s) of available service type and/or the unavailable service type indicated in the notification response message 2320. The first AMF 2106 may determine service type(s) to use to send future paging messages 2310 to the wireless device 2100 based on the value(s) of available service type and/or the unavailable service type indicated in the notification response message 2320. The first AMF 2106 may determine which service type(s) to continue to use or discontinue use of with respect to the wireless device 2100 based on the value(s) of available service type and/or the unavailable service type indicated in the notification response message 2320.

The frequency/band information may indicate one or more frequencies and/or bands on which the wireless device 2100 may camp. The frequency/band information may indicate one or more frequencies and/or bands on which the wireless device 2100 may decline to camp. The first wireless network (e.g., a PLMN, or any other communication device) may use band f1 and band f2 for a wireless network deployment, for example, the band f1 may comprise a frequency that is compatible with the second wireless network (e.g., a PLMN, or any other communication device), and the band f2 may comprise a frequency that is not compatible with the second wireless network (e.g., a PLMN, or any other communication device). The wireless device 2100 may transmit and/or receive via the first wireless network (e.g., a PLMN, or any other communication device) using the band f1, for example, simultaneously (or near simultaneously) with the wireless device 2100 communicating via the second wireless network (e.g., a PLMN, or any other communication device). The wireless device 2100 may be prevented from transmitting and/or receiving via the first wireless network (e.g., a PLMN, or any other communication device) using the band f2, for example, simultaneously (or near simultaneously) with the wireless device 2100 communicating via the second wireless network (e.g., a PLMN, or any other communication device).

Referring again to FIG. 24, the second base station 2104 may forward the notification response message 2320 to the N3IWF 2112 after receiving the notification response message 2320 from the wireless device 2110. The N3IWF 2112 may send the notification response message 2320 to the first AMF 2106. The first AMF 2106 may receive the notification response message 2320 via the non-3GPP access technology (e.g., wireless LAN, Wi-Fi, and/or any other non-3GPP access technology) from the second base station 2104, for example, reporting a failure or rejection of the connection setup request of the first wireless network (e.g., a PLMN, or any other communication device) for the first 3GPP access technology. The first AMF 2106 may determine to discontinue sending paging messages 2310 to the wireless device 2100, for example, based on receiving the notification response message 2320. The first AMF 2106 may stop sending further paging messages 2310 (e.g., retransmissions of the paging message 2310) and indicate to the first base station 2102 to stop sending the paging message 2310 to the wireless device 2100.

The first AMF 2106 may determine one or more paging strategies 2410 (e.g., one or more paging policies) for the wireless device 2100, for example, based on the notification response message 2320 received from the wireless device 2100 via the second base station 2104 and the N3IWF 2112. The first AMF 2106 may determine to stop sending paging messages 2310 to the wireless device 2100, for example, based on the notification response message 2320, based on not receiving any response from the wireless device 2100 after a threshold number of retransmissions of the paging message 2310, and/or based on receiving a sequential quantity of notification response messages 2320 declining or rejecting communications requests being greater than a threshold value for a defined period of time. The first AMF 2106 may determine the one or more paging strategies 2410 based on information provided by the wireless device 2100. The first AMF 2106 may use the paging strategy for one or more terminating service(s). The paging strategy may comprise a paging retransmission scheme, an indication as to whether to send paging messages 2305 to the first base station 2102 during certain AMF high load conditions, an indication as to whether to apply sub-area-base paging, an indication as to whether to stop paging transmission (e.g., by the first base station 2102), an indication as to whether to send a paging message 2310 via a 3GPP access technology or a notification response message 2320 via a non-3GPP access technology, an indication of a page for a specific DNN or a S-NSSAI, an indication to buffer a paging message 2305 and/or 2310 if the wireless device 2100 is in idle state, and/or the like. The paging strategy may indicate that a notification procedure (e.g., sending a notification message) via a non-3GPP access technology is prioritized higher than a paging procedure (e.g., sending a paging message 2310) via a 3GPP access technology (e.g., a first 3GPP access technology) for a terminating service. The paging strategy may indicate that any terminating service (e.g., sending a paging message 2310) in idle state (e.g., CM-IDLE) may not be allowed for the wireless device 2100 via the first access technology. The first AMF 2106 may inform and/or indicate to a network function device that a terminating service may not be allowed for the wireless device 2100. The paging strategy may indicate that any terminating service (e.g., sending a paging message 2310 for the service) that is in an idle state (e.g., CM-IDLE) is not allowed for the wireless device 2100 via the first 3GPP access technology. The paging strategy may indicate a valid time period for the paging strategy (e.g., terminating service for 3GPP access technology is not available during a given period of time, e.g., "one hour"). The paging strategy may indicate that terminating service (e.g., sending a paging message 2310 for the service) in idle state (e.g., CM-IDLE) is allowed for some specific service/DNN/S-NSSI via the first access technology. The paging strategy may provide information to a network function (e.g. SMF, PCF).

The first AMF 2106 may determine, for example, based on a message received from the wireless device 2100, that a service is not available via the first access technology. The first AMF 2106 may request the first SMF 2108 to move a PDU session from the first access technology to the second access technology. The first AMF 2106 may send information to one or more associated SMF 2106 (e.g., the first SMF 2108, which may be in charge of the PDU session) that a change of access technology type is permitted and/or requested (e.g., from 3GPP access technology to non-3GPP access technology or vice-versa), for example, if the allowed PDU session(s) identity list is included in the notification response message 2320. The first AMF 2106 may send, to the SMF 2108, an N1N2 transfer failure message 2408, for example, based on the notification response message 2320 received from the wireless device 2100. The first SMF 2108 may trigger an access type change for PDU session 2420 and/or perform a PDU session update procedure 2430 to move a user-plane resource from a first access technology (e.g., 3GPP access technology) to a second access technology (e.g., non-3GPP access technology), for example, after receiving or based on the N1N2 transfer failure message 2408. The first SMF 2108 may notify (e.g., via notification signal 2440) the UPF 2110 to modify any services intending to communicate with the wireless device 2100 via the 3GPP access technology to communicate with the wireless device 2100 via the non-3GPP access technology. Communications between services of the UPF 2110 and the wireless device 2100 may be more reliable and resource-efficient based on receipt and processing of the notification signal 2440.

Figure 26:
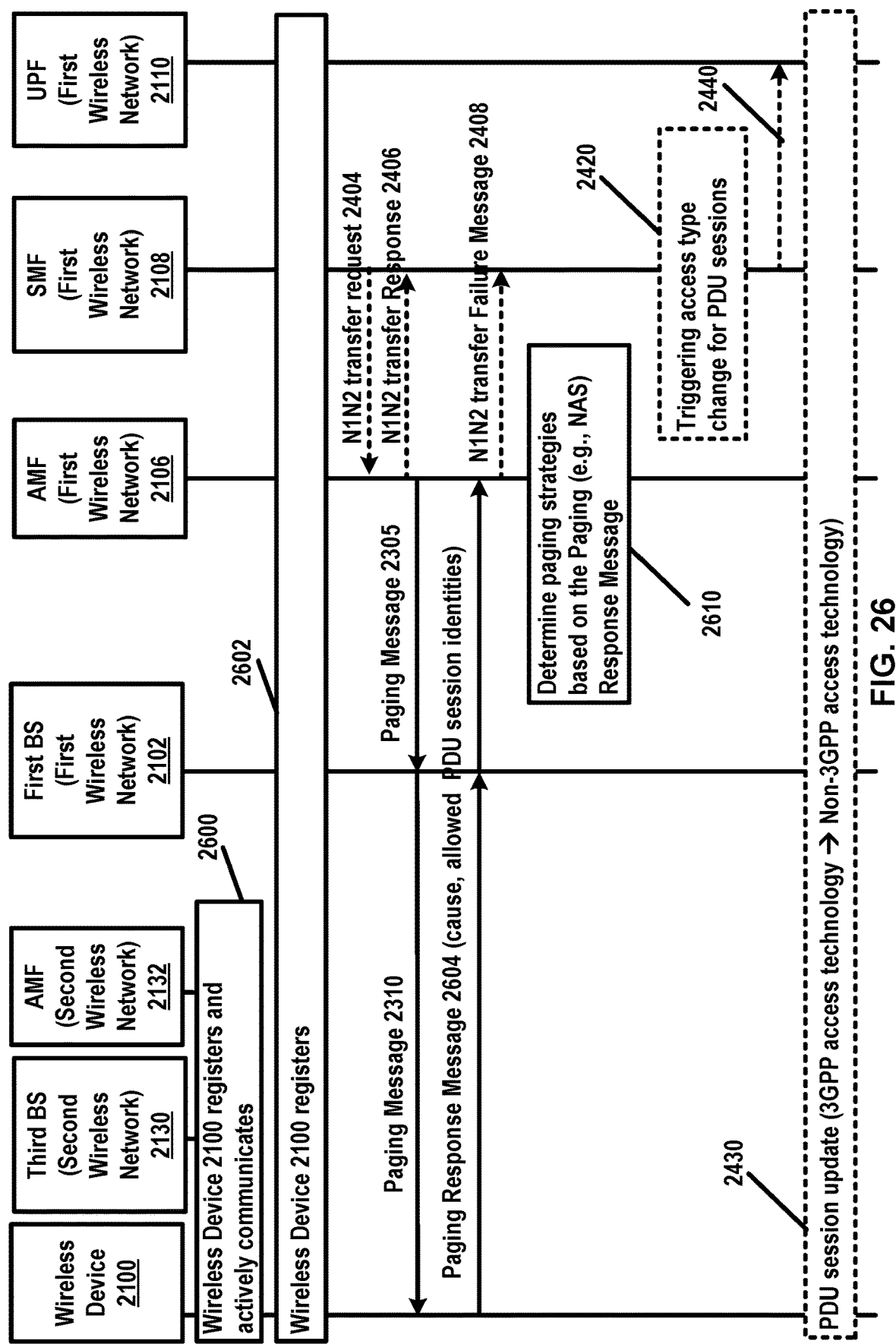
FIG. 26 shows an example call flow for a wireless device responding to a received paging message by sending a response message.

FIG. 26 shows an example of a wireless device 2100 receiving a paging message 2310. The example of FIG. 26 may be similar to the example of FIG. 24, for example, except that the first wireless network (e.g., a PLMN, or any other communication device) in FIG. 26 may not include a non-3GPP base station. The wireless device 2100 may register with and actively communicate with the second wireless network (e.g., a PLMN, or any other communication device) via communications with the third base station 2130 and the second AMF 2132 (e.g., block 2600). The wireless device 2100 may register with the first wireless network (e.g., a PLMN, or any other communication device) via communications with the first base station 2102, the first AMF 2106, the first SMF 2108, and the UPF 2110 (e.g., block 2602).

The wireless device 2100 may receive a paging message 2310 from a first base station 2102 of a first 3GPP access technology based on a paging message 2305 from a first AMF 2106, for example, simultaneously (or near simultaneously) with the wireless device 2100 actively communicating with the third base station 2130 of the second wireless network (e.g., a PLMN, or any other communication device). The wireless device 2100 may be unconnected with and/or be unable to establish a connection with a second base station using a non-3GPP access technology (e.g., the second base station 2104), for example, if the first wireless network (e.g., a PLMN, or any other communication device) does not include an operational second base station using a non-3GPP access technology, the wireless device 2100 lacks support for the non-3GPP access technology, and/or the wireless device 2100 is outside of a geographical coverage region of the non-3GPP access technology. The wireless device 2100 may send a paging response message 2604 to the first base station 2102 using the first 3GPP access technology, for example, reporting a failure or rejection of the connection setup request of the first wireless network (e.g., a PLMN, or any other communication device) for the first 3GPP access technology. The wireless device 2100 may use a gap time in the first 3GPP access technology to perform a paging response procedure and send the paging response message 2604. The paging response message 2604 may comprise a one or more same information elements as the notification response message 2320 shown in FIG. 25 and described elsewhere herein. The first AMF 2106 may determine paging strategies 2610 based on the paging (e.g., NAS) response message 2604 in a manner similar to that described above with respect to the first AMF 2106 determining paging strategies 2410 based on the notification response message 2320. The first AMF 2106 may send an N1N2 transfer failure message 2408 to the first SMF 2108, for example, after or based on receiving the paging response message 2604 in a manner similar to that described with respect to FIG. 24.

Figure 27:
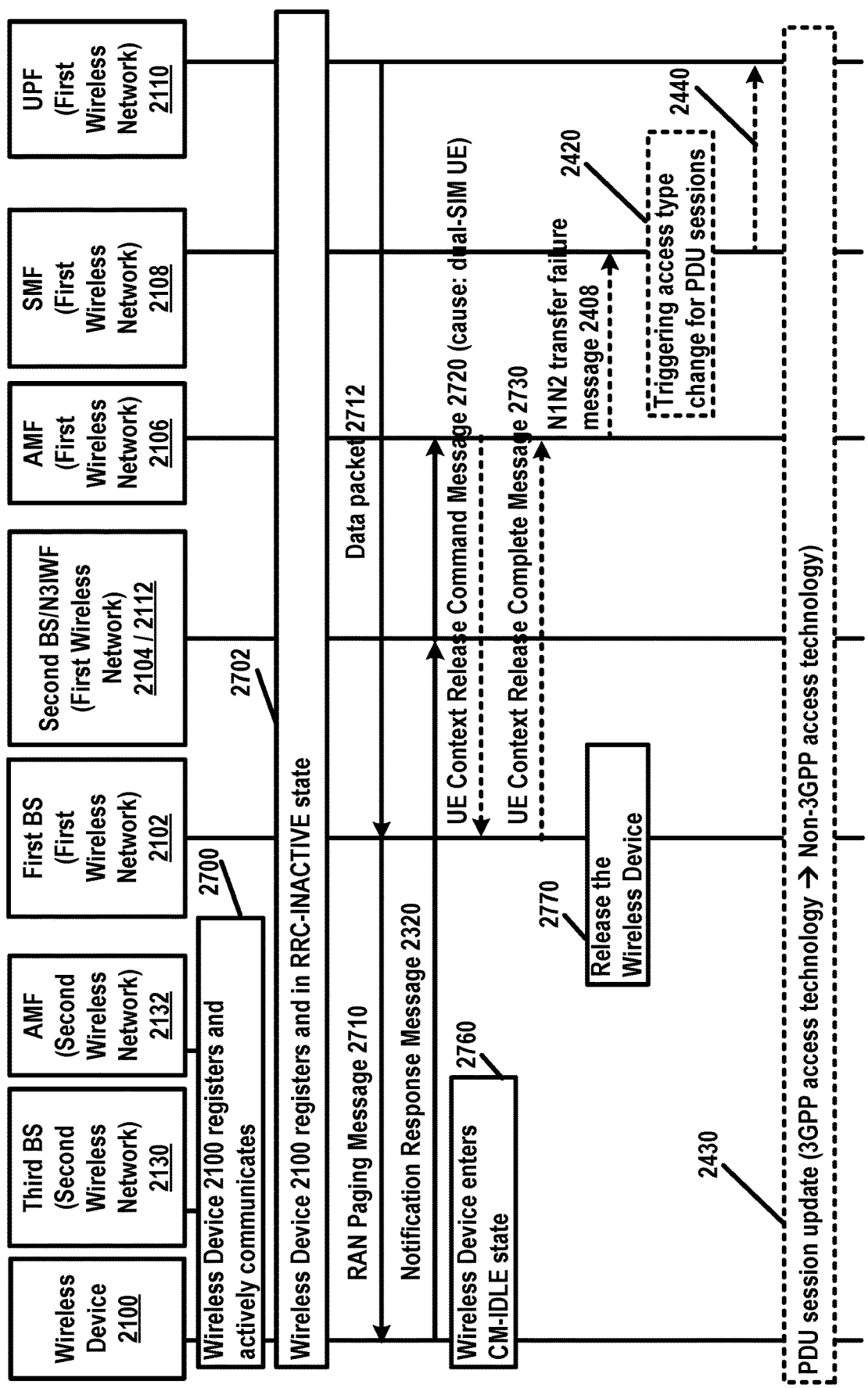
FIG. 27 shows an example call flow for a wireless device in a wireless network.

FIG. 27 shows an example of a wireless device 2100 in a state (e.g., the CM-CONNECTED/RRC-INACTIVE state) for a first wireless network (e.g., a PLMN, or any other communication device). The wireless device 2100 may register with and/or communicate with the second wireless network (e.g., a PLMN, or any other communication device) via communications with the third base station 2130 and the second AMF 2132 (e.g., block 2700). The wireless device 2100 may register with the first wireless network (e.g., a PLMN, or any other communication device) via communications with the first base station 2102, the second base station 2104, the N3IWF 2112, the first AMF 2106, the first SMF 2108, and the UPF 2110 (e.g., block 2702). The wireless device 2100 may enter another state (e.g., RRC-INACTIVE state) with respect to the first wireless network (e.g., a PLMN, or any other communication device) after registering.

The first base station 2102 may send a radio access network (RAN) paging message 2710 to the wireless device 2100 to request a connection resumption with the first base station 2102 using the first 3GPP access technology, for example, if the wireless device 2100 is in the CM-CONNECTED/RRC-INACTIVE state for the first wireless network (e.g., a PLMN, or any other communication device). The first base station 2102 may send the RAN paging message 2710 after or based on receiving a data packet 2712 from the UPF 2110.

The RAN paging message 2710 may comprise an access type, a wireless device identity, and/or the like. The access type may indicate at least one of 3GPP access technology, non-3GPP access technology, and/or the like. The wireless device identity may indicate at least one of an S-temporary mobile subscriber identity (S-TMSI), an international mobile subscriber identity (IMSI), a 5th-generation S-TMSI (5G-S-TMSI), an I-RNTI, and/or the like. The RAN paging message 2710 may comprise a paging cause value. The paging cause value may indicate at least one of a NAS signaling for mobility management, a NAS signaling for policy update, a wireless device context update, a wireless device policy update, an indication requesting a registration, an IP multimedia subsystem (IMS) voice, an IMS video, an IMS SMS, an IMS MMS, an IMS signaling, an other IMS, an ultra-reliable low latency communications (URLLC), an emergency, and/or the like. The access type may comprise a 3GPP access technology, the wireless device identity may comprise a 5G-S-TMSI, and/or the paging cause value may comprise another IMS, for example.

The wireless device 2100 may determine whether the wireless device 2100 is available or unavailable to communicate with the first base station 2102 using the first 3GPP access technology, for example, based on receiving the RAN paging message 2710. The wireless device 2100 may be available or unavailable, for example, based on at least one of the first/cellular communication module (e.g., 3GPP communication module 1940) of the wireless device 2100, a connection state of the wireless device 2100 with the second wireless network (e.g., a PLMN, or any other communication device) using the cellular communication module of the wireless device 2100, the paging cause value in the RAN paging message 2710, and/or the like.

The wireless device 2100 may determine that the wireless device 2100 is unavailable to communicate with the first base station 2102 using the first 3GPP access technology, for example, based on the wireless device 2100 actively communicating (e.g., in a connected state) with the second wireless network (e.g., a PLMN, or any other communication device) using the second 3GPP access technology and based on capabilities of the first/cellular communication module (e.g., 3GPP communication module 1940) of the wireless device 2100. The cellular communication module of the wireless device 2100 may comprise a transmitter that may be capable of transmitting to one 3GPP access technology (e.g., the first 3GPP access technology of the first base station 2102 or the second 3GPP access technology of the third base station 2130) at a time, for example.

The wireless device 2100 may determine that the wireless device 2100 is available to communicate with the first base station 2102 using the first 3GPP access technology, simultaneously (or near simultaneously) with the wireless device 2100 actively communicating (e.g., in a connected state) with the second wireless network (e.g., a PLMN, or any other communication device) using the second 3GPP access technology, based on a paging cause value in the RAN paging message 2710. The paging cause value may indicate a service type (e.g., IMS voice, a wireless device context update, URLLC, an emergency, etc.) that has a higher priority than the service type associated with the active communication of the wireless device 2100 with the second wireless network (e.g., a PLMN, or any other communication device).

The wireless device 2100 may determine that the wireless device 2100 is available to communicate with the first base station 2102 using the first 3GPP access technology, for example, based on the wireless device 2100 being in an idle state/RRC-INACTIVE state with the second wireless network (e.g., a PLMN, or any other communication device) using the second 3GPP access technology. The wireless device 2100 may send a radio resource control (RRC) resume request message requesting a connection resume with the first base station 2102, for example, if the wireless device 2100 determines that the wireless device 2100 is available to communicate with the first base station 2102 using the first 3GPP access technology. The wireless device 2100 may check a connection state of the wireless device 2100 with a non-3GPP access technology for the second base station 2104, for example, if the wireless device 2100 determines that the wireless device 2100 is unavailable to communicate with the first base station 2102 using the first 3GPP access technology (e.g., as explained above). The connection management state of the non-3GPP access technology of the wireless device 2100 may be a connected state (CM-CONNECTED).

The wireless device 2100 may send a notification response message 2320 (e.g., a NAS notification response message) to the first AMF 2106 via the second base station 2104 using the non-3GPP access technology and via the N3IWF 2112, for example, based on the wireless device being unavailable to communicate with the first base station 2102 using the first 3GPP access technology and based on the non-3GPP access technology being in a connected state. The notification response message 2320 may report information regarding (or indicate) a failure or rejection of the connection resume request with the first 3GPP access technology, for example, based on the RAN paging message 2710. The notification response message 2320 may comprise a cause value. The cause value may indicate at least one of a connection status is busy, a connection status is weak, a connection state is in CM-CONNECTED with another wireless network PLMN, a wireless device 2100 comprises a multi-SIM device, the wireless device 2100 comprises a dual-SIM device, the wireless device 2100 comprises multiple subscriber/user identities/modules/identifiers/profiles, other values, and/or the like. The cause value may indicate that a connection status is busy, that a connection state is in CM-CONNECTED with another wireless network PLMN, or that a wireless device 2100 comprises a multi-SIM device, a dual-SIM device, and/or multiple subscriber/user identities/modules/identifiers/profiles, for example, based on the wireless device 2100 comprising a multi-SIM device, a dual-SIM device, and/or multiple subscriber/user identities/modules/identifiers/profiles, and communicating with the first base station 2102 using the first 3GPP access technology. The wireless device 2100 may be prevented from communicating via the first 3GPP access technology of the first wireless network (e.g., a PLMN, or any other communication device) due to the wireless device 2100 actively communicating (e.g., having an active connection) with the second wireless network (e.g., a PLMN, or any other communication device) via the second 3GPP access technology. The cause value may indicate that a connection status is weak when the wireless device 2100 is physically located in a weak coverage geographic area.

The notification response message 2320 may comprise an allowed PDU session(s) identity list, available service type(s) for responding to a RAN paging message 2710, unavailable service type(s) for responding to a RAN paging message 2710, frequency/band information, and/or the like. The notification response message 2320 may comprise a NAS notification response message or a notification reply message.

The allowed PDU session(s) identity list may indicate user-plane resources of PDU session(s) associated with a 3GPP access technology and allowed to be re-established via a non-3GPP access technology. An SMF (e.g., the first SMF 2108) may use the allowed PDU session(s) identity list to re-establish the existing PDU session to an alternative access technology (e.g., from a 3GPP access technology to a non-3GPP access technology and vice versa). The wireless device 2100 may determine that PDU session identity 1 is allowed to be re-established via the non-3GPP access technology from the 3GPP access technology, for example, based on receiving the RAN paging message 2710 comprising the access type as a 3GPP access technology. The first AMF 2106 may subsequently report the information "PDU session identity 1" to the first SMF 2108 (e.g., the SMF associated with PDU session identity 1). The first SMF 2108 may perform re-establishing of the PDU session 1 from a 3GPP access technology to a non-3GPP access technology. Therefore, the service using PDU session identity 1 may be maintained via non-3GPP access technology using the second base station 2104, for example, if the first 3GPP access technology with the first base station 2102 is unavailable.

The available service type(s) to respond to a paging message (e.g., RAN paging message) 2710 may comprise a data network name (DNN), a network slice selection assistance information (NSSAI), packet data unit (PDU) session(s) identities, and/or the like. The DNN may comprise at least one of an IP multimedia subsystem (IMS), a DNN requiring delay sensitive service, and/or the like. The available service type(s) to respond to a paging message 2710 may indicate terminating service type(s) that the wireless device 2100 may receive, for example, simultaneously (or near simultaneously) with the wireless device 2100 actively communicating with the second wireless network (e.g., a PLMN, or any other communication device) via the first access technology. The wireless device 2100 may drop/stop the active communication (e.g., active connection) with the second wireless network (e.g., a PLMN, or any other communication device) to respond to the paging message 2710 from the first wireless network (e.g., a PLMN, or any other communication device), for example, if the wireless device 2100 receives a paging message 2710 corresponding to the available service type(s).

The unavailable service type(s) to respond to a RAN paging message 2710 may comprise a data network name (DNN), a network slice selection assistance information (NSSAI), packet data unit (PDU) session(s) identities, and/or the like. The DNN may comprise at least one of a non-IMS, a less-urgent or delay-tolerant type DNN, the Internet, and/or the like. The unavailable service type(s) to respond to a RAN paging message 2710 may indicate terminating service type(s) that the wireless device 2100 may avoid receiving, for example, if the wireless device 2100 is actively communicating (e.g., has an active connection) with a second wireless network (e.g., a PLMN, or any other communication device) of the first access technology. The wireless device 2100 may avoid responding to the RAN paging message 2710 from the first wireless network (e.g., a PLMN, or any other communication device), for example, if the wireless device 2100 receives a RAN paging message 2710 corresponding to the unavailable service type(s) at a time that the wireless device 2100 communicates with the second wireless network (e.g., a PLMN, or any other communication device). The first AMF 2106 may determine to decrease a paging priority or to avoid providing paging service (e.g., sending RAN paging messages 2710), for the services of the unavailable service type(s).

The frequency/band information may indicate one or more frequencies and/or bands on which the wireless device 2100 may camp. The frequency/band information may indicate one or more frequencies and/or bands on which the wireless device 2100 may decline to camp. The first wireless network (e.g., a PLMN, or any other communication device) may use band f1 and band f2 for a wireless network deployment, for example, the band f1 may comprise a frequency that is compatible with the second wireless network (e.g., a PLMN, or any other communication device), and the band f2 may comprise a frequency that is not compatible with second wireless network (e.g., a PLMN, or any other communication device). The wireless device 2100 may transmit and/or receive via the first wireless network (e.g., a PLMN, or any other communication device) using the band f1, for example, simultaneously (or near simultaneously) with the wireless device 2100 actively communicating via the second wireless network (e.g., a PLMN, or any other communication device). The wireless device 2100 may be prevented from transmitting and/or receiving via the first wireless network (e.g., a PLMN, or any other communication device) using the band f2, for example, simultaneously (or near simultaneously) with the wireless device 2100 actively communicating via the second wireless network (e.g., a PLMN, or any other communication device).

The wireless device 2100 may transition the RRC state from an RRC-INACTIVE to an RRC-IDLE state, for example, after or based on the wireless device 2100 sending the notification response message 2320. The wireless device 2100 may delete existing RRC connection context information (e.g., security context), after or based on the wireless device 2100 transitioning to the RRC-IDLE state.

The second base station 2104 may forward the notification response message 2320 to the N3IWF 2112, for example, after receiving the notification response message 2320 from the wireless device 2100. The N3IWF 2112 may send the notification response message 2320 to the first AMF 2106. The first AMF 2106 may receive the notification response message 2320 via the non-3GPP access technology (e.g., wireless LAN, Wi-Fi, and/or any other non-3GPP access technology) from the second base station 2104. The notification response message 2320 may report information regarding a failure or rejection of the connection resume request with the first wireless network (e.g., a PLMN, or any other communication device) for the first 3GPP access technology. The connection management state in the first AMF 2106 of the wireless device 2100 may comprise a connected state (e.g., CM-CONNECTED). The first AMF 2106 may determine that the received notification response message 2320 may be in response to a RAN paging message 2710 by a serving base station, for example, the first base station 2102. The first AMF 2106 may have no record of performing paging for the wireless device 2100, for example, based on the RAN paging message 2710 having been sent by a base station and not the first AMF 2106).

The first AMF 2106 may determine to an ongoing RAN paging procedure (e.g., sending paging messages 2710), for example, based on the first AMF 2106 receiving the notification response message 2320. The first AMF 2106 may send a wireless device (e.g., UE) context release command message 2720 to the first base station 2102. The wireless device (e.g., UE) context release command message 2720 may request a context release associated with the wireless device 2100 (e.g., a context release of the wireless device 2100, a context release for the wireless device 2100, etc.) based on the AMF 2106 determining to stop the ongoing paging procedure. The first base station 2102 may stop the ongoing paging procedure that sends the paging messages 2710 to the wireless device 2100, for example, after or based on receiving the wireless device (e.g., UE) context release command message 2720. The first base station 2102 may request a stop of paging procedures that send paging messages to the neighboring base station(s), for example, if the first base station 2102 previously instructed a RAN paging procedure to one or more neighbor base stations. The first base station 2102 may delete any existing UE context (e.g., tunnel identity of the wireless device 2100, RRC connection information) of the wireless device 2100. The first base station 2102 may release the wireless device 2100 (e.g., block 2770), for example, after or based on the first base station 2102 receiving the wireless device (e.g., UE) context release command message 2720. The first base station 2102 may send a UE context release complete message 2730 to the first AMF 2106, for example, after or based on the first base station 2102 receiving the UE context release command message 2720 and/or releasing the wireless device 2100 (e.g., block 2770). The connection management state of the wireless device 2100 in the first AMF 2106 may transition into a CM-IDLE state from a CM-CONNECTED state (e.g., block 2760), for example, independently of any signaling performed by the first wireless network (e.g., a PLMN, or any other communication device), after or based on sending the notification response message 2320 rejecting or declining to accept 3GPP communications with the first wireless network (e.g., a PLMN, or any other communication device), and/or in parallel with the first base station 2102 releasing the wireless device 2100 (e.g., block 2770).

The first AMF 2106 may determine a paging strategy (or paging policy) of the wireless device 2100, for example, based on the notification response message 2320. The first AMF 2106 may use the paging strategy for one or more terminating service(s). The first AMF 2106 may use the paging strategy from the next terminating service(s) and the first AMF 2106 may provide the paging strategy to a first base station 2102 so that the first base station 2102 may use the paging strategy for a RAN paging procedure for a wireless device 2100 in an RRC-INACTIVE state. The paging strategy may comprise a paging retransmission scheme, an indication as to whether to send paging messages to the base station during certain AMF high load conditions, an indication as to whether to apply sub-area-base paging, an indication as to whether to stop paging transmission, an indication as to whether to send a paging message via a 3GPP access technology or a notification message via a non-3GPP access technology, an indication of a page for a specific DNN or a S-NSSAI, an indication to buffer a paging message if the wireless device 2100 is in idle state, and/or the like. The paging strategy may indicate that a notification procedure (e.g., sending a notification message) via a non-3GPP access technology is prioritized higher than a paging procedure (e.g., sending a paging message) via a 3GPP access technology (e.g., a first 3GPP access technology) for a terminating service. The paging strategy may indicate that any terminating service (e.g., sending a paging message 2310) in idle state (e.g., CM-IDLE) is prohibited for the wireless device 2100 via the first 3GPP access technology and that the first AMF 2106 may provide information indicating to a network function that a terminating service is prohibited for the wireless device 2100. The paging strategy may indicate that any terminating service (e.g., sending a paging message for the service) in an idle state (e.g., CM-IDLE) is prohibited for the wireless device 2100 via the first 3GPP access technology and optionally indicate a valid time period of the paging strategy (e.g., terminating service for a 3GPP access technology is prohibited during a period of the time "one hour" or any other duration). The paging strategy may indicate that a terminating service (e.g., sending a paging message for the service) in an idle state (e.g., CM-IDLE) is allowed for a service/DNN/S-NSSI via the first 3GPP access technology, indicate the service/DNN/S-NSSI for which the terminating service is allowed, and provide corresponding information to a network function (e.g., SMF, PCF).

The first AMF 2106 may provide information to one or more associated SMFs (e.g., the first SMF 2108), that a change of access technology type is permitted and/or requested (e.g., from a 3GPP access technology to a non-3GPP access technology), for example, if the allowed PDU session(s) identity list is included in the notification response message 2320. The one or more associated SMFs may be in charge of the PDU session. The first AMF 2106 may send, to the SMF 2108, an N1N2 transfer failure message 2408, for example, based on the notification response message 2320 received from the wireless device 2100. The first SMF 2108 may trigger 2420 and/or perform a session update/modification procedure 2430 to move a user-plane resource from a first access technology (e.g., a 3GPP access technology) to a second access technology (e.g., a non-3GPP access technology), for example, as discussed above with respect to FIG. 24. The first SMF 2108 may notify (e.g., via notification signal 2440) the UPF 2110 to modify any services intending to communicate with the wireless device 2100 via the 3GPP access technology to communicate with the wireless device 2100 via the non-3GPP access technology. Communications between services of the UPF 2110 and the wireless device 2100 may be more reliable and resource-efficient based on receipt and processing of the notification signal 2440.

Figure 28:
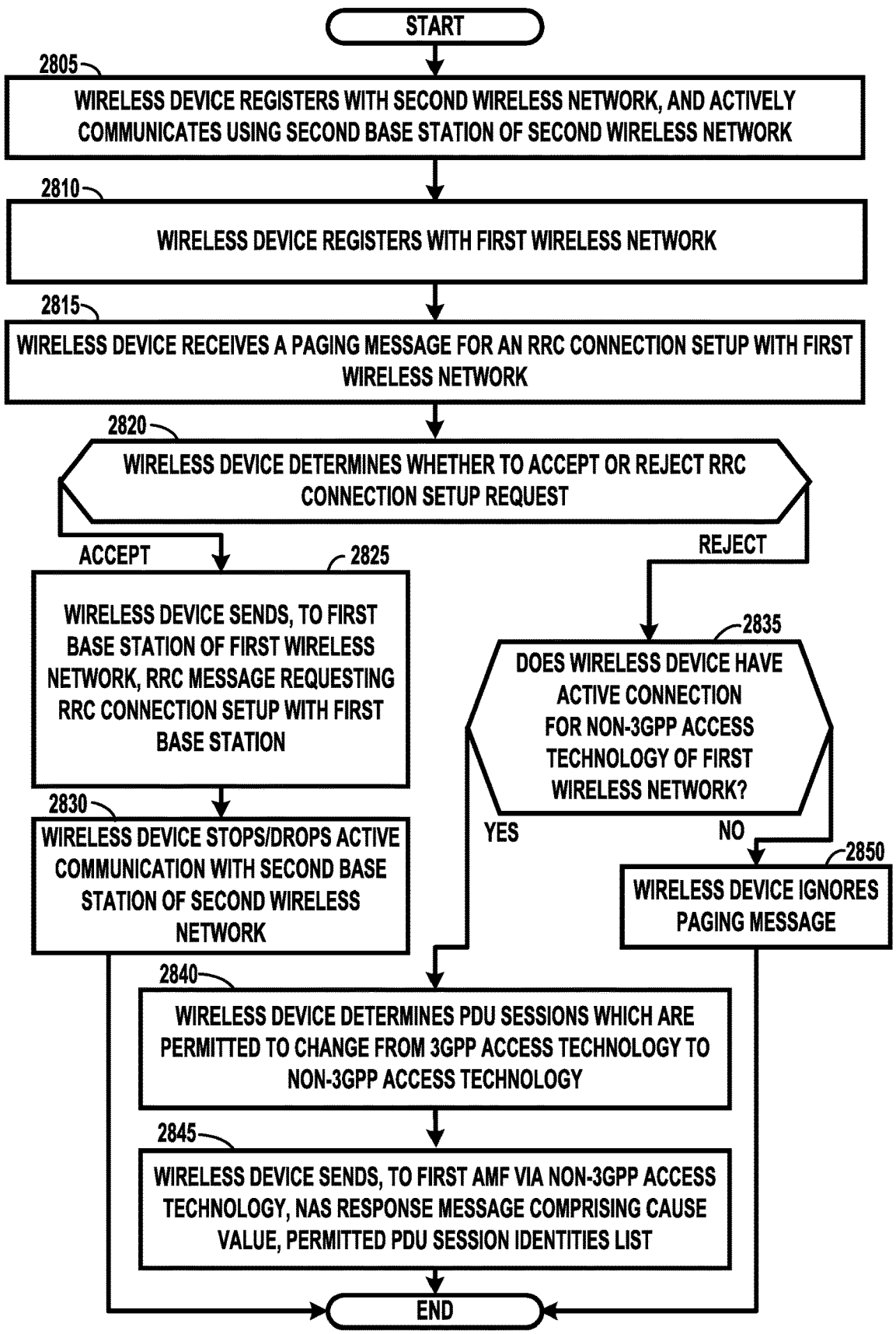
FIG. 28 shows an example for a wireless device registering with a wireless network.

FIG. 28 shows an example for a wireless device registering with a wireless network. A wireless device (e.g., the wireless device 100, 200, 400, 1600, or any other wireless device) may perform a method comprising steps shown in FIG. 28. The wireless device may register with a second wireless network (e.g., a PLMN, or any other communication device), for example, via a second base station (e.g., a gNB, or any other communication device) (e.g., at step 2805). The wireless device may actively communicate with the second base station (e.g., a gNB, or any other communication device) of the second wireless network (e.g., a PLMN, or any other communication device). The wireless device may register with the first wireless network (e.g., a PLMN, or any other communication device) (e.g., at step 2810). The wireless device may receive a paging message (e.g., at step 2815), for example, from a first base station (e.g., a gNB, or any other communication device) of the first wireless network (e.g., a PLMN, or any other communication device). The paging message may comprise a request for an RRC connection setup with the first wireless network (e.g., a PLMN, or any other communication device).

The wireless device may determine whether to accept the RRC connection setup request of the paging message (e.g., at step 2820). The wireless device may send an RRC message, requesting a RRC connection setup with the first base station (e.g., a gNB, or any other communication device), to the first base station (e.g., a gNB, or any other communication device) of the first wireless network (e.g., a PLMN, or any other communication device) (e.g., at step 2825), if the wireless device determines to accept the RRC connection setup request of the paging message. The wireless device may stop/drop the active communication with the second base station (e.g., a gNB, or any other communication device) of the second wireless network (e.g., a PLMN, or any other communication device) (e.g., at step 2830), for example, after or based on the determining to accept the RRC connection setup request.

The wireless device may determine whether the wireless device has an active connection for non-3GPP access technology of the first wireless network (e.g., a PLMN, or any other communication device), for example, after or based on determining to reject the RRC connection setup request (e.g., at step 2835). The wireless device may determine PDU session(s) which are permitted to change from a 3GPP access technology to a non-3GPP access technology (e.g., at step 2840), for example, after or based on determining that the wireless device has an active connection for non-3GPP access technology of the first wireless network (e.g., a PLMN, or any other communication device). The wireless device's determination of PDU session(s) which are permitted to change access technologies may be further based on policies of the first wireless network (e.g., a PLMN, or any other communication device). The first wireless network (e.g., a PLMN, or any other communication device) may have a policy that dictates a threshold quality of service and/or signal strength for the wireless device to use a non-3GPP access technology. The wireless device's determination of PDU session(s) which are permitted to change access technologies may be based on the wireless device's evaluation of the signal strength and/or quality of service of the non-3GPP access technology associated with the first wireless network (e.g., a PLMN, or any other communication device). The wireless device's determination of PDU session(s) which are permitted to change access technologies may be based on a local policy of the wireless device and/or wireless service plan subscription information pertaining to the wireless device. The wireless device may send, to the first AMF of the first wireless network, a response message (e.g., cause value, permitted PDU session identities list, etc.) via the non-3GPP access technology of the first wireless network (e.g., a PLMN, or any other communication device), for example, after or based on the determining that the wireless device has an active connection for non-3GPP access technology of the first wireless network (e.g., a PLMN, or any other communication device). The response message (e.g., cause value, permitted PDU session identities list, etc.) may comprise a cause value and/or a list of identities of the PDU session(s) which are permitted to change from the 3GPP access technology to the non-3GPP access technology (e.g., at step 2845).

The wireless device may ignore the paging message (e.g., at step 2850), for example, after or based on the wireless device having determined to reject the RCC connection setup request and having determined that the wireless device does not have an active connection for non-3GPP access technology of the first wireless network (e.g., a PLMN, or any other communication device).

Figure 29:
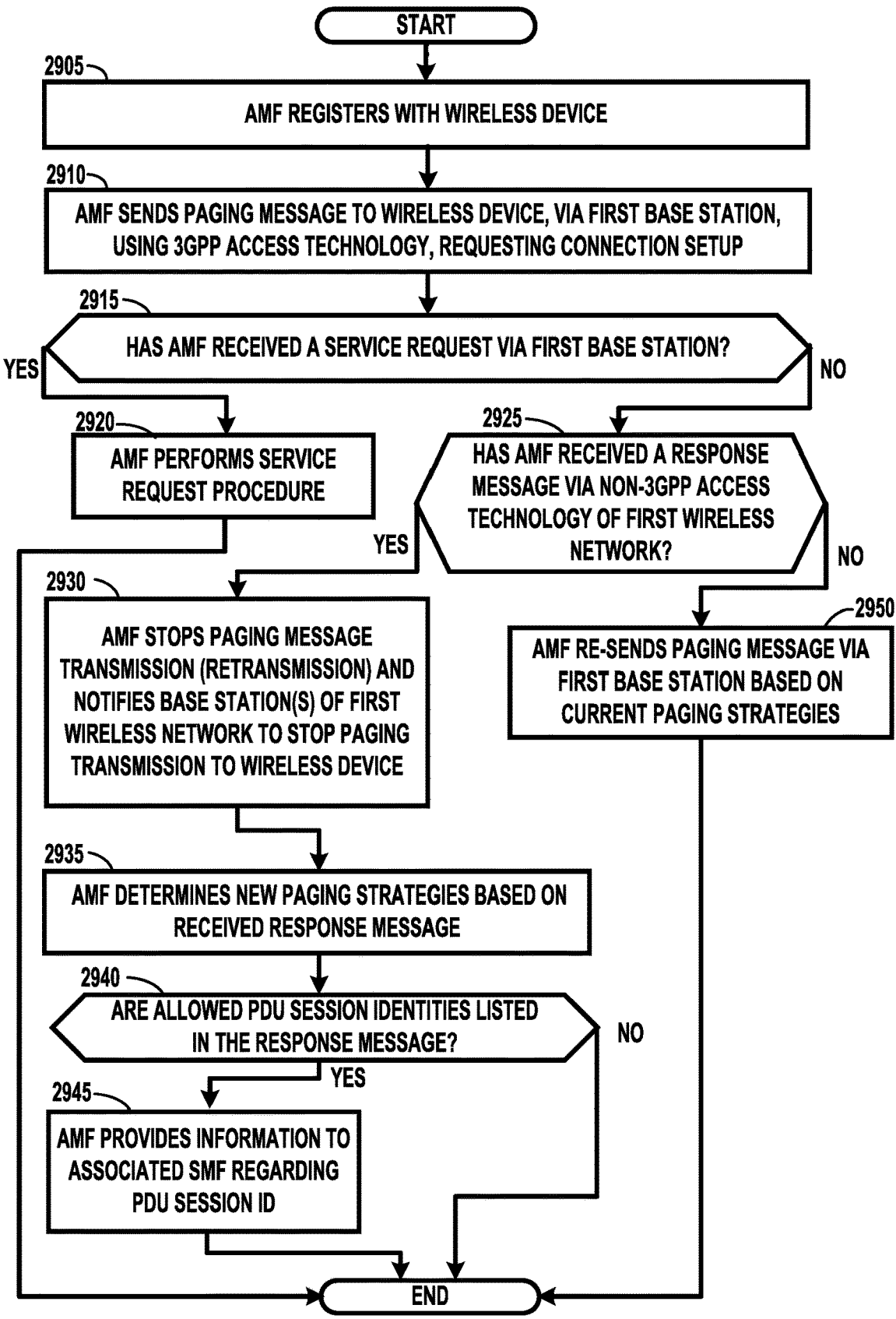
FIG. 29 shows an example for an AMF of the first wireless network.

FIG. 29 shows an example for an AMF device of the first wireless network (e.g., a PLMN, or any other communication device). A computing device associated with the AMF device (e.g., the AMF 155, the AMF 255, or any other AMF network entity/component) may perform a method comprising steps shown in FIG. 29.

The AMF device may register with a wireless device (e.g., at step 2905). The AMF device may send a paging message to the wireless device, for example, via a first base station (e.g., a gNB, or any other communication device) using a 3GPP access technology of a first wireless network (e.g., at step 2910). The paging message may comprise a request for a connection setup with the wireless device. The AMF device may determine whether the AMF has received a service request or RRC setup message, for example, via the first base station (e.g., a gNB, or any other communication device) of the first wireless network, after or based on the sent paging message (e.g., at step 2915). The AMF device may perform a corresponding service request procedure, for example, as described in FIG. 10 and/or FIG. 11 (e.g., at step 2920), for example, after or based on determining that the AMF has received the service request or RRC setup message.

The AMF device may determine whether the AMF has received a response message (e.g., notification response message, NAS notification response message, cause value, permitted PDU session identities list, etc.) via a non-3GPP access technology of the first wireless network (e.g., a PLMN, or any other communication device) (e.g., at step 2925). The AMF device may stop paging message transmission/retransmission and/or notify the first base station (e.g., a gNB, or any other communication device) and/or neighbor base station(s) (e.g., gNBs, or any other communication devices) of the first wireless network (e.g., a PLMN, or any other communication device) (e.g., via an N2 interface) to stop the paging transmission to the wireless device (e.g., at step 2930), for example, after or based on the AMF having received the response message. The AMF device may determine one or more additional paging strategies (e.g., at step 2935), for example, based on the received response message. The AMF device may determine whether allowed PDU session identities are indicated (e.g., listed) in the response message (e.g., cause value, permitted PDU session identities list, etc.) (e.g., at step 2940). The AMF device may provide information to an associated SMF device regarding one or more PDU session identities (e.g., at step 2945), for example, based on the allowed PDU session identities determined to be listed in the response message.

The AMF device may resend (e.g., retransmit) the paging message to the wireless device via the first base station (e.g., a gNB, or any other communication device) and any neighbor base station(s) (e.g., gNBs, or any other communication devices) based on a current paging strategy (e.g., at step 2950), for example, if the AMF device has not received a response message (e.g., a service request, RRC setup, a response message, etc.) from the wireless device. The first base station (e.g., a gNB, or any other communication device) and/or any neighbor base station(s) (e.g., gNBs, or any other communication devices) may comprise a registration area of the wireless device.

A wireless device may receive, from a first base station of a first access technology (e.g., 3GPP access technology), a message (e.g., a paging message). The message may request a connection setup of the wireless device for the first access technology (e.g., 3GPP access technology). The wireless device may determine that the wireless device is unavailable and/or decides not to communicate with (e.g., send and/or receive a message for a service via) the first base station using the first access technology (e.g., 3GPP access technology). The wireless device may send a message (e.g., a non-access stratum (NAS) notification response message) to an access and mobility management function (AMF), via a second base station of a second access technology (e.g., non-3GPP access technology). The message (e.g., NAS notification response message) may indicate a decision by the wireless device to not accept (e.g., provide information of a failure/rejection of) the connection setup request) for the first access technology (e.g., 3GPP access technology). The response message may comprise a cause value. The first access technology may comprise a 3GPP access technology. The second access technology may comprise a non-3GPP access technology. The wireless device may use more than one multiple subscriber/user identities/modules/identifiers (e.g., subscriber identity modules (SIMs), embedded and/or electronic SIMs (eSIMs), physical and/or electronic profiles, etc.). The wireless device may comprise one or more single transmitter and one or more receivers. The wireless device may be registered via the first access technology and the second access technology to a first wireless public land mobile network (PLMN). The first PLMN may comprise the AMF device, the first base station, the second base station, and/an SMF device. The wireless device may be registered in a second PLMN via a third base station of a third access technology that is different from the first PLMN that comprises the first base station and the AMF. The third access technology may be the same as the first access technology. The determining that the wireless device is unavailable to communicate with the first base station using the first access technology may be based on the wireless device being in a connected status for the first access technology with the second PLMN. The cause value may comprise indications that a connection status is busy, a connection status is weak, a connection state is in CM-CONNECTED with another PLMN that is different from the first PLMN that comprise the AMF device, a wireless device comprises a multi-SIM device, the wireless device comprises a dual-SIM device, the wireless device comprises multiple subscriber/user identities/modules/identifiers/profiles, other cause value indications, and/or the like. The response message may further comprise an allowed packet data unit (PDU) session(s) identity list, available service type(s) to respond to a paging message, unavailable service type(s) to respond to a paging message, a frequency/band information, and/or the like. The allowed PDU sessions(s) list may indicate user-plane resources of PDU session(s) associated with 3GPP access technology and permitted to be re-established via a non-3GPP access technology. The available service type(s) may comprise a data network name (DNN), a network slice selection assistance information (NSSAI), packet data unit (PDU) session(s) identities, and/or the like. The DNN may indicate an IP multimedia subsystem (IMS). The unavailable service type(s) may comprise a data network name (DNN), a network slice selection assistance information (NSSAI), one or more packet data unit (PDU) session(s) identities, and/or the like. The DNN may indicate the Internet. The first base station of the first access technology may use the frequency/band information for paging. The paging message may comprise an access type, a UE identity of the wireless device, and/or the like. The access type may comprise a third-generation partnership project (3GPP) access technology, and/or a non-3GPP access technology. The access type may indicate the 3GPP access technology. The UE identity of the wireless device may indicate an S-temporary mobile subscriber identity (S-TMSI), an international mobile subscriber identity (IMSI), a 5th-generation S-TMSI (5G-S-TMSI), I-RNTI, and/or the like. The paging message may further comprise a paging cause value. The determining may be based on an activity status of the first access technology of the wireless device with another PLMN that is different from the first PLMN that comprises the AMF device, the paging cause value of the paging message, and/or the like. The paging cause value may indicate a signaling for mobility management, a signaling for policy update, a UE context update, a UE policy update, an indication requesting a registration, an IP multimedia subsystem (IMS) voice, an IMS video, an IMS SMS, an IMS MMS, an IMS signaling, other IMS, an ultra-reliable low latency communication (URLLC), emergency, other cause values, and/or the like.

A wireless device may receive, from a second base station of a second access technology, a request message requesting a connection setup of the wireless device for a first access technology. The wireless device may determine that the wireless device is unavailable to communicate with the first base station using the first access technology. The wireless device may send a response message to an access and mobility management function (AMF) via the second base station of the second access technology, providing information of a failure/rejection of the connection setup request for the first access technology. The response message may comprise a non-access stratum (NAS) response message. The response message may comprise a cause value. An access and mobility management function (AMF) may send, to the wireless device via a first base station of a first access technology, a paging message requesting a connection setup of the wireless device for the first access technology. The AMF may receive, from the wireless device via a second base station of a second access technology, a response message providing information of a failure/rejection of the connection setup request. The response message may comprise a first cause value. The AMF may determine a paging policy/strategy for the wireless device based on the first cause value. The AMF may receive, from a network function, a connection setup request message requesting a connection setup with the wireless device. The AMF may send, to the network function, a connection setup response message after or based on receiving the connection setup request message. The AMF may send, to the network function, a connection setup failure message after or based on receiving the response message indicating the failure/rejection of the connection setup request. The connection setup failure message may comprise a second cause value. The response message may comprise an allowed packet data unit (PDU) session(s) identity list associated with the second access technology, available service type(s) for responding to a paging message, unavailable service type(s) for responding to a paging message, frequency/band information, and/or the like. At least some PDU sessions that may be established via a first access technology (e.g., 3GPP access technology) may (or may not) be able to be transferred to a device via the first access technology and/or the second access technology. For example, a policy and/or rule (e.g., from a policy control function (PCF) device) may indicate information relating to whether a PDU session may be transferred to a device via an access technology. The AMF may send, to a session management function (SMF), a session update message indicating an availability of an access type change information of a PDU session identity.

A wireless device may receive, from a first base station via a first access technology, a paging message. The wireless device may determine, based on a determination not to communicate using the first access technology, a second access technology. The wireless device may send, to a second base station via the second access technology, a non-access stratum (NAS) response message indicating the determination not to communicate using the first access technology. The determination not to communicate using the first access technology may comprise a determination not to accept service associated with the paging message. The paging message may comprise a connection setup request. The sending the NAS response message may comprise sending the NAS response message to an access and mobility management function (AMF) device via the second base station. The NAS response message may indicate to prevent and/or stop retransmission of the paging message. The first access technology may be a third-generation partnership project (3GPP) access technology. The second access technology may be a non-third generation partnership project (non-3GPP) access technology. The NAS response message may comprise a cause value indicating at least one of: a connection status is busy; a connection status is weak; a connection with a base station that is different from the first base station; or the wireless device has more than one subscriber identity module (SIM). The wireless device may receive, from the first base station via the first access technology, a second paging message. The wireless device may send, based on a determination to communicate using the first access technology, a radio resource control (RRC) setup message to the first base station. The wireless device may send, based on a determination to communicate using the first access technology, a service request message to the first base station. The determination not to communicate using the first access technology may be based on the wireless device being in a connected state with a third base station via the first access technology, wherein the third base station comprises a second public land mobile network (PLMN) different from a first PLMN that comprises the first base station. The NAS response message may comprise at least one of: an allowed packet data unit (PDU) session identity list for the second access technology; available service type for responding to a paging message; unavailable service type for responding to a paging message; or frequency or band information for paging. The NAS response message may comprise an allowed packet data unit (PDU)

sessions identity list indicating user plane resources of at least one PDU session that is: associated with the first access technology, and allowed to be re-established via the second access technology. The NAS response message may comprise at least one available service type for responding to a paging message, wherein the at least one available service type comprises at least one of: a data network name (DNN); a network slice selection assistance information (NSSAI); or a packet data unit (PDU) session identity. The determination not to communicate using the first access technology may be based on a paging cause value in the paging message. The paging cause value may indicate at least one of: a non-access stratum (NAS) signaling for mobility management; a policy update; a registration request; or an IP multimedia subsystem (IMS) message.

Systems, devices, and media may be configured with the described method. A wireless device may comprise one or more processors. The wireless device may also comprise memory storing instructions that, when executed by the one or more processors, cause the wireless device to perform the described method, additional operations, and/or include the additional elements. A system may comprise a wireless device configured to perform the described method, and a base station configured to send the paging message. A computer-readable medium may store instructions that when executed, may cause performance of the described method.

A base station may send, to a wireless device via a first access technology, a paging message. The base station may receive, from an access and mobility management function (AMF) device, an indication to stop transmissions and/or retransmissions of the paging message. The base station may, based on the indication to stop transmissions and/or retransmissions of the paging message, stop transmissions and/or retransmissions of the paging message via the first access technology. The indication received by the base station from the AMF device may comprise a context release command message requesting a context release associated with the wireless device. The paging message may comprise a connection setup request. The base station may, based on the indication received from the AMF device comprising a context release command message, perform a context release associated with the wireless device. The first access technology may be a third-generation partnership project (3GPP) access technology. The second access technology may be a non-third generation partnership project (non-3GPP) access technology. The paging message may be a radio access network (RAN) paging message. The base station may, based on a determination that a response to the paging message has not been received during the time period, retransmit the paging message. The base station may receive, from the wireless device via the first access technology, a radio resource control (RRC) setup message.

Systems, devices, and media may be configured with the described method. A base station may comprise one or more processors. The base station may also comprise memory storing instructions that, when executed by the one or more processors, cause the base station to perform the described method, additional operations, and/or include the additional elements. A system may comprise a base station configured to perform the described method, and a computing device configured to send the indication to stop transmissions and/or retransmissions of the paging message. A computer-readable medium may store instructions that when executed, may cause performance of the described method.

An access and mobility management function (AMF) device may send, to a first base station that uses a first access technology, an indication to send a paging message. The AMF device may receive, from a second base station that uses a second access technology, a non-access stratum (NAS) response message indicating a determination of a wireless device not to communicate using the first access technology. The AMF device may send, to the first base station, an indication to stop transmission of the paging message. The NAS response message may further indicate a determination not to accept service associated with the paging message. The paging message may comprise a connection setup request. The first access technology may be a third-generation partnership project (3GPP) access technology. The second access technology may be a non-third generation partnership project (non-3GPP) access technology. The NAS response message may comprise a cause value indicating at least one of: a connection status is busy; a connection status is weak; a connection with a base station that is different from the first base station; or a wireless device has more than one subscriber identity module (SIM). The indication to send the paging message may comprise an N2 paging message. The paging message may comprise a radio resource control (RRC) paging message.

Systems, devices, and media may be configured with the described method. A computing device may comprise one or more processors. The computing device may also comprise memory storing instructions that, when executed by the one or more processors, cause the computing device to perform the described method, additional operations, and/or include the additional elements. A system may comprise a computing device configured to perform the described method, and a base station configured to send the NAS response message. A computer-readable medium may store instructions that when executed, may cause performance of the described method.

A wireless device may receive, from a first base station via a first access technology, a paging message. The paging message may comprise a request for a connection setup using the first access technology. The wireless device may determine whether to accept or reject the request for the connection setup. The wireless device may determine, based on a determination to reject or not to accept the request for the connection setup, a second access technology. The wireless device may send, to an access and mobility management function (AMF) device via a second base station using the second access technology, a non-access stratum (NAS) response message indicating the determination to reject or not to accept the request for the connection setup. The wireless device may determine whether to accept service associated with the paging message. The determination to reject or not to accept the request for the connection setup may comprise a determination not to accept service associated with the paging message. The wireless device may register, via the first access technology and the second access technology, with the AMF device. The first access technology may be a third-generation partnership project (3GPP) access technology. The second access technology may be a non-third generation partnership project (non-3GPP) access technology. The NAS response message may comprise a cause value indicating at least one of: a connection status is busy; a connection status is weak; a connection status is CM-CONNECTED with another public land mobile network (PLMN) that is different from a PLMN that comprises the AMF device; the wireless device (e.g., UE) is a dual-subscriber identity module (SIM) device; or the wireless device (e.g., UE) is a multi-subscriber SIM device. The wireless device may receive, from the first base station via the first access technology, a second paging message. The second paging message may comprise a second connection setup request using the first access technology. The wireless device may determine whether to accept or reject the second connection setup request. The wireless device may determine to communicate using the first access technology, based on a determination to accept the second connection setup request. The wireless device may send, based on the determination to communicate using the first access technology, a service request message to the AMF device via the first base station. The wireless device may send, based on the determination to communicate using the first access technology, a radio resource control (RRC) setup message to the AMF device via the first base station. The wireless device may use more than one SIM. For example, the receiving the paging message may be a first SIM and the sending the NAS response message may be via a second SIM. The wireless device may use a single transmitter and one or more receivers. For example, the receiving the paging message may be via a first SIM and the second the NAS response message may be either the first SIM or a second SIM. The wireless device may be in an active connected state with a second PLMN, via the first access technology, that is different from a first PLMN that comprises the first base station. The determination to reject or not to accept the request for the connection setup may be based on the wireless device being in a connected state with the second PLMN via the first access technology. The NAS response message may comprise at least one of: an allowed packet data unit (PDU) session identity list for the second access technology; an available service type to respond for the paging message; an unavailable service type to respond for the paging message; or a frequency or band information. The allowed PDU sessions identity list may indicate user-plane resources of PDU session(s) that may be: associated with the first access technology, and/or allowed to be re-established via the second access technology. The available service type may comprise at least one of: a data network name (DNN); a network slice selection assistance information (NSSAI); or a packet data unit (PDU) session identity. The DNN may indicate an IP multimedia subsystem (IMS). The unavailable service type may comprise at least one of: a data network name (DNN); a network slice selection assistance information (NSSAI); or a packet data unit (PDU) session identity. The DNN may indicate an internet. The first base station of the first access technology may use the frequency/band information for paging. The paging message may comprise: an access type; or a user equipment (UE) identity. The access type may comprise at least one of: a third-generation partnership project (3GPP) access; or a non-3GPP access. The access type may indicate the 3GPP access. The UE identity may indicate at least one of: an S-temporary mobile subscriber identity (S-TMSI); an international mobile subscriber identity (IMSI); a 5th-generation S-TMSI (5 G-S-TMSI); or an inactive radio network temporary identity. The paging message may comprise a paging cause value. The paging cause value may indicate at least one of: a non-access stratum (NAS) signaling for mobility management; a NAS signaling for policy update; a UE context update; a UE policy update; an indication requesting a registration; an IP multimedia subsystem (IMS) voice; an IMS video; an IMS short message service (SMS); an IMS multimedia messaging service (MMS); an IMS signaling, other IMS; or others. The determination to reject or not to accept the request for the connection setup may be based on the paging cause value of the paging message.

Systems, devices, and media may be configured with the described method. A wireless device may comprise one or more processors. The wireless device may also comprise memory storing instructions that, when executed by the one or more processors, cause the wireless device to perform the described method, additional operations, and/or include the additional elements. A system may comprise a wireless device configured to perform the described method, and a base station configured to send the paging message. A computer-readable medium may store instructions that when executed, may cause performance of the described method.

A wireless device may receive, from an access and mobility management function (AMF) device, a connection setup request indication via a first access technology. The wireless device may determine whether to accept or reject the connection setup request. The wireless device may determine, based on a determination to reject the connection setup request, a second access technology. The wireless device may send a non-access stratum (NAS) response message to the AMF device via a second base station using the second access technology. The NAS response message may indicate a rejection of the connection setup request.

Systems, devices, and media may be configured with the described method. A wireless device may comprise one or more processors. The wireless device may also comprise memory storing instructions that, when executed by the one or more processors, cause the wireless device to perform the described method, additional operations, and/or include the additional elements. A system may comprise a wireless device configured to perform the described method, and a computing device configured to send the connection setup request indication. A computer-readable medium may store instructions that when executed, may cause performance of the described method.

An access and mobility management function (AMF) device may send, to a wireless device via a first base station using a first access technology, a paging message to request a connection setup for the first access technology. The AMF device may receive, from the wireless device, a non-access stratum (NAS) response message via a second base station using a second access technology, indicating a rejection of the connection setup request. The NAS response message may comprise a first cause value. The AMF device may stop sending the paging message, after receiving or based on the received NAS response message. The AMF device may determine, based on the first cause value, a paging policy for the wireless device.

Systems, devices, and media may be configured with the described method. A computing device may comprise one or more processors. The computing device may also comprise memory storing instructions that, when executed by the one or more processors, cause the computing device to perform the described method, additional operations, and/or include the additional elements. A system may comprise a computing device configured to perform the described method, and a wireless device configured to send the NAS response message. A computer-readable medium may store instructions that when executed, may cause performance of the described method.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, Wi-Fi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
    receiving, by a wireless device via a first base station associated with a first access technology of a mobile network, a paging message for connection establishment with the mobile network; and
    sending, by the wireless device to a second base station associated with a second access technology of the mobile network, a response to the paging message, wherein the response indicates:
        a rejection of the connection establishment with the mobile network;
        one or more allowed packet data unit (PDU) session identities of PDU sessions allowed to be re-established from the second access technology to the first access technology; and
        one or more parameters comprising one or more PDU session identities, wherein the one or more parameters indicate available services for paging by the mobile network.

2. The method of claim 1, wherein the response comprises a PDU session identity list of the one or more allowed PDU session identities.

3. The method of claim 1, wherein the response further indicates one or more PDU sessions unavailable for paging.

4. The method of claim 1, wherein the sending the response comprises sending a non-access stratum (NAS) response to an access and mobility management function (AMF) device via the second base station.

5. The method of claim 1, wherein the response further indicates to stop retransmission of the paging message.

6. The method of claim 1, wherein:
    the first access technology is a third-generation partnership project (3GPP) access technology;

the second access technology is a non-third generation partnership project (non-3GPP) access technology; and the sending the response further comprises sending the response to a computing device via the second base station.

7. The method of claim 1, wherein the response comprises a cause value indicating at least one of:
   a connection status is busy;
   a connection status is weak;
   a connection with the second base station that is different from a connection with the first base station; or
   the wireless device has more than one subscriber identity module (SIM).

8. The method of claim 1, further comprising:
   receiving, by the wireless device from the first base station with the first access technology, a second paging message; and
   based on a determination to communicate using the first access technology, sending a radio resource control (RRC) setup message to the first base station.

9. The method of claim 1, wherein, during the receiving the paging message, the wireless device is in an idle state for the first access technology and in a connected state for the second access technology.

10. A method comprising:
    sending, by a computing device to a base station associated with a first access technology of a mobile network, an indication to send a paging message to a wireless device for connection establishment with the mobile network; and
    receiving, from the wireless device, a response to the paging message, wherein the response indicates:
      a rejection of the connection establishment with the mobile network;
      one or more allowed packet data unit (PDU) session identities of PDU sessions allowed to be re-established from a second access technology to the first access technology; and
      one or more parameters comprising one or more PDU session identities, wherein the one or more parameters indicate available services for paging by the mobile network.

11. The method of claim 10, wherein the response further indicates a determination not to accept service associated with the paging message.

12. The method of claim 10, wherein the computing device comprises an access and mobility management function (AMF) device.

13. The method of claim 10, wherein:
    the paging message comprises a paging message to the wireless device via the base station of a third-generation partnership project (3GPP) access technology; and
    the receiving the response is via a second base station of a non-third generation partnership project (non-3GPP) access technology.

14. The method of claim 10, wherein the response comprises a cause value indicating at least one of:
    a connection status is busy;
    a connection status is weak;
    a connection with a second base station that is different from a connection with the base station; or
    a wireless device has more than one subscriber identity module (SIM).

15. The method of claim 10, wherein:
    the indication to send the paging message comprises an N2 paging message; and
    the paging message comprises a radio resource control (RRC) paging message.

16. The method of claim 10, further comprising sending an indication to stop transmission of the paging message based on a determination that the wireless device is in an idle state for the first access technology and in a connected state for the second access technology.

17. A method comprising:
    sending, to a wireless device by a base station associated with a first access technology of a mobile network, a paging message for connection establishment with the mobile network; and
    receiving, from the wireless device, a response to the paging message, wherein the response indicates:
      a rejection of the connection establishment with the mobile network;
      one or more allowed packet data unit (PDU) session identities of PDU sessions allowed to be re-established from a second access technology to the first access technology; and
      one or more parameters comprising one or more PDU session identities, wherein the one or more parameters indicate available services for paging by the mobile network.

18. The method of claim 17, further comprising receiving, from an access and mobility management function (AMF) device and based on the response, an indication comprising a context release command message requesting a context release associated with the wireless device.

19. The method of claim 18, further comprising:
    based on the indication received from the AMF device comprising a context release command message, performing a context release associated with the wireless device.

20. The method of claim 17, wherein:
    the sending the paging message is via a third-generation partnership project (3GPP) access technology; and
    the receiving the response is via a non-third generation partnership project (non-3GPP) access technology.

21. The method of claim 17, wherein the paging message is a radio access network (RAN) paging message.

22. The method of claim 17, further comprising:
    based on a determination that a response to the paging message has not been received during a time period, retransmitting the paging message; and
    receiving, from the wireless device, a radio resource control (RRC) setup message.

23. The method of claim 17, further comprising receiving an indication to stop transmission of the paging message based on the wireless device being in an idle state for the first access technology and in a connected state for the second access technology.

* * * * *

UNITED STATES PATENT AND TRADEMARK OFFICE
CERTIFICATE OF CORRECTION

PATENT NO. : 11,792,767 B2
APPLICATION NO. : 16/824324
DATED : October 17, 2023
INVENTOR(S) : Ryu et al.

It is certified that error appears in the above-identified patent and that said Letters Patent is hereby corrected as shown below:

On the Title Page

Column 2, Other Publications, Line 1:
Delete "Exended" and insert --Extended-- therefor In the Drawings Sheet 19 of 30, Fig. 18, Reference Numeral 1612, Line 1:
Delete "1612" and insert --1812-- therefor Sheet 19 of 30, Fig. 18, Reference Numeral 1610, Line 1:
Delete "1610" and insert --1810-- therefor In the Specification Column 7, Detailed Description, Line 54:
Delete "UDM-FE," and insert --UDM-FE-- therefor Column 8, Detailed Description, Line 41:
Delete "105, 25" and insert --105, 205-- therefor Column 8, Detailed Description, Line 50:
Delete "100, 100." and insert --100, 200.-- therefor Column 9, Detailed Description, Line 28:
Delete "22" and insert --322-- therefor Column 12, Detailed Description, Line 26:
Delete "405" and insert --400-- therefor Signed and Sealed this
Fifth Day of November, 2024

Katherine Kelly Vidal
*Director of the United States Patent and Trademark Office*

CERTIFICATE OF CORRECTION (continued)
U.S. Pat. No. 11,792,767 B2

Column 14, Detailed Description, Line 20:
Delete "100, 100" and insert --100, 200-- therefor Column 16, Detailed Description, Lines 36-37:
Delete "100, 210" and insert --100, 200-- therefor Column 21, Detailed Description, Lines 29-30:
Delete "100, 20" and insert --100, 200-- therefor Column 25, Detailed Description, Lines 7-8:
Delete "N5g-eir_EquipmentIdentityCheck_Get" and insert --N5g-eir_EquipmentIdentityCheck_Get-- therefor Column 27, Detailed Description, Lines 4-5:
Delete "16, 260)." and insert --160, 260).-- therefor Column 27, Detailed Description, Line 11:
Delete "16, 260)." and insert --160, 260).-- therefor Column 37, Detailed Description, Line 1:
Delete "1002" and insert --155-- therefor Column 37, Detailed Description, Line 59:
Delete "1102" and insert --1002-- therefor Column 37, Detailed Description, Lines 62-63:
Delete "150, 250" and insert --160, 260-- therefor Column 47, Detailed Description, Lines 24-25:
Delete "RCC-IDLE" and insert --RRC-IDLE-- therefor Column 47, Detailed Description, Line 26:
Delete "RCC-CONNECTED" and insert --RRC-CONNECTED-- therefor Column 47, Detailed Description, Line 27:
Delete "RCC-IDLE" and insert --RRC-IDLE-- therefor Column 47, Detailed Description, Lines 27-28:
Delete "RCC-CONNECTED" and insert --RRC-CONNECTED-- therefor Column 47, Detailed Description, Line 31:
Delete "RCC-CONNECTED" and insert --RRC-CONNECTED-- therefor Column 47, Detailed Description, Line 33:
Delete "RCC-CONNECTED" and insert --RRC-CONNECTED-- therefor

CERTIFICATE OF CORRECTION (continued)
U.S. Pat. No. 11,792,767 B2

Column 48, Detailed Description, Line 59:
Delete "RRC-INANCTIVE" and insert --RRC-INACTIVE-- therefor Column 48, Detailed Description, Line 61:
Delete "RRC-INANCTIVE" and insert --RRC-INACTIVE-- therefor Column 50, Detailed Description, Line 6:
After "performance", insert --.-- therefor Column 67, Detailed Description, Line 58:
Delete "2110." and insert --2100.-- therefor Column 69, Detailed Description, Line 1:
Delete "2106" and insert --2108-- therefor Column 83, Detailed Description, Lines 52-53:
Delete "(5 G-S-TMSI);" and insert --(5G-S-TMSI);-- therefor Column 85, Detailed Description, Line 45:
Delete "Lab VIEWMathScript." and insert --LabVIEWMathScript.-- therefor Column 86, Detailed Description, Lines 26-27:
Delete "manner various" and insert --manner. Various-- therefor